United States Patent [19]
Wical

[11] Patent Number: 6,061,675
[45] Date of Patent: May 9, 2000

[54] METHODS AND APPARATUS FOR CLASSIFYING TERMINOLOGY UTILIZING A KNOWLEDGE CATALOG

[75] Inventor: Kelly Wical, Redwood Shores, Calif.

[73] Assignee: Oracle Corporation, Redwood Shores, Calif.

[21] Appl. No.: 08/455,710

[22] Filed: May 31, 1995

[51] Int. Cl.$^7$ .................................................. G06F 17/00
[52] U.S. Cl. .................................. 706/45; 706/46; 704/9; 704/10
[58] Field of Search ........................... 395/60, 759, 760; 706/45, 46, 59, 55; 704/9, 10, 7

[56] References Cited

U.S. PATENT DOCUMENTS

| | | | |
|---|---|---|---|
| 4,864,502 | 9/1989 | Kucera et al. | 704/8 |
| 4,914,590 | 4/1990 | Loatman et al. | 704/8 |
| 5,056,021 | 10/1991 | Ausborn | 364/419 |
| 5,371,807 | 12/1994 | Register et al. | 382/159 |
| 5,497,319 | 3/1996 | Chong et al. | 704/2 |
| 5,594,837 | 1/1997 | Noyes | 706/55 |

OTHER PUBLICATIONS

Damiani, Maria and Bottarelli, Sandro. "A Terminological Approach to Business Domain Modelling" Database and Expert Systems Applications: Proceedings of the Int'l Conference in Vienna, Austria, pp. 340–345, 1990.

Shapiro, Stuart C., Editor–in–Chief. "Knowledge Representation." Encyclopedia of Artificial Intelligence: Second Edition, vol. 1. pp. 755–756, 1992.

Ballou, Melinda Carol. "Text retrieval system routes selected data to interested users." Digital Review, vol. 7 No. 18, pp. 9–10, May 7, 1990.

"Networked documentation systems: new challenges in hte 1990's." The Seybold Report on Publishing Systems. vol. 19 No. 14, pp. 18–28, Apr. 9, 1990.

*Primary Examiner*—Tariq R. Hafiz
*Assistant Examiner*—Jason W. Rhodes
*Attorney, Agent, or Firm*—Fliesler, Dubb, Meyer & Lovejoy LLP

[57] ABSTRACT

A knowledge catalog includes a plurality of independent and parallel static ontologies to accurately represent a broad coverage of concepts that define knowledge. The actual configuration, structure and orientation of a particular static ontology is dependent upon the subject matter or field of the ontology in that each ontology contains a different point of view. The static ontologies store all senses for each word and concept. A knowledge classification system, that includes the knowledge catalog, is also disclosed. A knowledge catalog processor accesses the knowledge catalog to classify input terminology based on the knowledge concepts in the knowledge catalog. Furthermore, the knowledge catalog processor processes the input terminology prior to attachment in the knowledge catalog. The knowledge catalog further includes a dynamic level that includes dynamic hierarchies. The dynamic level adds details for the knowledge catalog by including additional words and terminology, arranged in a hierarchy, to permit a detailed and in-depth coverage of specific concepts contained in a particular discourse. The static and dynamic ontologies are relational such that the linking of one or more ontologies, or portions thereof, result in a very detailed organization of knowledge concepts.

9 Claims, 8 Drawing Sheets

Microfiche Appendix Included
(9 Microfiche, 501 Pages)

METHODS AND APPARATUS FOR CLASSIFYING TERMINOLOGY UTILIZING A KNOWLEDGE CATALOG

MICROFICHE APPENDICES

Appendix A, entitled "Theme Parser Code" contains five microfiche with a total number of two hundred and eighty two (282) frames.

Appendix B, entitled "Code Heading" contains two microfiche with a total number of eighty five (85) frames.

Appendix C, entitled "Theme Vector Code" contains one microfiche with a total number of sixty three (63) frames.

Appendix D, entitled "Content Indexing Code" contains one microfiche with a total number of seventy one (71) frames.

COPYRIGHT NOTICE

Appendices A, B, C and D contain material which is subject to copyright protection. The copyright owner has no objection to the facsimile reproduction by any one of the Appendices as they appear in the United States Patent and Trademark patent files or records, but otherwise reserves all copyright rights whatsoever.

FIELD OF THE INVENTION

The present invention relates to the field of classification, and more particularly to a knowledge catalog system.

BACKGROUND OF THE INVENTION

The ability to accurately define knowledge in terms of categories has a wide range of applications. For example, the ability to accurately classify documents based on the content of the document has application in document storage and retrieval systems. For example, the Library of Congress of the United States utilizes a document classification system to store and retrieve documents. Typically, such prior art classification systems are configured in fixed hierarchical structures. For such a system, a number of high level categories or subjects are defined. Beneath each of the high level categories are additional sub categories that break the high level category into more detailed categories. The more sub categories specified in the fixed hierarchical structure, then the more detailed the classification system becomes. A detailed prior art classification system may utilize up to ten hierarchical levels. For example, the Library of Congress classifies documents based on an average of nine or ten levels of sub categories within a particular area, topic or field of study.

In modern society, there is an increasing demand for use of vast amounts of information covering a wide range of topics. In order to best utilized the vast amounts of information, an accurate and detailed classification system is required for storage and retrieval of the information. However, due to the rigid nature and limitations in detail, prior art fixed hierarchical classification systems can not adequately classify vast amounts of information that covers a wide range of information. Therefore, a classification system that accurately classifies information in a wide range of topics is desirable. Furthermore, it is desirable to classify knowledge such that the classification system is independent of language and culture so that information derived from all parts of the world may be classified under a single system.

SUMMARY OF THE INVENTION

A knowledge catalog includes a plurality of independent and parallel static ontologies to accurately represent a broad coverage of concepts that define knowledge. Each static ontology contains a plurality of knowledge concepts for a particular area of knowledge. The knowledge concepts are arranged hierarchically such that knowledge concepts are organized from high level generalized concepts down to more specific concepts. The actual configuration, structure and orientation of a particular static ontology is dependent upon the subject matter or field of the ontology. Therefore, each ontology contains a different point of view. The static ontologies store all senses for each word and concept. In one embodiment, the static ontologies include, when applicable, a mass sense, a count sense, a noun form, and a nominal form. Although the static ontologies are broad to cover a wide range of knowledge concepts, they are not extremely detailed. In addition, the set of static ontologies do not contain concepts that are extremely volatile.

In one embodiment, the knowledge catalog further includes a dynamic level. The dynamic level adds details for the knowledge catalog by including additional words and terminology, arranged in a hierarchical structure, to permit a detailed and in-depth coverage of specific concepts contained in a particular discourse. Therefore, additional detailed concepts not contained in the static ontologies are included in the dynamic level. The static and dynamic ontologies are relational such that the linking of one or more ontologies, or portions thereof result in a very detailed organization of knowledge concepts.

In one embodiment, the knowledge catalog has application for use in a knowledge classification system. A knowledge catalog processor accesses the knowledge catalog to classify input terminology based on the knowledge concepts in the knowledge catalog. Because the static ontologies store all senses for each concept, the knowledge catalog processor returns all concepts or categories associated with the input terminology, unless a specific sense of an ambiguous term is specified. Furthermore, the knowledge catalog processor processes the input terminology prior to attachment in the knowledge catalog.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

DETAILED DESCRIPTION

KNOWLEDGE CATALOG

A knowledge catalog of the present invention provides a unique infrastructure to accurately represent concepts that define knowledge. The knowledge catalog includes a set of static ontologies to define knowledge. The knowledge catalog may be characterized as including several static ontologies because the knowledge catalog provides multiple views, characterizations, and organizations of concepts. As is explained below, the knowledge catalog contains a broad coverage of concepts to provide a world view of knowledge. The static ontologies are configured as hierarchical structures such that knowledge concepts are organized from high level generalized concepts down to more specific concepts. The static ontologies are parallel and independent of each other.

Figure 1:
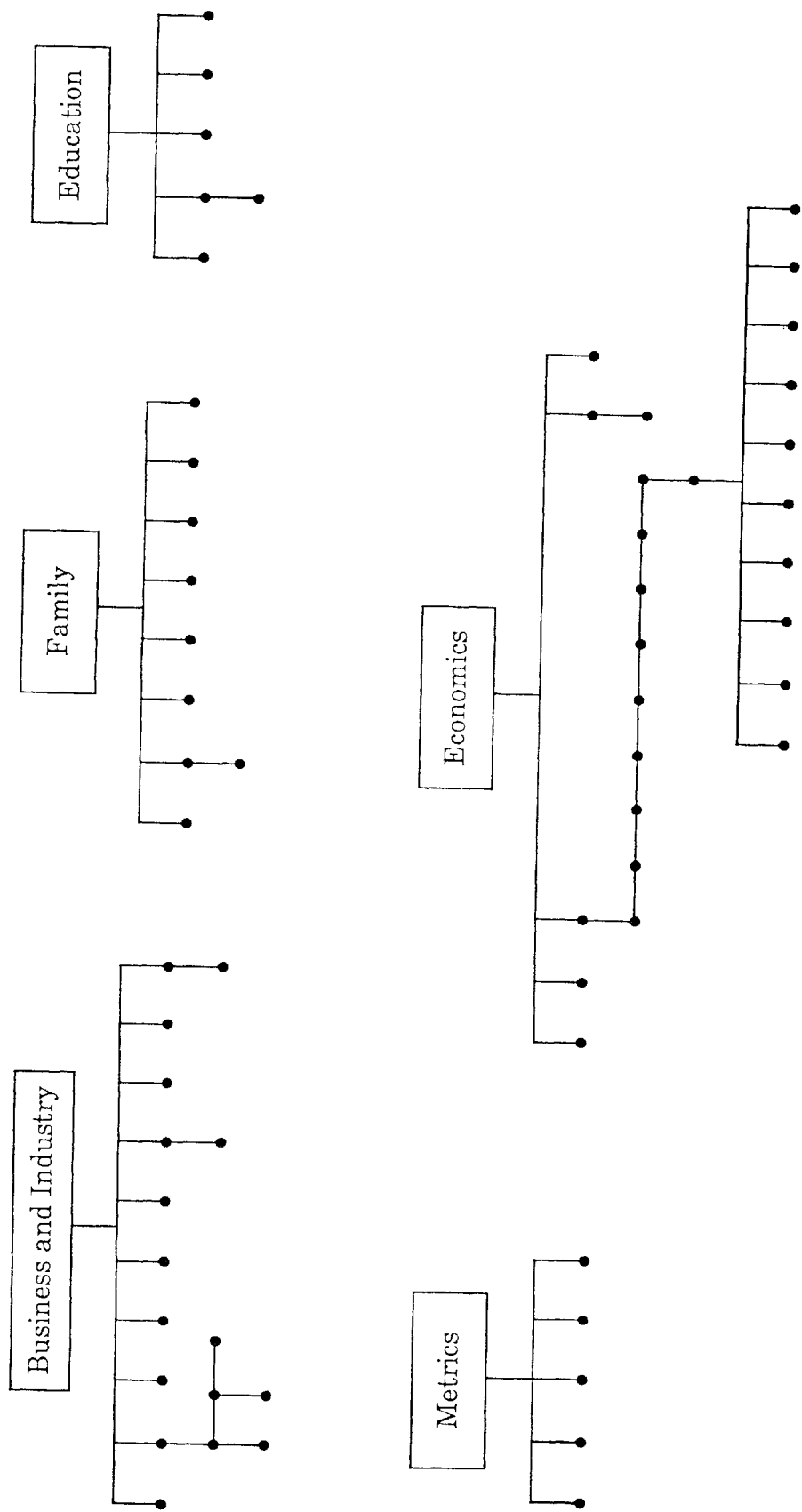
FIG. 1 illustrates several hierarchical structures for example static ontologies.

FIG. 1 illustrates several example static ontologies configured in accordance with one embodiment of the present invention. Specifically, FIG. 1 illustrates hierarchical structures for the "business and industry", "family", "education", "metrics", and "economics" static ontologies. As shown in FIG. 1, each static ontology contains a plurality of concepts, illustrated as nodes in the hierarchical structures for the respective static ontologies. For purposes of simplicity, the specific "concepts" are illustrated only as nodes. However, the specific concepts contained within each static ontology hierarchical structure are set forth below. The following list contains a plurality of static ontologies configured in accordance with the preferred embodiment of the present invention. Although this list provides a set of static ontologies for the preferred embodiment, modifications to the classification or concepts may be made without deviating from the spirit or scope of the invention.

| | |
|---|---|
| TT abstract_ideas_and_concepts | category |
| NT1 metrics | NT4 interiors@_internals@_insides_1788 |
| NT2 area_measurement | NT4 centrality@_being_at_the_center_1789 |
| NT2 distance_measurement | NT4 layers@_stages_1790 |
| NT2 mass_and_weight_measurement | NT4 coverings@_lids@_covering_1791 |
| NT2 volume_measurement | NT4 skins@_jackets_1792 |
| NT2 time_measurement | NT4 hair@_feathers_1793 |
| NT1 space_1348 | NT4 clothing@_garments_1794 |
| NT2 space_in_general_1365 | NT4 exposure@_undressing_1795 |
| NT3 abstract_space_1425 | NT4 environment@_encompassment_1796 |
| NT4 indefinite_spaces_1742 | NT4 definitions@_restrictions_1797 |
| NT3 specific_space_1426 | NT4 boundaries@_parameters_1798 |
| NT4 regions@_areas_1743 | NT4 enclosures@_enclosed_places_1799 |
| NT4 rural_areas_1745 | NT4 interpolation@_between_two_things@_interposition_1800 |
| NT4 urban_dwellings@_cities_1746 | NT4 intrusions@_invasions_1801 |
| NT3 relative_space_1427 | NT4 contrapositions@_opposites_1802 |
| NT4 general_locations@_positioning@_emplacing_1747 | NT4 front@_at_the_front_of@_frontward_locations_1803 |
| NT4 dislocation@_removal_1748 | NT4 rear@_at_the_rear_of@_rearward_locations_1804 |
| NT3 existence_in_space_1428 | NT4 side@_at_the_side_of@_sideways_locations_1805 |
| NT4 presence@_being_there_1749 | NT4 the_right_side@_starboard_1806 |
| NT4 absence_1750 | NT4 the_left_side@_port_1807 |
| NT4 inhabiting_1751 | NT2 structure_and_form_1367 |
| NT4 citizenship_1752 | NT3 general_form_1432 |
| NT4 populations@_communities_1753 | NT4 structure@_composition@_architecture_1808 |
| NT4 homes_1754 | NT4 forms@_shapes_1809 |
| NT4 rooms@_chambers_1755 | NT4 chaos@_confusion_1810 |
| NT4 containers@_receptacles_1756 | NT4 balance@_harmony_1811 |
| NT4 contents@_cargos_1757 | NT4 distortion@_mutilations_1812 |
| NT2 dimensions_1366 | NT3 special_form_1434 |
| NT3 general_dimensions_1429 | NT4 straightness_1813 |
| NT4 smallness_of_size_1759 | NT4 angularity@_angled_objects_1814 |
| NT3 sizes@_largness_of_size_313967 | NT4 curvature@_curved_objects_1815 |
| NT4 expansions@_increases_in_size_313968 | NT4 circularity@_circular_objects_1816 |
| NT4 contractions@_decreases_in_size_313969 | NT4 convolution@_complex_circular_objects_1817 |
| NT4 remoteness@_distances_313970 | NT4 sphere@_roundness_1818 |
| NT4 nearness@_closeness_279932 | NT3 superficial_form_1435 |
| NT4 intervals@_spaces_between_313971 | NT4 protuberances@_bulges_1819 |
| NT3 linear_directions_1430 | NT4 concavity@_excavation_1820 |
| NT4 breadth@_thickness_1767 | NT4 sharpness@_pointed_objects_1821 |
| NT4 narrowness@_thinness_1768 | NT4 bluntness@_not_sharp_1822 |
| NT4 filaments_1769 | NT4 smoothness_1823 |
| NT4 lowness_1771 | NT4 roughness_1824 |
| NT4 shallowness_1773 | NT4 notches_1825 |
| NT4 verticalness@_steepness_1776 | NT4 grooves@_scratches_1826 |
| NT4 horizontalness@_flatness_1777 | NT4 folds@_creases_1827 |
| NT4 pendency_1778 | NT4 openings@_passages@_making_openings@_puncturing_1828 |
| NT4 support@_supports@_braces@_furniture_1779 | NT4 closures@_barriers@_obstacles@_closing_1829 |
| NT4 shafts@_poles_1780 | NT2 motion_1368 |
| NT4 parallelism_1781 | NT3 motion_in_general_1436 |
| NT4 inclines@_diagonals_1782 | NT4 movement@_activity@_generalized_motions_1830 |
| NT4 inversions@_reversals_1783 | NT4 absence_of_motion_1831 |
| NT4 intercrossing@_intersection_1784 | NT4 speed@_velocity@_rate_of_motion_1832 |
| NT4 weaving@_fabrics_1785 | NT4 delay@_slowness@_slow_motions_1833 |
| NT4 sewing@_knitting_1786 | NT3 change_of_place_1437 |
| NT4 lengths@_longness_279966 | NT4 transporting@_motions_of_transfer_1834 |
| NT4 shortness@_brevity_313972 | NT4 vehicles_1835 |
| NT4 height@_highness_284254 | NT4 traveling_1836 |
| NT4 depths@_deepness_313973 | NT4 travelers_1837 |
| NT4 tops@_topsides_313974 | NT3 motion_conjoined_with_force_1438 |
| NT4 bottoms@_undersides_313975 | NT4 striking_motions@_impacts_1844 |
| NT3 external_and_internal_dimensions_1431 | NT4 reactions@_replies_1845 |
| NT4 exteriority_1787 | NT4 pushing_and_throwing_motions_1846 |
| | NT4 pulling_motions_1847 |

| | category |
|---|---|
| NT4 leverage@_mechanical_devices_of_moving_and_raising_1848 | NT4 toughness@_strength_1917 |
| NT4 motions_of_attraction@_magnets_1849 | NT4 brittleness@_fragility_1918 |
| NT4 motions_of_thrusting_away@_repelling_1850 | NT4 powderiness@_crumbliness_1919 |
| NT3 motion_with_reference_to_direction_1439 | NT4 texture@_surface_quality_313959 |
| NT4 compass_directions@_trends_1851 | NT4 weightiness@_mass_313960 |
| NT4 deviations@_motions_of_divergence_1852 | NT4 rarity@_insubstantiality_313961 |
| NT4 leading_1853 | NT4 softness@_pliancy_313962 |
| NT4 following_1854 | NT2 color_1374 |
| NT4 progress@_forward_motion_1855 | NT3 colors@_having_color_313804 |
| NT4 regression@_return@_backwards_motion_1856 | NT4 white_colors@_whiteness_1922 |
| NT4 approaching@_motion_towards_1857 | NT4 black_colors@_blackness_1923 |
| NT4 recessions@_withdrawals@_motion_away_from_1858 | NT4 gray_colors@_grayness_1924 |
| NT4 motions_of_convergence_1859 | NT4 brown_colors@_brownness_1925 |
| NT4 divergence@_motions_of_spreading_out@_deployments_1860 | NT4 red_colors@_redness_1926 |
| NT4 motions_of_arrival@_goals@_destinations_1861 | NT4 orange_colors@_orangeness_1927 |
| NT4 departures@_motions_of_leaving_1862 | NT4 yellow_colors@_yellowness_1928 |
| NT4 entrances@_entering_1863 | NT4 green_colors@_greenness_1929 |
| NT4 exits@_egress_1864 | NT4 blue_colors@_blueness_1930 |
| NT4 motions_of_insertion_1865 | NT4 purple_colors@_purpleness_1931 |
| NT4 motions_of_extraction@_distilling_1866 | NT4 colors@_colorfulness_313963 |
| NT4 reception@_taking_in_1867 | NT4 lack_of_color@_colorlessness_313964 |
| NT4 eating@_drinking@_nutrition_1868 | NT4 variegation@_multicoloredness_313965 |
| NT4 motions_of_expulsion_1871 | NT1 matter_1349 |
| NT4 excretions@_discharges_1872 | NT2 matter_in_general_1375 |
| NT4 secretions_1873 | NT3 matter_in_general@_substance_313808 |
| NT4 surplus@_excess_1874 | NT4 universe@_heavens_1933 |
| NT4 shortages@_falling_short_1875 | NT4 materiality_1934 |
| NT4 ascents@_upward_motions_1876 | NT4 intangibles@_otherworldliness@_the_supernatural_1935 |
| NT4 downward_motions@_descents_1877 | NT4 materials@_building_materials_1936 |
| NT4 raising@_lifting_1878 | NT2 inorganic_matter_1376 |
| NT4 lowering@_sinking@_depressing_1879 | NT3 liquids_1442 |
| NT4 leaping_1880 | NT4 liquids@_fluids_1943 |
| NT4 plunging@_submerging_1881 | NT4 semiliquidity_1944 |
| NT4 circling@_orbiting@_meandering_1882 | NT4 pulpiness@_pastiness_1945 |
| NT4 rotational_movements_1883 | NT4 liquidization@_dissolving_1946 |
| NT4 oscillations@_vibrations_1884 | NT4 moisture@_humidity_1947 |
| NT4 irregular_movement@_perturbations@_spasms_1885 | NT4 dryness@_aridness@_absence_of_water_1948 |
| NT1 physics_1052 | NT3 vapors_1443 |
| NT2 heat_in_general_313822 | NT4 vapors@_gases_1956 |
| NT3 heat_1369 | NT4 bubbles@_bubbling@_effervescence_1959 |
| NT4 heat@_temperature_1888 | NT2 organic_matter_1377 |
| NT4 heating_1889 | NT3 vitality_1445 |
| NT4 cold@_freezing_1892 | NT4 life@_living_1961 |
| NT2 light_1370 | NT4 death@_dying_1962 |
| NT3 lights@_lightness_313807 | NT4 killing@_bloodshed_1963 |
| NT4 lighting@_illumination_1894 | NT4 burials@_funerals@_burying_1964 |
| NT4 light_sources_1895 | NT3 mankind_1448 |
| NT4 darkness@_dimness_1896 | NT4 mankind@_humanity_1969 |
| NT4 shades@_filters_1897 | NT4 races@_cultures_1970 |
| NT4 transparency@_transparent_objects@_glasses_1898 | NT3 male_and_female_1449 |
| NT4 semitransparency_1899 | NT4 sexes@_genders_1971 |
| NT4 opaqueness_1900 | NT4 masculinity_1972 |
| NT2 mechanics_1372 | NT4 femininity_1973 |
| NT3 mechanics@_machines_313809 | NT1 sensation_1350 |
| NT4 automation_1907 | NT2 sensation_in_general_1378 |
| NT4 friction@_wear@_polishing@_rubbing_1908 | NT3 feelings_in_general@_sensations_313815 |
| NT2 physical_properties_1373 | NT4 sensations@_feelings_1974 |
| NT3 properties_of_physical_objects_313810 | NT4 lack_of_physical_feelings_1975 |
| NT4 lightness@_buoyancy_1911 | NT4 pain@_suffering_1976 |
| NT4 density@_congestion_1912 | NT2 touch_in_general_313818 |
| NT4 hardness@_rigidity_1914 | NT3 touch_1379 |
| NT4 elasticity@_resilience_1916 | NT4 the_sense_of_touch@_touching_1977 |

| category |
|---|
| NT4 sensations of touch 1978 |
| NT2 taste in general 313817 |
| NT3 taste 1380 |
| NT4 the sense of taste 1979 |
| NT4 mouth-watering tastes 1980 |
| NT4 disagreeable tastes 1981 |
| NT4 lack of flavor 1982 |
| NT4 sweetness 1983 |
| NT4 sourness 1984 |
| NT4 strong flavor@ spiciness 1985 |
| NT2 smell in general 313816 |
| NT3 smell 1381 |
| NT4 odors 1987 |
| NT4 fragrances@ perfumes 1988 |
| NT4 bad smells 1989 |
| NT4 odorlessness 1990 |
| NT2 sight in general 313821 |
| NT3 sight 1382 |
| NT4 sense of sight 1991 |
| NT4 defective vision@ blindness 1992 |
| NT4 blindness 1993 |
| NT4 witnesses@ audiences@ onlookers 1994 |
| NT4 visibility@ capable of being seen 1995 |
| NT4 invisibility 1996 |
| NT4 appearances 1997 |
| NT4 disappearance 1998 |
| NT2 hearing 1383 |
| NT3 perception of sound 1450 |
| NT4 sense of hearing 1999 |
| NT4 deafness 2000 |
| NT3 sound 1451 |
| NT4 sounds@ noises 2001 |
| NT4 silence 2002 |
| NT4 faintness of sound 2003 |
| NT4 loudness 2004 |
| NT3 specific sounds 1452 |
| NT4 resonance 2005 |
| NT4 repeated sounds 2006 |
| NT4 explosive noises 2007 |
| NT4 hissing sounds 2008 |
| NT4 shrill sounds@ harsh sounds 2009 |
| NT4 cries@ calls@ exclamations 2010 |
| NT4 animal sounds 2011 |
| NT3 unmusical sounds 1453 |
| NT4 dissonant sounds@ out of tune@ sounds that clash 2012 |
| NT3 musical sounds 1454 |
| NT4 music 1148 |
| NT4 harmonics@ music theory 2013 |
| NT1 intellect 1351 |
| NT2 intellectual faculties and processes 1184 |
| NT3 faculties 1455 |
| NT4 intellect@ reason 2015 |
| NT4 intelligence@ wisdom 2016 |
| NT4 philosophers@ thinkers 2017 |
| NT4 stupidity@ acting unintelligently@ mental retardation 2018 |
| NT4 foolishness 2019 |
| NT4 fools 2020 |
| NT4 healthy minds 2021 |
| NT4 unhealthy minds 2022 |
| NT4 eccentricities@ idiosyncrasies 2023 |
| NT3 comprehension 1456 |
| NT4 knowledge@ information 2024 |
| NT4 intellectuals@ scholars 2025 |
| NT4 ignorance@ the unknown 2026 |
| NT3 functions of the mind 1457 |
| NT4 thoughts@ ideas@ thinking@ reasoning 2027 |
| NT4 ideas@ notions@ impressions 2028 |
| NT4 absence of thought 2029 |
| NT4 intuition@ insight 2030 |
| NT3 reasoning processes 1458 |
| NT4 reasoning@ logic 2031 |
| NT4 sophistry@ deceptive reasoning 2032 |
| NT3 consideration 1459 |
| NT4 topics@ subjects 2033 |
| NT4 questioning@ examinations@ investigations@ surveillance 2034 |
| NT4 answers@ replies 2035 |
| NT4 solutions@ outcomes 2036 |
| NT4 discoveries@ discovering 2037 |
| NT3 assessment 1460 |
| NT4 experiments@ tests@ experimental methods 2038 |
| NT4 measurements@ estimations@ measuring 2039 |
| NT4 comparisons@ correlations 2040 |
| NT4 powers of analysis@ distinctions 2041 |
| NT4 casual judgements@ imprudence 2042 |
| NT3 conclusion 1461 |
| NT4 judgements@ opinions@ appraisals 2043 |
| NT4 prejudgements@ prejudging@ preconceptions 2044 |
| NT4 misjudgments 2045 |
| NT4 overestimation@ exaggeration 2046 |
| NT4 underestimation@ depreciation 2047 |
| NT3 theory 1462 |
| NT4 theories@ suppositions@ speculations 2048 |
| NT3 philosophy 26 |
| NT3 belief 1463 |
| NT4 beliefs@ hopes@ systems of belief 2049 |
| NT4 credulity@ blind faith 2050 |
| NT4 unbelief@ denial@ disbelief 2051 |
| NT4 skepticism 2052 |
| NT3 grounds for belief 1464 |
| NT4 evidence@ proof 2053 |
| NT4 disproving@ rebuttals 2054 |
| NT3 qualifications 1465 |
| NT4 limitations@ specifications 2055 |
| NT4 explicitness 2056 |
| NT4 possibility@ likelihood@ feasibility 2057 |
| NT4 impossibility 2058 |
| NT4 probability@ expectations 2059 |
| NT4 improbability 2060 |
| NT4 certainty@ truth 2061 |
| NT4 uncertainty@ chance 2062 |
| NT4 gambles@ risks@ gambling 2063 |
| NT3 conformity to fact 1466 |
| NT4 truth@ reality 2064 |
| NT4 maxims@ proverbs 2065 |
| NT4 errors@ illusions 2066 |
| NT4 illusions@ deceptions 2067 |
| NT4 disillusionment 2068 |
| NT3 acceptance 1467 |
| NT4 assent@ agreement 2069 |
| NT4 dissent@ diversity@ objections 2070 |
| NT4 assertions@ declarations@ guarantee 2071 |
| NT4 negations@ denials 2072 |
| NT2 states of mind 1385 |
| NT3 mental attitudes 1468 | category

| | |
|---|---|
| NT4 attitudes@_viewpoints@_moods_2073 | NT3 style@_mode_of_expression_1479 |
| NT4 broad-mindedness_2074 | NT4 rhetoric_2135 |
| NT4 bigotry@_prejudice_2075 | NT4 clear_language_usage_2136 |
| NT4 curiosity_2076 | NT4 unclear_language_use_2137 |
| NT4 boredom@_detachment@_lack_of_curiosity_2077 | NT4 plain_speech_2138 |
| NT4 attentiveness@_concern@_undivided_attention_2078 | NT4 economy_of_language@_abbreviations@_epigrams_2139 |
| NT4 thoughtlessness@_negligence_2079 | NT4 wordiness@_verbosity_2140 |
| NT4 distraction@_confusion_2080 | NT3 spoken_language_1480 |
| NT4 carefulness@_vigilance@_thoroughness_2081 | NT4 oral_language@_talking_2141 |
| NT4 neglect@_carelessness_2082 | NT4 talkativeness_2143 |
| NT3 creative_thought_1469 | NT4 conversations@_discussions_2144 |
| NT4 creative_thought@_imagination@_originality_2083 | NT4 soliloquies@_monologues_2145 |
| NT4 lack_of_imagination@_practicality_2084 | NT4 public_speaking@_oratory_2146 |
| NT3 recollection_1470 | NT4 speaking_well@_eloquence_of_speech_2147 |
| NT4 remembering@_memories_2085 | NT4 pompous_remarks_2148 |
| NT4 forgetfulness_2086 | NT3 written_language_1481 |
| NT3 anticipation_1471 | NT4 correspondence@_letters_2151 |
| NT4 expectations@_optimism_2087 | NT3 uncommunicativeness@_secrecy_1483 |
| NT4 surprise@_astonishment_2088 | NT4 uncommunicativeness_2157 |
| NT4 frustrations@_defeats@_disappointments_2089 | NT4 secrecy@_privacy_2158 |
| NT4 looking_ahead@_prudence@_foreknowledge_2090 | NT4 hiding@_hiding_places_2159 |
| NT4 predictions@_forecasts_2091 | NT3 falsehood_1484 |
| NT4 warnings@_omens_2092 | NT4 lies@_insincerity@_dishonesty@_hypocrisy_2160 |
| NT2 communication_of_ideas_1386 | NT4 exaggerations@_exaggerating_2161 |
| NT3 nature_of_ideas_communicated_1472 | NT4 deceptions@_illusions_2162 |
| NT4 significance@_meaning_2093 | NT4 deceivers@_imposters_2163 |
| NT4 implications@_inferences_2094 | NT4 dupes_2164 |
| NT4 nonsense_2095 | NT1 volition_1352 |
| NT4 intelligibility_2096 | NT2 volition_in_general_1387 |
| NT4 complexity@_obscurity@_enigmas_2097 | NT3 will_in_general_313820 |
| NT4 double_meanings_2098 | NT4 will_1485 |
| NT4 figures_of_speech_2099 | NT4 willingness_2165 |
| NT4 interpretations@_versions_2100 | NT4 unwillingness_2166 |
| NT3 distortions@_errors_2101 | NT3 resolution@_determination_1486 |
| NT4 modes_of_communication_1473 | NT4 resolve@_tenacity@_will-power_2167 |
| NT4 communication@_exchange_of_ideas_2102 | NT4 perseverance@_stamina_2168 |
| NT4 manifestations@_displays_2103 | NT4 stubbornness_2169 |
| NT4 disclosures@_confessions_2104 | NT3 irresolution@_caprice_1487 |
| NT4 information_data@_inside_information_2105 | NT4 indecisiveness_2170 |
| NT4 publications@_announcements@_statements_2107 | NT4 second-thoughts@_flip-flops_2171 |
| NT4 messengers@_announcers_2109 | NT4 caprice@_on_the_spur_of_the_moment_2172 |
| NT3 education_135 | NT4 impulses@_urges@_automatic_responses_2173 |
| NT4 instructions@_directions@_teaching_2110 | NT3 evasion_1488 |
| NT4 misteaching@_propaganda_2111 | NT4 avoidance@_evasion_2174 |
| NT4 learning@_education_2112 | NT4 escapes@_loopholes_2175 |
| NT4 teachers@_masters@_instructors_2113 | NT4 abandonment@_surrendering_2176 |
| NT4 students@_disciples_2114 | NT3 inclination_1489 |
| NT3 representation_1475 | NT4 desires@_preferences_2177 |
| NT4 indications_1474 | NT4 eagerness_2178 |
| NT4 indications_signs@_indicators_2116 | NT4 indifference@_apathy_2179 |
| NT4 badges@_emblems@_uniforms_2117 | NT3 choice_1490 |
| NT4 records@_documents@_reports@_logbooks_2118 | NT4 choices@_options_2180 |
| NT4 recorders@_librarians@_historians_2119 | NT4 rejections@_denials_2181 |
| NT3 representations@_depictions_2120 | NT4 requirements@_necessity@_inevitability_2182 |
| NT4 misrepresentation@_injustices_2121 | NT4 predestination@_fate@_determinism_2183 |
| NT3 language_1478 | NT3 plans@_schedules_2184 |
| NT4 languages@_speech_acts@_language_2127 | NT3 custom_1491 |
| NT4 letters@_characters_2128 | NT4 customs@_habits_2185 |
| NT4 words_2129 | NT4 inexperience_2186 |
| NT4 terminology@_assigning_names_2130 | NT4 fashions@_novelties@_fads_2187 |
| NT4 anonymity_2111 | NT4 social_conventions_2188 |
| NT4 phrases@_expressions_2132 | NT4 formalities@_ceremonies@_rituals_2189 |

-11- category

NT4 informality_2190
NT3 motive_1492
NT4 motivations@_inducements_2191
NT4 pretexts@_excuses_2192
NT4 allurements@_enticements_2193
NT4 bribery_2194
NT4 warnings@_warning@_intimidation@_talking_out_of_2195
NT3 purpose_1493
NT4 intentions@_objectives_2196
NT4 plans@_arrangements_2197
NT4 hunting@_tracking_2198
NT4 activities@_occupations@_hobbies_2199
NT3 ways_and_means_1494
NT4 routes@_methods_2200
NT4 resources@_tools_2201
NT4 provisioning@_equipping@_providing_2202
NT4 storage@_places_of_storage_2203
NT4 enough@_plenty@_abundance_2204
NT4 inadequacy@_shortage@_not_enough_2205
NT4 excess@_saturation@_too_much_2206
NT4 overdose@_saturation@_much_too_much_2207
NT3 use_1495
NT4 uses@_applications_2208
NT4 consumption@_depletion@_expenditures_2209
NT4 misuse@_abuse_2210
NT4 obsolescence@_castoffs@_throwaways_2211
NT4 uselessness@_garbage_2212
NT2 conditions_1388
NT3 adaptation_to_ends_1496
NT4 expedience@_means_to_an_end_2213
NT4 wrongness@_disadvantages_2214
NT4 importance@_significance_2215
NT4 trivia@_insignificance_2216
NT4 goodness_2217
NT4 badness_2218
NT4 afflictions@_torments@_poisons_2219
NT4 perfection_2220
NT4 imperfection_2221
NT4 blemishes@_deformities_2222
NT4 mediocrity_2223
NT3 wholesomeness_1497
NT4 cleanness@_sanitation@_washing_2224
NT4 dirtiness@_squalor_2225
NT4 hygiene_2226
NT3 physical_progress_1499
NT4 improvements@_progress@_reforms_2233
NT4 impairment@_deterioration_2234
NT4 destruction@_ruin_2235
NT4 restoration@_improvement_2236
NT4 rejuvenation@_renewal_2237
NT4 relapses@_setbacks_2238
NT3 security_1500
NT4 dangers@_crises_2239
NT4 safety@_security_2240
NT4 safekeeping@_insurance@_protection_2241
NT4 sanctuaries@_shelters_2242
NT4 preservation@_conservation_2243
NT4 rescue@_release_2244
NT4 warnings@_notices_2245
NT4 alarms@_alerts_2246
NT3 health_48855
NT4 health@_fitness@_wellness_2228
NT4 remedies@_medicinal_drugs_2229
NT4 therapy@_treatments_2231
NT3 voluntary_actions_1389
NT2 voluntary_actions_1389
NT3 action_1501
NT4 actions@_operations@_voluntary_actions_2247
NT4 inaction@_inertia@_voluntary_inaction_2248
NT4 activity@_proceedings@_doers_2249
NT4 inactivity@_inaction@_nonworkers_2250
NT4 haste@_speed_2251
NT4 leisure@_repose_2252
NT4 relaxation@_vacations_2253
NT4 sleeping@_hypnosis_2254
NT4 wakefulness@_insomnia_2255
NT3 exertion@_endeavor_1502
NT4 endeavors@_trying_one's_best_2256
NT4 projects@_ventures@_missions_2257
NT4 exertion@_energy_2258
NT4 fatigue@_strain_2259
NT4 workers@_doers_2260
NT4 places_of_employment@_workshops_2261
NT3 preparation_1503
NT4 preparation@_planning_2262
NT4 vulnerability@_negligence_2263
NT3 accomplishment_1504
NT4 accomplishment@_completion_313801
NT4 leaving_it_undone@_loose_ends@_noncompletion_2264
NT4 success@_victory_2265
NT4 failures@_defeats_2266
NT4 victories@_conquests_2267
NT4 defeats@_collapses@_defeating_2268
NT4 prosperity@_success_2269
NT4 adversity@_disaster_2270
NT4 hindrance@_resistance@_hindering_2271
NT4 difficulties@_troubles_2272
NT4 ease_of_accomplishment@_effortlessness_2273
NT3 skills_1505
NT4 skills@_abilities_2274
NT4 incompetence@_ignorance@_inexperience_2275
NT4 cleverness@_strategies_2276
NT4 naivety@_innocence_2277
NT3 conduct_1506
NT4 behavior_2278
NT4 misbehavior_2279
NT2 authority@_control_1390
NT3 prerogative_1507
NT4 authority@_competence_2280
NT4 lawlessness@_anarchy_2281
NT3 politics_and_government_1508
NT4 government@_management_2282
NT4 politics_556
NT4 politicians_2286
NT3 direction_1509
NT4 direction@_management_2287
NT4 directors@_overseers@_guidebooks_2288
NT4 masters@_patrons@_rulers@_military_officers_2289
NT4 servants@_employees_2290
NT3 directions_1510
NT4 precepts@_rules_2291
NT4 commands@_orders_2292
NT4 demands@_stipulations_2293
NT4 advice@_proposals@_suggestions_2294
NT4 councils@_committees_2295 category

NT3 constraint_1511
NT4 compulsion@ necessity_2296
NT4 strictness@ discipline_2297
NT4 laxness@ imprecision_2298
NT4 leniency@ mercy@ indulgence_2299
NT3 restraint_1512
NT4 restraint@ inhibition_2300
NT4 confinement@ isolation_2301
NT3 unrestraint_1513
NT4 freedom@ rights_2302
NT4 liberation@ rescue_2303
NT3 subjugation_1514
NT4 domination@ control_2304
NT3 compliance_1515
NT4 submission@ compliance_2305
NT4 obedience@ service_2306
NT4 disobedience@ rebelliousness_2307
NT4 observance@ practice@ compliance_2308
NT4 nonobservance_2309
NT3 pledge_1516
NT4 promises@ assurances_2310
NT4 contracts@ agreements@ understandings_2311
NT4 guarantees@ deposits@ pledges_2312
NT3 proposal_1517
NT4 offers@ bids_2313
NT4 requests@ petitions_2314
NT3 consent_1518
NT4 consenting@ agreement@ willingness@ permission_2315
NT4 refusal@ rejection@ repudiation_2316
NT4 permission@ authorization_2317
NT4 forbidding@ refusing@ prohibition_2318
NT4 repealing@ rescinding@ cancellation_2319
NT3 commission_1519
NT4 commissioning@ delegating_2320
NT4 deputies@ agents@ proxies_2321
NT4 promotions@ upgrades_2322
NT4 demotions@ downgrades_2323
NT4 retirement_from_position_of_authority_2324
NT2 support_and_opposition_1391
NT3 support_1520
NT4 aid@ support@ patronage_2325
NT4 cooperation@ harmony_2326
NT4 associates@ companions_2327
NT4 associations@ societies@ coalitions_2328
NT3 opposition_1521
NT4 opposition@ contention@ hostility_2330
NT4 opponents@ adversaries@ enemies_2331
NT4 resistance@ defiance_2332
NT4 defiance@ arrogance_2333
NT3 concord_1522
NT4 accord@ rapport@ harmonious_relationships_2334
NT4 disharmony@ conflicts@ strained_relationships_2335
NT3 contention_1523
NT4 contention@ competition@ martial arts_2336
NT4 warfare_1256
NT4 attacks@ assaults@ offensive_warfare_2337
NT4 defenses@ defensive_warfare_2338
NT4 combatants_2339
NT4 battlegrounds@ theaters_of_operations_2341
NT3 peace_1524
NT4 peace@ nonviolence_2342
NT4 pacification@ disarmament@ demilitarization_2343

NT4 mediation@ intervention@ peacemakers_2344
NT3 mid-course_1525
NT4 neutrality@ impartiality_2345
NT4 compromises@ settlements@ give-and-take_2346
NT2 possessive_relations_1392
NT3 possession_1526
NT4 possessing@ owning@ ownership_2347
NT4 possessors@ owners_2348
NT4 property@ real_estate_2349
NT4 acquisition@ profits_2350
NT4 loss@ losses@ waste_2351
NT4 retention@ keeping_2352
NT4 relinquishment@ disposal_2353
NT3 sharing_1527
NT4 participation@ sharing@ partnership_2354
NT4 apportionment@ budgeting@ earmarking_2355
NT3 transfer_of_property_1528
NT4 transfer_of_property_or_right_313819
NT4 donations@ endowments@ giving_2356
NT4 receiving@ getting@ inheritance_2357
NT4 lending@ loans_2358
NT4 borrowing@ money-raising_2359
NT3 appropriation_1529
NT4 taking@ takeovers_2360
NT4 restitution@ reparations_2361
NT4 theft_2362
NT4 thieves_2363
NT4 illicit_businesses@ blackmarkets@ organized_crime_2364
NT3 interchange_of_property_1530
NT4 commerce@ economics_2365
NT4 purchases@ buying_2366
NT4 sales@ selling@ merchandising@ marketing_2367
NT3 monetary_relations_1531
NT4 money@ currency_2373
NT4 finances@ investments_2374
NT4 wealth@ riches_2375
NT4 poverty_2376
NT4 financial_credit@ borrowing_power_2377
NT4 debts@ liabilities_2378
NT4 payments@ settlements_2379
NT4 nonpayment@ defaulting@ bankruptcy_2380
NT4 expenditures@ disbursements@ spending_2381
NT4 receipts@ income_2382
NT4 accounts@ assets_2383
NT4 prices@ fees@ taxes_2384
NT4 discounts@ reductions_2385
NT4 expensiveness@ high_prices_2386
NT4 cheapness@ low_prices_2387
NT4 no_charge@ gifts_2388
NT4 economy@ cost-effectiveness_2389
NT4 stinginess@ hoarding_2390
NT4 generosity_2391
NT4 overgenerosity@ wastefulness_2392
NT1 affections_1353
NT2 personal_affections_1393
NT3 emotion_1532
NT4 feelings@ emotions_2393
NT4 lack_of_feelings_2394
NT3 exitability_1533
NT4 excitement@ exhilaration@ thrills_2395
NT4 inexcitability@ stoicism_2396
NT4 nervousness_2397

| category | |
|---|---|
| NT4 calmness@ nerves_of_steel_2398 | NT4 honor@ glory_2453 |
| NT4 patience_2399 | NT4 titles@ honors@ academic_degrees_2454 |
| NT4 impatience_2400 | NT4 the_aristocracy_2455 |
| NT3 pleasure_and_pleasurableness_1534 | NT4 the_common_person_2456 |
| NT4 pleasantness_2401 | NT3 contemplative_esteem_1540 |
| NT4 unpleasantness_2402 | NT4 sense_of_wonder_2457 |
| NT4 pleasure@ enjoyment@ happiness_2403 | NT4 composure_2458 |
| NT4 discontent@ unhappiness@ torture_2404 | NT2 sympathetic_affections_1394 |
| NT4 hatred@ loathing@ disapproval_2405 | NT3 social_relations_1541 |
| NT4 contentment_2406 | NT4 friendliness_2459 |
| NT4 discontent@ dissatisfaction_2407 | NT4 unfriendliness_2460 |
| NT4 cheerfulness_2408 | NT4 seclusion@ withdrawal@ solitude_2461 |
| NT4 solemnity@ seriousness_2409 | NT4 hospitality@ greetings_2462 |
| NT4 sadness_2410 | NT3 inhospitality_2463 |
| NT4 sorrow@ regretting_2411 | NT3 social_affection_1542 |
| NT4 unregretfulness_2412 | NT4 friendship_2464 |
| NT1 lamentation@ grieving_2413 | NT4 friends_2465 |
| NT4 rejoicing@ laughing_2414 | NT4 enmity@ hatred_2466 |
| NT4 celebrating@ festivities_2415 | NT4 hatred@ bigotry_2467 |
| NT4 amusements@ entertainments@ sports@ games_2416 | NT4 love@ affection@ devotion_2468 |
| NT4 dancing_2417 | NT4 lovemaking_2469 |
| NT4 humor_2418 | NT4 marriage_2470 |
| NT4 wit@ humor_2419 | NT4 celibacy_2471 |
| NT4 joking@ kidding@ teasing_2420 | NT4 loss_of_a_spouse_2472 |
| NT4 dullness@ unoriginality@ cliches_2421 | NT3 civility_1543 |
| NT4 tedium@ monotony_2422 | NT4 courtesy_2473 |
| NT4 aggravations_2423 | NT4 discourtesy@ rudeness_2474 |
| NT4 relief@ feelings_of_relief_2424 | NT3 benevolence_1544 |
| NT4 comfort@ contentment_2425 | NT4 kindness@ acts_of_kindness_2475 |
| NT3 anticipative_emotions_1535 | NT4 brutality@ acts_of_brutality@ cruelty_2476 |
| NT4 hopes@ desires@ hopefulness_2426 | NT4 antisocial_attitudes_2477 |
| NT4 hopelessness_2427 | NT4 public_spirit@ citizenship_2478 |
| NT3 concern_1536 | NT4 benefactors@ liberators_2479 |
| NT4 anxiety_2428 | NT4 criminals@ delinquents_2480 |
| NT4 fears@ misgivings_2429 | NT3 sympathy_1545 |
| NT4 cowardice_2430 | NT4 pity@ sympathy_2481 |
| NT4 courage_2431 | NT4 lack_of_pity@ ruthlessness_2482 |
| NT4 rashness@ recklessness_2432 | NT4 comforting@ sharing_of_grief_2483 |
| NT4 caution@ cautiousness_2433 | NT4 forgiveness@ kindness_2484 |
| NT3 discriminative_affections_1537 | NT4 congratulations@ compliments@ good_wishes_2485 |
| NT4 exacting@ fussy@ perfectionism_2434 | NT3 gratefulness_1546 |
| NT4 good_taste@ tastefulness_2435 | NT4 gratitude_2486 |
| NT4 vulgarity@ rudeness_2436 | NT4 ungratefulness_2487 |
| NT4 ugliness_2437 | NT3 ill_humor_1547 |
| NT4 beauty@ charm_2438 | NT4 ill_humor@ grumpiness_2488 |
| NT4 ornamentation@ decorations@ ornaments_2439 | NT4 resentment@ anger_2489 |
| NT4 plainness@ naturalness@ simplicity_2440 | NT4 selfish_resentment_1548 |
| NT4 affectation@ pretense@ hypocrisy_2441 | NT4 jealousy_2490 |
| NT4 ostentation@ showiness@ luxuriousness_2442 | NT4 envy_2491 |
| NT3 affections_of_ego_313814 | NT3 reprisal_1549 |
| NT4 pride_1538 | NT4 retaliation_2492 |
| NT4 humility@ humiliation_2443 | NT4 revenge_2493 |
| NT4 servility@ submissiveness@ ingratiation_2444 | NT2 morality_1395 |
| NT4 modesty_2445 | NT3 morals_1550 |
| NT4 vanity@ egotism_2446 | NT4 ethics@ morals_2494 |
| NT4 boasting_2447 | NT4 the_right_thing@ goodness@ decorum@ human_rights_2495 |
| NT4 blustering@ bravado_2448 | NT4 wrong_2496 |
| NT4 arrogance_2449 | NT3 moral_obligation_1551 |
| NT4 insolence_2450 | NT4 entitlements@ what_one_deserves_2497 |
| NT3 esteem_1539 | NT4 false_claims@ what_one_does_not_deserve_2498 |
| NT4 reputation@ fame_2451 | NT4 duty@ moral_obligations_2499 |
| NT3 dishonor@ degradation_2452 | NT4 impositions@ demands_2500 |

- 15 -

| category |
|---|
| NT3 moral_sentiments_1552 |
| NT4 respect@ appreciation_2501 |
| NT4 disrespect@ ridicule_2502 |
| NT4 contempt_2503 |
| NT4 ridicule_2504 |
| NT4 approval@ endorsement@ compliments_2505 |
| NT4 disapproval@ censure@ criticism_2506 |
| NT4 flattery_2507 |
| NT4 disparagement@ verbal_abuse_2508 |
| NT4 curses@ oaths@ obscene_language_2509 |
| NT4 threats@ menaces_2510 |
| NT3 moral_conditions_1553 |
| NT4 honesty@ integrity@ loyalty_2511 |
| NT4 dishonesty@ treachery@ unfaithfulness_2512 |
| NT4 justice@ fairness@ impartiality_2513 |
| NT4 injustice@ unfairness@ favoritism_2514 |
| NT4 selfishness_2515 |
| NT4 unselfishness@ altruism_2516 |
| NT4 virtues@ morals_2517 |
| NT4 vice@ evil_2518 |
| NT4 wrongdoing@ misconduct@ sin_2519 |
| NT4 guilt_2520 |
| NT4 innocence_2521 |
| NT4 good_people@ gentlemen@ ladies_2522 |
| NT4 bad_people@ criminals_2523 |
| NT3 moral_practice_1554 |
| NT4 sensuality_2524 |
| NT4 sexual_innocence_2525 |
| NT4 promiscuity@ loss_of_sexual_innocence_2526 |
| NT4 indecency@ immodesty@ earthiness@ obscene_2527 |
| NT4 asceticism@ self_denial_2528 |
| NT4 self-restraint@ self-control@ alcohol-free_2529 |
| NT4 self-indulgence_2530 |
| NT4 greed_2531 |
| NT4 fasting_2532 |
| NT4 intoxication@ drunkenness@ alcoholic_beverages_2533 |
| NT4 sobriety_2534 |
| NT3 moral_observance_1555 |
| NT4 accusations@ complaints@ indictments_2542 |
| NT4 justification@ vindication_2543 |
| NT4 acquittal@ exoneration_2544 |
| NT4 condemnation@ guilty_verdicts_2545 |
| NT4 penalties@ punishments_2546 |
| NT4 disciplinary_measures@ punishment_2547 |
| NT4 atonement@ reparation@ restitution_2549 |
| NT2 religion_30 |
| NT3 supernatural_beings_1556 |
| NT4 deities@ god_2550 |
| NT4 angels@ saints_2552 |
| NT4 evil_spirits_2553 |
| NT4 ghosts_2554 |
| NT3 religious_beliefs_1558 |
| NT4 theology@ religion_2560 |
| NT4 orthodoxy@ traditionalism_2561 |
| NT4 unorthodoxy@ heresy_2562 |
| NT3 religious_quality_1559 |
| NT4 sanctity@ holiness_2563 |
| NT4 the_profane_2564 |
| NT3 religious_sentiments_1560 |
| NT4 piety@ religion_2565 |
| NT4 sanctimony@ hypocrisy_2566 |
| NT4 impiety@ atheism_2567 |
| NT4 atheism@ agnosticism_2568 |
| NT3 religious_practice_1561 |
| NT4 worship@ devotion_2569 |
| NT4 idolatry@ paganism_2570 |
| NT3 supernaturalism_1562 |
| NT4 occultism_2571 |
| NT4 sorcery@ magic_2572 |
| NT4 magic_spells@ charms_2573 |
| NT3 churchdom_1563 |
| NT4 laity_2576 |
| NT4 religious_rites_2577 |
| NT3 supernatural_regions_1557 |
| NT1 abstract_relations_1355 |
| NT2 relation_1356 |
| NT3 absolute_relation_1401 |
| NT4 relationships@ relevance@ pertinence_1572 |
| NT4 unrelatedness@ irrelevance@ inapplicability_1573 |
| NT4 family_relationships_1574 |
| NT4 marital_relationships_1575 |
| NT4 correlations@ interrelationships_1576 |
| NT4 identity@ indistinguishability@ carbon_copy_1577 |
| NT4 opposition@ opposites_1578 |
| NT4 differences@ differentiations@ distinctions_1579 |
| NT4 uniformity@ homogeneity_1580 |
| NT4 nonuniformity@ diversification_1581 |
| NT4 variety@ diversity_1582 |
| NT3 partial_relation_1402 |
| NT4 similarities@ approximations_1583 |
| NT4 dissimilarities@ contrasts_1584 |
| NT4 imitations@ counterfeits_1585 |
| NT4 originality@ newness@ uniqueness_1586 |
| NT4 representation@ reproductions@ duplicates_1587 |
| NT4 models@ patterns@ examples_1588 |
| NT3 correspondence_of_relationship_1403 |
| NT4 agreements@ cooperation@ consensus_1589 |
| NT4 disagreements@ inconsistencies@ incongruities_1590 |
| NT2 quantity_1357 |
| NT3 simple_quantity_1404 |
| NT4 quantities@ amounts_1591 |
| NT4 degrees@ ranks@ levels@ proportions_1592 |
| NT3 comparative_quantity_1405 |
| NT4 equality@ parity_1593 |
| NT4 inequalities@ disparities_1594 |
| NT4 midpoints@ mediocrity_1595 |
| NT4 reparations@ counterbalances_1596 |
| NT4 greatness_1597 |
| NT4 smallness_1598 |
| NT4 excellence@ expertise@ leadership_1599 |
| NT4 insignificance@ incompetence@ subservience_1600 |
| NT4 increases@ augmentations@ proliferations@ intensifications_1601 |
| NT4 decreases@ declines@ reductions@ curtailments_1602 |
| NT3 conjunctive_quantity_1406 |
| NT4 additions@ annexations_1603 |
| NT4 adjuncts@ additions@ annexes_1604 |
| NT4 subtractions@ reductions@ deletions@ amputations_1605 |
| NT4 remainders@ balances@ leftovers_1606 |
| NT4 mixtures@ mergers@ blends_1607 |
| NT4 simplicity@ the_basics_1608 |
| NT4 complexity@ complications@ entanglements_1609 |
| NT4 connections@ junctions@ fasteners@ joining_1610 |
| NT4 analysis@ dissections_1611 |
| NT4 separation@ removal@ severance@ dismantlement_1612 | category

| | |
|---|---|
| NT4 | cohesion@_consistency@_tenacity_1613 |
| NT4 | noncohesion@_looseness_1614 |
| NT4 | combinations@_unions_1615 |
| NT4 | disintegration@_decay_1616 |
| NT3 | wholeness_1407 |
| NT4 | portions@_segments_1618 |
| NT4 | completeness@_thoroughness_1619 |
| NT4 | incompleteness@_deficiencies@_immaturity@_shortages_1620 |
| NT4 | organizing@_structuring_1621 |
| NT4 | totality@_the_whole_amount_313920 |
| NT2 | order_1358 |
| NT3 | order_in_general_1408 |
| NT4 | order@_harmony@_regularity_1622 |
| NT4 | placement@_arrangement_1623 |
| NT4 | classifications@_ratings_1624 |
| NT4 | chaos@_confusion@_disorder_1625 |
| NT4 | disarrangement@_disorganization_1626 |
| NT3 | consecutive_order_1409 |
| NT4 | priorities_1627 |
| NT4 | logical_sequences@_progressions_1628 |
| NT4 | forerunners@_guides@_leaders@_introductions_1629 |
| NT4 | sequels@_logical_continuations_1630 |
| NT4 | beginnings_1631 |
| NT4 | middles_1632 |
| NT4 | ends_1633 |
| NT4 | continuity@_uninterrupted_progressions_1634 |
| NT4 | interruptions@_interrupted_sequences_1635 |
| NT3 | collective_order_1410 |
| NT4 | togetherness@_communities@_escorts_1636 |
| NT4 | groups@_assemblies_1637 |
| NT3 | decentralization_1638 |
| NT3 | distributive_order_1411 |
| NT4 | inclusion@_involvement_1639 |
| NT4 | exclusion_1640 |
| NT4 | foreignness@_newcomers_1641 |
| NT4 | generalizations@_prevalence_1642 |
| NT4 | specifics@_uniqueness@_specifications_1643 |
| NT4 | areas_of_expertise@_experts_1644 |
| NT3 | conformity_to_rule_1412 |
| NT4 | conformity_1645 |
| NT4 | nonconformity@_nonconformists_1646 |
| NT4 | normality@_the_usual_1647 |
| NT4 | abnormality@_the_unusual_1648 |
| NT2 | number_1359 |
| NT3 | number_in_general_1413 |
| NT4 | numbers@_mathematics_1649 |
| NT4 | numeration@_assignment_of_numbers_1650 |
| NT4 | lists_1651 |
| NT3 | determinate_number_1414 |
| NT4 | unity_1652 |
| NT4 | divisions_and_multiples_of_two_1653 |
| NT4 | duplication@_repetition_1654 |
| NT4 | bisection@_halving@_dichotomies_1655 |
| NT4 | threesomes_1656 |
| NT4 | triplication_1657 |
| NT4 | trisection_1658 |
| NT4 | foursomes_1659 |
| NT4 | quadruplication_1660 |
| NT4 | quadrisection_1661 |
| NT4 | five_and_over_1662 |
| NT3 | indeterminate_number_1415 |
| NT4 | pluralities@_majorities_1663 |
| NT4 | unspecified_large_numbers_1664 |
| NT4 | fewness_1665 |
| NT4 | repetitions_1666 |
| NT4 | infinity_1667 |
| NT2 | time_1360 |
| NT3 | absolute_time_1416 |
| NT4 | time@_passage_of_time_1668 |
| NT4 | eternity_1669 |
| NT4 | intervals_of_time_1670 |
| NT4 | spells@_periods_of_duty_1671 |
| NT4 | interludes_1672 |
| NT4 | longevity@_durability_1673 |
| NT4 | transience@_short_durations_1674 |
| NT4 | perpetuity@_forever_1675 |
| NT4 | instants@_minute_durations_of_time_1676 |
| NT4 | measurement_of_time_1677 |
| NT4 | anachronisms_1678 |
| NT3 | relative_time_1417 |
| NT4 | previous_times@_formerly_1679 |
| NT4 | later_times@_afterwards_1680 |
| NT4 | simultaneity_1681 |
| NT4 | former_times@_memories@_history_1682 |
| NT4 | the_here_and_now_1683 |
| NT4 | future_times@_expectations@_prospects_1684 |
| NT3 | time_with_reference_to_age_1418 |
| NT4 | newness@_innovation_1685 |
| NT4 | the_ancient@_traditions@_archaeology_1686 |
| NT4 | childhood@_adolescence_1687 |
| NT4 | young_people@_plants@_animals@_insects_1688 |
| NT4 | age@_maturity_1689 |
| NT4 | adults_1690 |
| NT3 | time_with_reference_to_season_1419 |
| NT4 | seasons_of_the_year_1691 |
| NT4 | timeliness@_the_right_time_1692 |
| NT4 | untimeliness@_the_wrong_time_1693 |
| NT4 | earliness@_anticipation_1694 |
| NT4 | delays@_postponements_1695 |
| NT4 | mornings@_days_1696 |
| NT4 | evenings@_nights_1697 |
| NT3 | recurrent_time_1420 |
| NT4 | common_occurrences@_the_usual@_the_expected_1698 |
| NT4 | uncommon_occurrences@_the_unusual@_the_unexpected_1699 |
| NT4 | clockwork_regularity@_predictable_cycles_1700 |
| NT4 | irregularity_of_recurrence@_the_sporadic@_non-predictable_cycles_1701 |
| NT2 | change_1361 |
| NT3 | changes_of_change_313803 |
| NT4 | changes@_alterations_1702 |
| NT4 | permanence@_the_unchanging_1703 |
| NT4 | flexibility@_the_capacity_to_change_1704 |
| NT4 | stability@_security@_reliability_1705 |
| NT4 | continuation_of_actions_1706 |
| NT4 | cessation_of_actions_1707 |
| NT4 | changes@_switching_to_something_different_1708 |
| NT4 | reversion@_regression@_about-faces_1709 |
| NT4 | major_changes_1710 |
| NT4 | developmental_changes_1711 |
| NT4 | substitutions_1712 |
| NT4 | interchanges@_exchanges@_trading_1713 |
| NT2 | events_79925 |
| NT3 | events@_imminence_313806 |
| NT4 | events@_occurrences_1714 |
| NT4 | forthcoming_events_1715 |

- 17 -

| | |
|---|---|
| NT2 causation_1363 | |
| NT3 causes@_effects_313802 | |
| NT4 causes@_stimuli@_explanations_1716 | |
| NT4 effects@_results@_consequences_1717 | |
| NT4 attribution@_placing_responsibility_1718 | |
| NT4 chance@_luck_1719 | |
| NT2 power_1164 | |
| NT3 power_in_general_1421 | |
| NT4 power@_force@_ability_1720 | |
| NT4 ineffectiveness@_lack_of_power@_power_vacuums_1721 | |
| NT4 strength@_force@_strengthening_1722 | |
| NT4 weakness_1723 | |
| NT4 energy@_vigor_1724 | |
| NT4 violence@_rage@_explosions@_extreme_measures_1725 | |
| NT4 moderation@_control_1726 | |
| NT3 power_in_operation_1422 | |
| NT4 operation@_management@_making_it_work_1727 | |
| NT4 productivity_1728 | |
| NT4 nonproductivity_1729 | |
| NT4 manufacturing@_childbearing_1730 | |
| NT4 products@_creations_1731 | |
| NT4 procreation_1732 | |
| NT4 ancestry@_lineage_1733 | |
| NT4 posterity@_descendants_1734 | |
| NT3 indirect_power_1423 | |
| NT4 influence@_authority_1735 | |
| NT4 lack_of_influence_1736 | |
| NT4 tendencies@_inclinations_1737 | |
| NT4 likelihood_of_occurrence@_the_odds_1738 | |
| NT4 commitments@_making_commitments_1739 | |
| NT3 combination_of_forces_1424 | |
| NT4 teamwork_1740 | |
| NT4 lack_of_teamwork@_conflicts@_interferences_1741 | |
| NT2 existence_1354 | |
| NT3 being_in_the_abstract_1396 | |
| NT4 existence@_reality_1564 | |
| NT4 nonexistence@_nothing_1565 | |
| NT3 being_in_the_concrete_1398 | |
| NT4 substantiality@_substances_1566 | |
| NT4 unsubstantiality@_intangibility_1567 | |
| NT3 formal_existence_1399 | |
| NT4 essence@_gist_1568 | |
| NT4 nonessentials@_extraneousness_1569 | |
| NT3 modal_existence_1400 | |
| NT4 status@_conditions_1570 | |
| NT4 circumstances@_occurrences_1571 | |
| TT business_and_economics | |
| NT1 business_and_industry | |
| NT2 business_services_industry | |
| NT2 commerce_and_trade | |
| NT3 retail_trade_industry | |
| NT4 convenience_stores | |
| NT3 wholesale_trade_industry | |
| NT2 consulting_industry | |
| NT2 customer_service | |
| NT2 corporations_and_business_practices | |
| NT3 corporate_and_industrial_management | |
| NT2 diversified_companies | |
| NT2 entrepreneurship | |
| NT2 industrial_engineering | |
| NT3 production_methods | |
| NT2 industrial_goods_manufacturing | |

| category |
|---|
| NT3 machinery_manufacturers |
| NT2 industrialists_and_financiers |
| NT2 international_trade_and_finance |
| NT2 labor_and_unions |
| NT3 employment_agencies |
| NT2 manufacturing |
| NT2 marketing |
| NT2 office_products |
| NT1 economics |
| NT2 economists |
| NT2 finance_and_investment |
| NT3 banking |
| NT3 credit_cards |
| NT3 currencies |
| NT3 financial_news_services |
| NT3 insurance_industry |
| NT3 precious_metals_market |
| NT3 real_estate_industry |
| NT3 stocks@_bonds@_and_commodities |
| NT4 mutual_funds |
| NT5 balanced_funds |
| NT5 foreign_stock_funds |
| NT5 global_bond_funds |
| NT5 global_stock_funds |
| NT5 junk_bond_funds |
| NT5 municipal_bond_funds |
| NT5 stock_funds |
| NT5 tax-free_money_funds |
| NT5 taxable_bond_funds |
| NT5 taxable_money_funds |
| NT2 taxes_and_tariffs |
| TT general_classification |
| NT1 geography |
| NT1 cartography |
| NT2 explorers |
| NT1 political_geography |
| NT2 Africa |
| NT3 Central_Africa |
| NT4 Angola |
| NT4 Burundi |
| NT4 Central_African_Republic |
| NT4 Congo |
| NT4 Gabon |
| NT4 Kenya |
| NT4 Malawi |
| NT4 Rwanda |
| NT4 Tanzania |
| NT4 Uganda |
| NT4 Zaire |
| NT4 Zambia |
| NT3 North_Africa |
| NT4 Algeria |
| NT4 Chad |
| NT4 Djibouti |
| NT4 Egypt |
| NT4 Ethiopia |
| NT4 Libya |
| NT4 Morocco |
| NT4 Somalia |
| NT4 Sudan |
| NT4 Tunisia |
| NT3 Southern_Africa |

| category | |
|---|---|
| NT4 | Botswana |
| NT4 | Lesotho |
| NT4 | Mozambique |
| NT4 | Namibia |
| NT4 | South_Africa |
| NT4 | Swaziland |
| NT4 | Zimbabwe |
| NT3 | West_Africa |
| NT4 | Benin |
| NT4 | Burkina |
| NT4 | Cameroon |
| NT4 | Equatorial_Guinea |
| NT4 | Gambia |
| NT4 | Ghana |
| NT4 | Guinea |
| NT4 | Guinea-Bissau |
| NT4 | Ivory_Coast |
| NT4 | Liberia |
| NT4 | Mali |
| NT4 | Mauritania |
| NT4 | Niger |
| NT4 | Nigeria |
| NT4 | Sao_Tome_and_Principe |
| NT4 | Senegal |
| NT4 | Sierra_Leone |
| NT4 | Togo |
| NT2 | Antarctica |
| NT3 | Arctic |
| NT3 | Greenland |
| NT3 | Iceland |
| NT2 | Asia |
| NT3 | Central_Asia |
| NT4 | Afghanistan |
| NT4 | Bangladesh |
| NT4 | Bhutan |
| NT4 | India |
| NT4 | Kazakhstan |
| NT4 | Kyrgyzstan |
| NT4 | Nepal |
| NT4 | Pakistan |
| NT4 | Tajikstan |
| NT4 | Turkmenistan |
| NT4 | Uzbekistan |
| NT3 | East_Asia |
| NT4 | China |
| NT4 | Hong_Kong |
| NT4 | Japan |
| NT4 | Macao |
| NT4 | Mongolia |
| NT4 | North_Korea |
| NT4 | South_Korea |
| NT4 | Taiwan |
| NT3 | Southeast_Asia |
| NT4 | Brunei |
| NT4 | Indonesia |
| NT4 | Kampuchea |
| NT4 | Laos |
| NT4 | Malaysia |
| NT4 | Myanmar |
| NT4 | Papua_New_Guinea |
| NT4 | Philippines |
| NT4 | Singapore |
| NT4 | Thailand |
| NT4 | Vietnam |
| NT2 | Atlantic_area |
| NT3 | Azores |
| NT3 | Bermuda |
| NT3 | Canary_Islands |
| NT3 | Cape_Verde |
| NT3 | Falkland_Islands |
| NT2 | Caribbean |
| NT3 | Antigua_and_Barbuda |
| NT3 | Bahamas |
| NT3 | Barbados |
| NT3 | Cuba |
| NT3 | Dominica |
| NT3 | Dominican_Republic |
| NT3 | Grenada |
| NT3 | Haiti |
| NT3 | Jamaica |
| NT3 | Netherlands_Antilles |
| NT3 | Puerto_Rico |
| NT3 | Trinidad_and_Tobago |
| NT2 | Central_America |
| NT3 | Belize |
| NT3 | Costa_Rica |
| NT3 | El_Salvador |
| NT3 | Guatemala |
| NT3 | Honduras |
| NT3 | Nicaragua |
| NT3 | Panama |
| NT2 | Europe |
| NT3 | Eastern_Europe |
| NT4 | Albania |
| NT4 | Armenia |
| NT4 | Azerbaijan |
| NT4 | Belarus |
| NT4 | Bulgaria |
| NT4 | Czech_Republic |
| NT4 | Czechoslovakia |
| NT4 | Estonia |
| NT4 | Greece |
| NT4 | Hungary |
| NT4 | Latvia |
| NT4 | Lithuania |
| NT4 | Moldava |
| NT4 | Poland |
| NT4 | Republic_of_Georgia |
| NT4 | Romania |
| NT4 | Russia |
| NT4 | Slovakia |
| NT4 | The_Soviet_Union |
| NT4 | Ukraine |
| NT4 | Yugoslavia |
| NT5 | Bosnia_and_Herzegovina |
| NT5 | Croatia |
| NT5 | Macedonia |
| NT5 | Montenegro |
| NT5 | Serbia |
| NT5 | Slovenia |
| NT3 | Western_Europe |
| NT4 | Austria |
| NT4 | Belgium |
| NT4 | Denmark |

- 19 -

| category | |
|---|---|
| NT4 | Germany |
| NT4 | Faeroe_Island |
| NT4 | Finland |
| NT4 | France |
| NT4 | Iberia |
| NT5 | Andorra |
| NT5 | Portugal |
| NT5 | Spain |
| NT4 | Ireland |
| NT4 | Italy |
| NT4 | Liechtenstein |
| NT4 | Luxembourg |
| NT4 | Monaco |
| NT4 | Norway |
| NT4 | San_Marino |
| NT4 | Sweden |
| NT4 | Switzerland |
| NT4 | The_Netherlands |
| NT4 | United_Kingdom |
| NT5 | England |
| NT5 | Northern_Ireland |
| NT5 | Scotland |
| NT5 | Wales |
| NT2 | Indian_Ocean_area |
| NT3 | Comoros |
| NT3 | Madagascar |
| NT3 | Maldives |
| NT3 | Mauritius |
| NT3 | Seychelles |
| NT3 | Sri_Lanka |
| NT2 | Mediterranean |
| NT3 | Corsica |
| NT3 | Cyprus |
| NT3 | Malta |
| NT3 | Sardinia |
| NT2 | Middle_East |
| NT3 | Bahrain |
| NT3 | Iran |
| NT3 | Iraq |
| NT3 | Israel |
| NT3 | Jordan |
| NT3 | Kuwait |
| NT3 | Lebanon |
| NT3 | Oman |
| NT3 | Qatar |
| NT3 | Saudi_Arabia |
| NT3 | Socotra |
| NT3 | Syria |
| NT3 | Turkey |
| NT3 | United_Arab_Emirates |
| NT3 | Yemen |
| NT2 | North_America |
| NT3 | Canada |
| NT3 | Mexico |
| NT3 | United_States |
| NT4 | Alabama |
| NT4 | Alaska |
| NT4 | Arizona |
| NT4 | Arkansas |
| NT4 | California |
| NT4 | Colorado |
| NT4 | Connecticut |
| NT4 | Delaware |
| NT4 | Florida |
| NT4 | Georgia |
| NT4 | Hawaii |
| NT4 | Idaho |
| NT4 | Illinois |
| NT4 | Indiana |
| NT4 | Iowa |
| NT4 | Kansas |
| NT4 | Kentucky |
| NT4 | Louisiana |
| NT4 | Maine |
| NT4 | Maryland |
| NT4 | Massachusetts |
| NT4 | Michigan |
| NT4 | Minnesota |
| NT4 | Mississippi |
| NT4 | Missouri |
| NT4 | Montana |
| NT4 | Nebraska |
| NT4 | Nevada |
| NT4 | New_Hampshire |
| NT4 | New_Jersey |
| NT4 | New_Mexico |
| NT4 | New_York |
| NT4 | North_Carolina |
| NT4 | North_Dakota |
| NT4 | Ohio |
| NT4 | Oklahoma |
| NT4 | Oregon |
| NT4 | Pennsylvania |
| NT4 | Rhode_Island |
| NT4 | South_Carolina |
| NT4 | South_Dakota |
| NT4 | Tennessee |
| NT4 | Texas |
| NT4 | Utah |
| NT4 | Vermont |
| NT4 | Virginia |
| NT4 | Washington |
| NT4 | Washington_D.C. |
| NT4 | West_Virginia |
| NT4 | Wisconsin |
| NT4 | Wyoming |
| NT2 | Pacific_area |
| NT3 | American_Samoa |
| NT3 | Australia |
| NT4 | Tasmania |
| NT3 | Cook_Islands |
| NT3 | Fiji |
| NT3 | French_Polynesia |
| NT3 | Guam |
| NT3 | Kiribati |
| NT3 | Mariana_Islands |
| NT3 | Marshall_Islands |
| NT3 | Micronesia |
| NT3 | Nauru |
| NT3 | New_Caledonia |
| NT3 | New_Zealand |
| NT3 | Palau |
| NT3 | Solomon_Islands |
| NT3 | Tonga |

- 20 -

```
NT3  Tuvalu
NT3  Vanuatu
NT3  Western_Samoa
NT2  South_America
NT3  Argentina
NT3  Bolivia
NT3  Brazil
NT3  Chile
NT3  Colombia
NT3  Ecuador
NT3  French_Guiana
NT3  Guyana
NT3  Paraguay
NT3  Peru
NT3  Suriname
NT3  Uruguay
NT3  Venezuela
NT1  physical_geography
NT2  bodies_of_water
NT3  lakes
NT3  oceans
NT3  rivers
NT2  land_forms
NT3  continents
NT3  deserts
NT3  islands
NT3  mountains
TT   government_and_military
NT1  government_and_law
NT2  acts@_powers@_and_procedures
NT2  county_government
NT2  forms_and_philosophies_of_government
NT2  government_bodies_and_institutions
NT3  executive_branch
NT4  cabinet
NT4  U.S._presidents
NT3  judiciary_branch
NT4  supreme_court
NT5  chief_justices
NT5  landmark_cases
NT3  legislative_branch
NT4  house_of_representatives
NT4  senate
NT2  government_officials
NT3  famous_leaders
NT3  royalty_and_aristocracy
NT2  government_programs
NT3  social_programs
NT4  welfare
NT2  international_relations
NT3  Cold_War
NT3  diplomacy_and_diplomats
NT3  immigration
NT2  law
NT3  courts
NT3  crimes_and_offenses
NT4  substance_abuse
NT3  criminals
NT3  law_enforcement
NT3  law_firms
NT3  law_systems
NT4  constitutional_law
``` category
```
NT3  legal_bodies
NT3  legal_customs_and_formalities
NT3  legal_judgments
NT3  legal_people
NT3  legal_proceedings
NT3  prisons_and_punishments
NT2  municipal_government
NT3  cities
NT4  cities@_towns@_and_environs
NT4  urban_phenomena
NT4  urban_structures
NT3  municipal_infrastructure
NT2  politics
NT3  elections_and_campaigns
NT3  political_parties
NT3  political_practices_and_functions
NT3  political_principles_and_philosophies
NT3  politicians_and_activists
NT3  revolution_and_subversion
NT2  postal_communications
NT2  public_facilities
NT2  state_government
NT1  military
NT2  air_force
NT2  armored_clothing
NT2  army
NT2  cryptography
NT2  military_buildings
NT2  military_equipment
NT2  military_honors
NT2  military_intelligence
NT2  military_leaders
NT2  military_ranks
NT3  army@_air_force@_and_marine_ranks
NT3  navy_and_coast_guard_ranks
NT2  military_wars
NT3  American_Civil_War
NT3  American_Revolution
NT3  warfare
NT3  World_War_I
NT3  World_War_II
NT2  military_weaponry
NT3  bombs_and_mines
NT3  chemical_and_biological_warfare
NT3  military_aircraft
NT3  missiles@_rockets@_and_torpedoes
NT3  nuclear_weaponry
NT3  space-based_weapons
NT2  navy
NT3  warships
NT2  service_academies
TT   science@_technology@_and_education
NT1  communications
NT2  advertising_industry
NT2  journalism
NT3  broadcast_journalism
NT3  journalists
NT3  print_journalism
NT4  newspapers
NT2  publishing_industry
NT3  printing
NT3  types_of_publications
```

| | category |
|---|---|
| NT4 books | NT6 grooming_aids |
| NT2 speech_communications | NT5 nutrition |
| NT1 education | NT6 vitamins |
| NT2 colleges_and_universities | NT5 treatments_and_activities |
| NT3 academic_degrees | NT4 healthcare_industry |
| NT2 curricula_and_methods | NT5 medical_business_and_practices |
| NT2 schools | NT5 medical_equipment_manufacturers |
| NT2 teachers_and_students | NT4 injuries |
| NT1 hard_sciences_and_technology | NT4 medical_disciplines_and_specialties |
| NT2 aerospace_industry | NT5 dentistry |
| NT3 satellite_technology | NT5 medical_personnel |
| NT3 space_exploration | NT5 ophthalmology |
| NT4 space_explorers | NT4 medical_equipment |
| NT4 spacecraft_and_space_stations | NT4 medical_facilities |
| NT2 astronomy | NT4 medical_procedures |
| NT3 astronomers | NT5 medical_diagnosis |
| NT3 celestial_bodies | NT6 medical_imaging |
| NT4 comets | NT5 surgery |
| NT4 constellations | NT4 medical_treatments |
| NT4 galaxies | NT4 pharmacology |
| NT4 moons | NT5 anesthetics |
| NT4 nebulae | NT6 general_anesthetics |
| NT4 planets | NT6 local_anesthetics |
| NT4 celestial_stars | NT5 antagonists_and_antidotes |
| NT3 celestial_phenomena | NT5 antigout_agents |
| NT2 biology | NT5 antimicrobials_and_antiparasitics |
| NT3 biologists | NT6 amebicides_and_antiprotozoais |
| NT3 biological_evolution | NT6 aminoglycosides |
| NT3 biotechnology | NT6 anthelmintics |
| NT4 genetic_engineering | NT6 antifungals |
| NT5 genetics_and_heredity | NT6 antimalarials |
| NT3 botany | NT5 antituberculars_and_antileprotics |
| NT4 botanists | NT6 antivirals |
| NT4 plant_diseases | NT6 cephalosporins |
| NT4 plant_physiology | NT6 penicillins |
| NT5 plant_parts | NT6 quinolones |
| NT5 plant_development | NT6 sulfonamides |
| NT4 plant_kingdom | NT6 tetracyclines |
| NT5 ferns | NT5 antineoplastic_agents |
| NT5 mosses | NT6 alkylating_agents |
| NT5 non-flowering_plants | NT6 antibiotic_antineoplastic_agents |
| NT6 conifers | NT6 antimetabolites |
| NT5 flowering_plants | NT6 antineoplastic_hormone_drugs |
| NT6 cacti | NT5 autonomic_nervous_system_drugs |
| NT6 grasses | NT6 adrenergic_blockers |
| NT6 deciduous_plants | NT6 adrenergics |
| NT6 palm_trees | NT6 anticholinergics |
| NT6 trees_and_shrubs | NT6 cholinergics |
| NT3 ecology | NT6 neuromuscular_blockers |
| NT4 conservation | NT6 skeletal_muscle_relaxants |
| NT4 environmental_pollution | NT5 blood_drugs |
| NT3 health_and_medicine | NT6 anticoagulants |
| NT4 afflictions_and_conditions | NT6 blood_derivatives |
| NT4 artificial_limbs_and_organs | NT6 hematinics |
| NT4 carcinogens | NT6 hemostatics |
| NT4 defects_and_disabilities | NT6 thrombolytic_enzymes |
| NT4 diseases | NT5 cardiovascular_drugs |
| NT4 dressings_and_supports | NT6 antianginals |
| NT4 fitness_and_health | NT6 antiarrhythmics |
| NT5 fitness_equipment | NT6 antihypertensives |
| NT5 fitness_technology | NT6 antilipemics |
| NT5 grooming | NT6 inotropics |

| | category |
|---|---|
| NT6 vasodilators | NT4 algae |
| NT5 central_nervous_system_drugs | NT4 bacteria |
| NT6 antianxiety_agents | NT4 fungi |
| NT6 anticonvulsants | NT5 ascomycota |
| NT6 antidepressants | NT5 basidiomycota |
| NT6 antiparkinsonian_agents | NT5 deuteromycota |
| NT6 antipsychotics | NT5 zygomycota |
| NT6 cerebral_stimulants | NT4 viruses |
| NT6 narcotic_and_opioid_analgesics | NT3 physiology |
| NT6 nonnarcotic_analgesics_and_antipyretics | NT4 anatomy |
| NT6 nonsteroidal_anti-inflammatory_drugs | NT5 cardiovascular_systems |
| NT6 sedative-hypnotics | NT5 digestive_systems |
| NT5 dermatomucosal_agents | NT5 extremities_and_appendages |
| NT6 scabicides_and_pediculicides | NT5 glandular_systems |
| NT6 topical_corticosteroids | NT5 head_and_neck |
| NT5 digestive_system_drugs | NT6 ears |
| NT6 antacids@_adsorbents@_and_antiflatulents | NT6 eyes |
| NT6 antidiarrheals | NT6 mouth_and_teeth |
| NT6 antiemetics | NT5 immune_systems |
| NT6 antiulcer_agents | NT6 antigens_and_antibodies |
| NT6 digestants | NT5 lymphatic_systems |
| NT6 laxatives | NT5 muscular_systems |
| NT5 eye@_ear@_nose@_and_throat_drugs | NT5 nervous_systems |
| NT6 nasal_agents | NT5 reproductive_systems |
| NT6 ophthalmics | NT5 respiratory_systems |
| NT7 ophthalmic_anti-infectives | NT5 skeletal_systems |
| NT7 ophthalmic_anti-inflammatory_agents | NT5 tissue_systems |
| NT7 ophthalmic_vasoconstrictors | NT5 torso |
| NT7 miotics | NT5 urinary_systems |
| NT7 mydriatics | NT4 cell_structure_and_functions |
| NT6 otics | NT4 enzymes |
| NT5 fluid_and_electrolyte_drugs | NT4 hormones |
| NT6 diuretics | NT4 reproduction_and_development |
| NT6 electrolytes | NT3 zoology |
| NT5 gold_salts | NT4 invertebrates |
| NT5 hormonal_agents | NT5 arachnids |
| NT6 androgens_and_anabolic_steroids | NT5 crustaceans |
| NT6 antidiabetic_agents_and_glucagon | NT5 insects |
| NT6 corticosteroids | NT5 mollusks_and_aquatic_invertebrates |
| NT6 estrogens_and_progestins | NT5 worms |
| NT6 gonadotropins | NT4 prehistoric_animals |
| NT6 parathyroid-like_agents | NT5 dinosaurs |
| NT6 pituitary_hormones | NT4 vertebrates |
| NT6 thyroid_hormone_antagonists | NT5 amphibians |
| NT6 thyroid_hormones | NT5 birds |
| NT5 immune_system_drugs | NT6 accentors |
| NT6 antitoxins_and_antivenins | NT6 antbirds |
| NT6 biological_response_modifiers | NT6 bee_eaters |
| NT6 immune_serums | NT6 birds_of_paradise |
| NT6 immunosuppressants | NT6 birds_of_prey |
| NT6 vaccines_and_toxoids | NT7 owls |
| NT5 oxytocics | NT6 blackbirds_and_orioles |
| NT5 pharmaceutical_industry | NT6 bowerbirds |
| NT5 respiratory_drugs | NT6 bulbuls |
| NT6 antihistamines | NT6 cotingas_and_becards |
| NT6 bronchodilators | NT6 cuckoos_and_anis |
| NT6 expectorants_and_antitussives | NT6 dippers_and_ouzels |
| NT5 spasmolytics | NT6 finches |
| NT5 topical_agents | NT6 flycatchers |
| NT5 toxins | NT6 frogmouths |
| NT4 veterinary_medicine | NT6 game_birds |
| NT3 lower_life_forms | NT7 chickens |

| | |
|---|---|
| NT6 honey_eaters | |
| NT6 honeycreepers | |
| NT6 honeyguides | |
| NT6 hoopoes | |
| NT6 hornbills | |
| NT6 hummingbirds | |
| NT6 jacamars | |
| NT6 jays@_crows@_and_magpies | |
| NT6 kingfishers_and_motmots | |
| NT6 larks | |
| NT6 manakins | |
| NT6 mimic_thrushes | |
| NT6 moundbirds | |
| NT6 nightjars | |
| NT6 nuthatches_and_creepers | |
| NT6 ovenbirds_and_allies | |
| NT6 parrots_and_parakeets | |
| NT6 penguins | |
| NT6 pigeons_and_doves | |
| NT6 pipits_and_wagtails | |
| NT5 pittas | |
| NT6 potoos | |
| NT6 puffbirds | |
| NT6 shrikes | |
| NT6 silky_flycatchers | |
| NT6 starlings | |
| NT6 swallows | |
| NT6 swifts | |
| NT6 tanagers | |
| NT6 thrushes | |
| NT6 tinamous | |
| NT6 titmice_and_chickadees | |
| NT6 toucans | |
| NT6 trogons | |
| NT6 vireos | |
| NT6 warblers_and_sparrows | |
| NT6 water_birds | |
| NT7 albatrosses | |
| NT7 auks_and_puffins | |
| NT7 cormorants_and_anhingas | |
| NT7 ducks@_geese@_and_swans | |
| NT7 frigatebirds | |
| NT7 gannets_and_boobies | |
| NT7 grebes | |
| NT7 gulls_and_terns | |
| NT7 loons | |
| NT7 pelicans | |
| NT7 rails@_gallinules@_and_coots | |
| NT7 shearwaters_and_petrels | |
| NT7 shorebirds | |
| NT7 tropicbirds | |
| NT7 wading_birds | |
| NT6 waxwings | |
| NT6 weavers_and_weaver_finches | |
| NT6 woodcreepers | |
| NT6 woodpeckers | |
| NT6 wrens | |
| NT5 fish | |
| NT5 mammals | |
| NT6 anteaters_and_sloths | |
| NT7 aardvarks | |
| NT6 bats | |

| category |
|---|
| NT6 carnivores |
| NT7 cats |
| NT7 dogs |
| NT6 elephants |
| NT6 even-toed_hoofed_mammals |
| NT7 cattle |
| NT7 goats |
| NT7 pigs |
| NT7 sheep |
| NT6 hyraxes |
| NT6 monotremes |
| NT6 marsupials |
| NT6 odd-toed_hoofed_mammals |
| NT7 horses |
| NT6 primates |
| NT7 lemurs |
| NT6 rabbits_and_hares |
| NT6 rodents |
| NT6 seals_and_walruses |
| NT7 manatees |
| NT6 whales_and_porpoises |
| NT5 reptiles |
| NT6 crocodilians |
| NT6 lizards |
| NT6 snakes |
| NT6 turtles |
| NT2 chemistry |
| NT3 branches_of_chemistry |
| NT4 chemists |
| NT3 chemical_constants@_theories@_and_values |
| NT3 chemical_elements |
| NT3 chemical_measures |
| NT3 chemical_particles_and_molecular_structures |
| NT3 chemical_products |
| NT4 chemical_explosives |
| NT4 plastics_and_rubber |
| NT4 synthetic_textiles |
| NT3 chemical_properties_and_reactions |
| NT3 chemical_tests |
| NT3 chemicals |
| NT3 chemistry_tools |
| NT2 civil_engineering_and_architecture |
| NT3 architects |
| NT3 construction_industry |
| NT4 building_components |
| NT5 exterior_structures |
| NT6 entryways_and_extensions |
| NT6 landscaping |
| NT6 ornamental_parts |
| NT6 roofs_and_towers |
| NT6 structural_framework |
| NT6 windows@_walls@_and_facades |
| NT5 interior_structures |
| NT6 building_foundations |
| NT6 building_systems |
| NT7 electrical_systems |
| NT7 fireproofing_and_insulation |
| NT7 plumbing |
| NT6 rooms |
| NT7 interior_structural_parts |
| NT7 room_parts |
| NT4 carpentry |

| category |
|---|
| NT4 construction_equipment |
| NT4 construction_materials |
| NT5 paneling_and_composites |
| NT5 surfaces_and_finishing |
| NT4 construction_workers |
| NT4 types_of_buildings |
| NT5 dwellings |
| NT5 outbuildings |
| NT4 types_of_construction |
| NT3 civil_engineers |
| NT3 schools_of_architecture |
| NT2 computer_industry |
| NT3 computer_hardware_industry |
| NT4 computer_components |
| NT5 computer_memory |
| NT5 computer_sound |
| NT5 microprocessors |
| NT4 computer_peripherals |
| NT5 computer_video |
| NT5 data_storage_devices |
| NT4 types_of_computers |
| NT5 hand-held_computers |
| NT5 laptops |
| NT5 mainframes |
| NT5 personal_computers |
| NT5 work-stations |
| NT3 computer_multimedia |
| NT3 computer_networking |
| NT4 Internet_technology |
| NT3 computer_science |
| NT4 artificial_intelligence |
| NT4 natural_language_processing |
| NT3 computer_software_industry |
| NT4 CAD-CAM |
| NT4 client-server_software |
| NT4 computer_programming |
| NT5 programming_development_tools |
| NT5 programming_languages |
| NT4 databases_and_spreadsheets |
| NT4 document_management_and_workflow_software |
| NT5 desktop_publishing_and_word_processing |
| NT4 computer_viruses_and_protection |
| NT4 graphics_software |
| NT4 operating_systems |
| NT3 computer_standards |
| NT3 voice_recognition_technology |
| NT2 electronics |
| NT3 electrical_and_electronic_engineering |
| NT3 electronic_circuits_and_components |
| NT3 microelectronics |
| NT3 radar_technology |
| NT3 retail_electronics_industry |
| NT3 semiconductors_and_superconductors |
| NT3 telecommunications_industry |
| NT4 data_transmission |
| NT4 fiber_optics |
| NT4 voice_transmission_and_telephony |
| NT2 energy_industry |
| NT3 electric_power_industry |
| NT3 energy_sources |
| NT4 alternative_energy_sources |
| NT4 fossil_fuels_industry |
| NT5 coal_industry |
| NT5 petroleum_products_industry |
| NT4 nuclear_power_industry |
| NT2 environment_control_industries |
| NT3 heating_and_cooling_systems |
| NT3 pest_control |
| NT3 waste_management |
| NT2 explosives_and_firearms |
| NT3 firearm_parts_and_accessories |
| NT3 recreational_firearms |
| NT2 geology |
| NT3 ages_and_eras |
| NT3 branches_of_geology |
| NT4 geologists |
| NT3 geologic_formations |
| NT3 geologic_substances |
| NT4 minerals |
| NT5 gemstones |
| NT4 rocks |
| NT5 igneous_rocks |
| NT5 metamorphic_rocks |
| NT5 sedimentary_rocks |
| NT3 meteorology |
| NT4 atmospheric_science |
| NT4 clouds |
| NT4 cyclical_events |
| NT3 seismology |
| NT3 vulcanology |
| NT2 inventors |
| NT2 materials_technology |
| NT3 industrial_ceramics |
| NT3 metal_industry |
| NT4 aluminum_industry |
| NT4 metallurgy |
| NT4 steel_industry |
| NT3 mining_industry |
| NT2 mathematics |
| NT3 algebra_and_arithmetic |
| NT4 linear_algebra |
| NT3 calculus |
| NT3 geometry |
| NT4 analytic_geometry |
| NT3 math_tools |
| NT3 mathematicians |
| NT3 number_theory |
| NT3 statistics |
| NT3 symbolic_logic |
| NT3 trigonometry |
| NT2 mechanical_engineering |
| NT3 machine_components |
| NT3 robotics |
| NT3 types_of_machines |
| NT4 internal_combustion_engines |
| NT2 physics |
| NT3 acoustics |
| NT3 cosmology |
| NT3 electricity_and_magnetism |

| | |
|---|---|
| NT3 | heat_physics |
| NT3 | motion_physics |
| NT3 | nuclear_and_radiation_physics |
| NT4 | subatomic_particles |
| NT3 | optical_technology |
| NT4 | holography |
| NT4 | laser_technology |
| NT5 | high-energy_lasers |
| NT5 | low-energy_lasers |
| NT4 | optical_instruments |
| NT2 | textiles |
| NT2 | tools_and_hardware |
| NT3 | adhesives_and_binders |
| NT3 | hand_and_power_tools |
| NT4 | digging_and_lifting_tools |
| NT4 | drills_and_bits |
| NT4 | edged_and_pointed_tools |
| NT4 | fasteners |
| NT4 | gripping_and_tightening_tools |
| NT4 | hammers |
| NT4 | measuring_and_marking_tools |
| NT4 | power_tools_manufacturers |
| NT4 | smoothing_and_shaping_tools |
| NT4 | wrenches |
| NT4 | machine_tools |
| NT1 | social_sciences |
| NT2 | anthropology |
| NT3 | archeology |
| NT4 | ages_and_periods |
| NT4 | prehistoric_humanoids |
| NT3 | branches_of_anthropology |
| NT4 | anthropologists |
| NT3 | customs_and_practices |
| NT3 | kinship_and_marriage |
| NT3 | peoples |
| NT3 | races_of_people |
| NT2 | history |
| NT3 | ancient_history |
| NT3 | ancient_Rome |
| NT4 | Roman_emperors |
| NT3 | historians |
| NT3 | historical_eras |
| NT3 | U.S._history |
| NT4 | slavery_in_the_U.S. |
| NT2 | human_sexuality |
| NT2 | linguistics |
| NT3 | descriptive_linguistics |
| NT4 | grammar |
| NT5 | parts_of_speech |
| NT4 | phonetics_and_phonology |
| NT3 | historical_linguistics |
| NT3 | languages |
| NT3 | linguistic_theories |
| NT3 | linguists |
| NT3 | rhetoric_and_figures_of_speech |
| NT3 | sociolinguistics |
| NT4 | dialects_and_accents |
| NT3 | writing_and_mechanics |
| NT4 | punctuation_and_diacritics |
| NT4 | writing_systems |
| NT2 | psychology |
| NT3 | psychological_disorders |
| NT4 | manias |
| NT4 | phobias |
| NT3 | psychological_tools_and_techniques |
| NT3 | schools_and_doctrines_of_psychology |
| NT4 | psychologists |
| NT3 | states_and_behaviors |
| NT2 | sociology |
| NT3 | attitudes_and_behavior |
| NT3 | social_movements_and_institutions |
| NT4 | civil_rights |
| NT4 | feminism |
| NT3 | social_structures |
| NT3 | social_types |
| NT4 | senior_citizens |
| NT4 | social_stereotypes |
| NT1 | transportation |
| NT2 | aviation |
| NT3 | aircraft |
| NT4 | aircraft_parts |
| NT3 | airlines |
| NT4 | airline_companies |
| NT3 | airports |
| NT3 | aviation_occupations |
| NT3 | avionics_and_instrumentation |
| NT2 | freight_and_shipping |
| NT3 | trucking_industry |
| NT3 | package_delivery_industry |
| NT2 | ground_transportation |
| NT3 | animal_powered_transportation |
| NT3 | automotive_industry |
| NT4 | car_rentals |
| NT4 | automobiles |
| NT4 | automotive_parts |
| NT4 | automotive_repair |
| NT4 | motorcycles |
| NT4 | trucks_and_buses |
| NT5 | bus_companies |
| NT3 | human_powered_vehicles |
| NT3 | rail_transportation |
| NT4 | railroad_industry |
| NT5 | railroad_cars |
| NT5 | railroad_jargon |
| NT5 | railroad_personnel |
| NT5 | trains |
| NT4 | subways |
| NT3 | roadways_and_driving |
| NT3 | sleds_and_sleighs |
| NT2 | marine_transportation |
| NT3 | boat_parts |
| NT3 | boats_and_ships |
| NT3 | nautical_occupations |
| NT3 | seamanship |
| NT3 | waterways |
| TT | social_environment |
| NT1 | belief_systems |
| NT2 | folklore |
| NT2 | mythology |
| NT3 | mythological_beings |
| NT4 | mythological_creatures |
| NT4 | mythological_humans |
| NT3 | mythological_gods |
| NT4 | Aztec_gods |

|   | category |
|---|---|
| NT4 Celtic_gods | NT4 dresses_and_skirts |
| NT4 Egyptian_gods | NT4 pants_and_shorts |
| NT4 Greek_gods | NT4 shirts_and_tops |
| NT4 Japanese_gods | NT4 sporting_wear |
| NT4 Mesopotamian_gods | NT4 suits_and_uniforms |
| NT4 Norse_and_Germanic_gods | NT4 sweaters_and_vests |
| NT4 Roman_gods | NT3 sewing_terms |
| NT3 myths_and_legends | NT3 undergarments |
| NT3 utopias | NT4 hosiery |
| NT2 philosophy | NT4 lingerie_and_support |
| NT3 philosophers | NT4 men's_underwear |
| NT3 philosophical_ideas | NT4 nightclothes_and_deshabille |
| NT3 schools_of_philosophy | NT2 cosmetics |
| NT2 religion | NT3 cosmetics_industry |
| NT3 doctrines_and_practices | NT3 facial_hair |
| NT3 God_and_divinity | NT3 hair_styling |
| NT3 history_of_religion | NT2 jewelry |
| NT3 neo-Paganism | NT1 family |
| NT4 astrology | NT2 contraception_and_fertility |
| NT5 signs_of_zodiac | NT2 death_and_burial |
| NT3 religious_institutions_and_structures | NT3 funeral_and_burial_industry |
| NT3 religious_personnel | NT2 infancy |
| NT3 sacred_texts_and_objects | NT2 kinship_and_ancestry |
| NT3 world_religions | NT2 marriage_and_divorce |
| NT4 Christianity | NT2 pregnancy_and_birth |
| NT5 Bible | NT2 upbringing |
| NT5 Christian_denominations | NT1 food_and_agriculture |
| NT5 Christian_heresies | NT2 agricultural_equipment |
| NT5 Christian_theologians | NT2 agricultural_technology |
| NT5 evangelism | NT3 fertilizers |
| NT5 liturgical_garments | NT3 pesticides |
| NT5 protestant_reformation | NT4 fungicides |
| NT5 Roman_Catholicism | NT4 herbicides |
| NT6 religious_orders | NT2 aquaculture |
| NT6 popes | NT2 cereals_and_grains |
| NT4 eastern_religions | NT2 condiments |
| NT5 Buddhism | NT2 dairy_products |
| NT5 Hinduism | NT2 drinking_and_dining |
| NT6 Hindu_deities | NT3 alcoholic_beverages |
| NT4 Islam | NT4 beers |
| NT4 Judaism | NT4 liqueurs |
| NT4 sects | NT4 liquors |
| NT1 clothing_and_appearance | NT4 mixed_drinks |
| NT2 clothing | NT4 wines |
| NT3 clothing_accessories | NT5 wineries |
| NT4 belts | NT3 meals_and_dishes |
| NT4 functional_accessories | NT3 non-alcoholic_beverages |
| NT4 gloves | NT4 soft_drinks |
| NT3 fabrics | NT2 farming |
| NT4 cloth | NT2 fats_and_oils |
| NT4 laces | NT2 food_and_drink_industry |
| NT4 leather_and_fur | NT3 foodservice_industry |
| NT3 footwear | NT3 meat_packing_industry |
| NT4 garment_parts | NT2 forestry |
| NT4 garment_fasteners | NT3 forest_products |
| NT4 garment_trim | NT2 fruits_and_vegetables |
| NT3 headgear | NT2 mariculture |
| NT4 hats | NT2 meats |
| NT3 helmets_and_headdresses | NT3 beef |
| NT3 neckwear | NT3 pate_and_sausages |
| NT3 outer_garments | NT3 pork |
| NT4 coats_and_jackets | NT3 poultry |

- 26 -

| | category |
|---|---|
| NT3 seafood | NT5 fiction |
| NT2 nuts_and_seeds | NT6 horror_fiction |
| NT2 pastas | NT6 mystery_fiction |
| NT3 prepared_foods | NT5 non-fiction |
| NT3 breads_and_crackers | NT6 biographers |
| NT3 candies | NT6 biographies |
| NT3 desserts | NT6 reference_books |
| NT4 cakes | NT5 satire |
| NT4 cookies | NT4 styles_and_schools_of_literature |
| NT4 pies | NT3 performing_arts |
| NT3 pastries | NT4 dance |
| NT3 sauces | NT5 ballet |
| NT3 soups_and_stews | NT5 dancers_and_choreographers |
| NT2 ranching | NT5 folk_dances |
| NT2 soil_management | NT5 modern_dance |
| NT2 spices_and_flavorings | NT4 drama |
| NT3 sweeteners | NT5 drama_types |
| NT2 supermarkets | NT5 dramatic_structure |
| NT1 home | NT5 dramatists |
| NT2 home_furnishings | NT5 stage_actors |
| NT3 beds | NT5 stagecraft |
| NT3 carpets_and_rugs | NT4 music |
| NT3 cases@_cabinets@_and_chests | NT5 blues_music |
| NT3 chairs_and_sofas | NT5 classical_music |
| NT3 curtains@_drapes@_and_screens | NT6 classical_composers |
| NT3 functional_articles | NT6 opera_and_vocal |
| NT3 home_appliances | NT5 composition_types |
| NT3 lamps_and_mirrors | NT5 folk_music |
| NT3 linens_and_fabrics | NT5 jazz_music |
| NT3 ornamental_objects | NT5 music_industry |
| NT3 stools_and_stands | NT5 music_terminology |
| NT3 tables_and_desks | NT5 musical_instruments |
| NT2 kitchen | NT6 keyboard_instruments |
| NT3 cookers | NT6 percussion_instruments |
| NT3 cooking | NT6 string_instruments |
| NT3 fine_china | NT6 wind_instruments |
| NT3 flatware | NT7 brass_instruments |
| NT3 glassware | NT7 woodwinds |
| NT3 kitchen_appliances | NT5 musicians_and_groups |
| NT3 kitchen_utensils | NT5 popular_music_and_dance |
| NT3 pots_and_pans | NT5 television_and_radio |
| NT3 serving_containers | NT3 cartoons@_comic_books@_and_superheroes |
| NT2 hotels_and_lodging | NT3 science_fiction |
| NT1 leisure_and_recreation | NT3 visual_arts |
| NT2 arts_and_entertainment | NT4 photography |
| NT3 cinema | NT5 cameras |
| NT4 movie_people | NT5 photographic_lenses |
| NT4 movie_stars | NT5 photographers |
| NT4 movie_terms | NT5 photographic_processes |
| NT4 movie_tools_and_techniques | NT5 photographic_techniques |
| NT3 entertainments_and_spectacles | NT5 photographic_tools |
| NT4 entertainers | NT4 art_galleries_and_museums |
| NT4 theater_types | NT4 graphic_arts |
| NT3 literature | NT4 painting |
| NT4 authors | NT5 painters |
| NT4 classical_literature | NT5 painting_tools_and_techniques |
| NT4 literary_devices_and_techniques | NT5 painting_types |
| NT4 poetry | NT5 styles_and_schools_of_art |
| NT5 classical_poetry | NT4 sculpture |
| NT5 poetic_styles_and_techniques | NT5 sculptors |
| NT5 poets | NT5 sculpture_tools_and_techniques |
| NT4 prose | NT5 sculpture_types | category

```
NT2 games
NT3 indoor_games
NT4 board_games
NT4 card_games
NT4 video_games
NT3 outdoor_games
NT2 gaming_industry
NT3 gambling
NT2 gardening
NT3 gardens
NT2 hobbies
NT3 crafts
NT3 pets
NT2 outdoor_recreation
NT3 hunting_and_fishing
NT2 restaurant_industry
NT2 smoking_and_tobacco
NT2 sports
NT3 baseball
NT3 basketball
NT3 bicycling
NT3 bowling
NT3 boxing
NT3 equestrian_events
NT4 horse_racing
NT3 football
NT3 golf
NT3 hockey
NT3 martial_arts
NT3 motor_sports
NT3 skiing
NT3 soccer
NT3 sports_equipment
NT3 swimming_and_diving
NT3 tennis
NT3 track_and_field
NT2 tourism
NT3 places_of_interest
NT3 resorts_and_spas
NT3 cruise_lines
NT2 toys
```

Each ontology shown in FIG. 1 contains a plurality of levels that form the hierarchical structure. For example, the "business and industry" static ontology contains three levels of concept classifications under the highest level concept, and the "economics" contain four levels of concept classifications. Generally, the static ontologies of the present invention include no more than six to ten levels. However, the number of levels in the static ontologies is not limited in the range of six to ten levels.

The actual configuration, structure and orientation of a particular ontology is dependent upon the subject matter or field of the ontology. Therefore, each ontology in the set of static ontologies of the present invention contain a different point of view. The different points of view for the static ontologies result in different approaches or different ways of viewing the knowledge concepts in the different static ontologies. Consequently, the organization of the knowledge concepts in each ontology is not consistent. As is explained below, the different points of view for the ontologies permit combining "like" forms of knowledge with "unlike" forms of knowledge through linking of one or more static ontologies.

Although the set of static ontologies are broad to cover a wide range of concepts, they are not extremely detailed. In addition, the set of static ontologies do not contain concepts that are extremely volatile. For an example ontology, a classification for "computers", may contain a sub classification for "operating systems." However, particular types of operating systems, such as "Windows" and "OS/2", are too volatile, and therefore would not be contained in the example computer ontology. Because the static ontologies define a broad range of concepts but not in great detail, they remain relatively stable over time. Therefore, the static ontologies do not require frequent updates.

Figure 2:
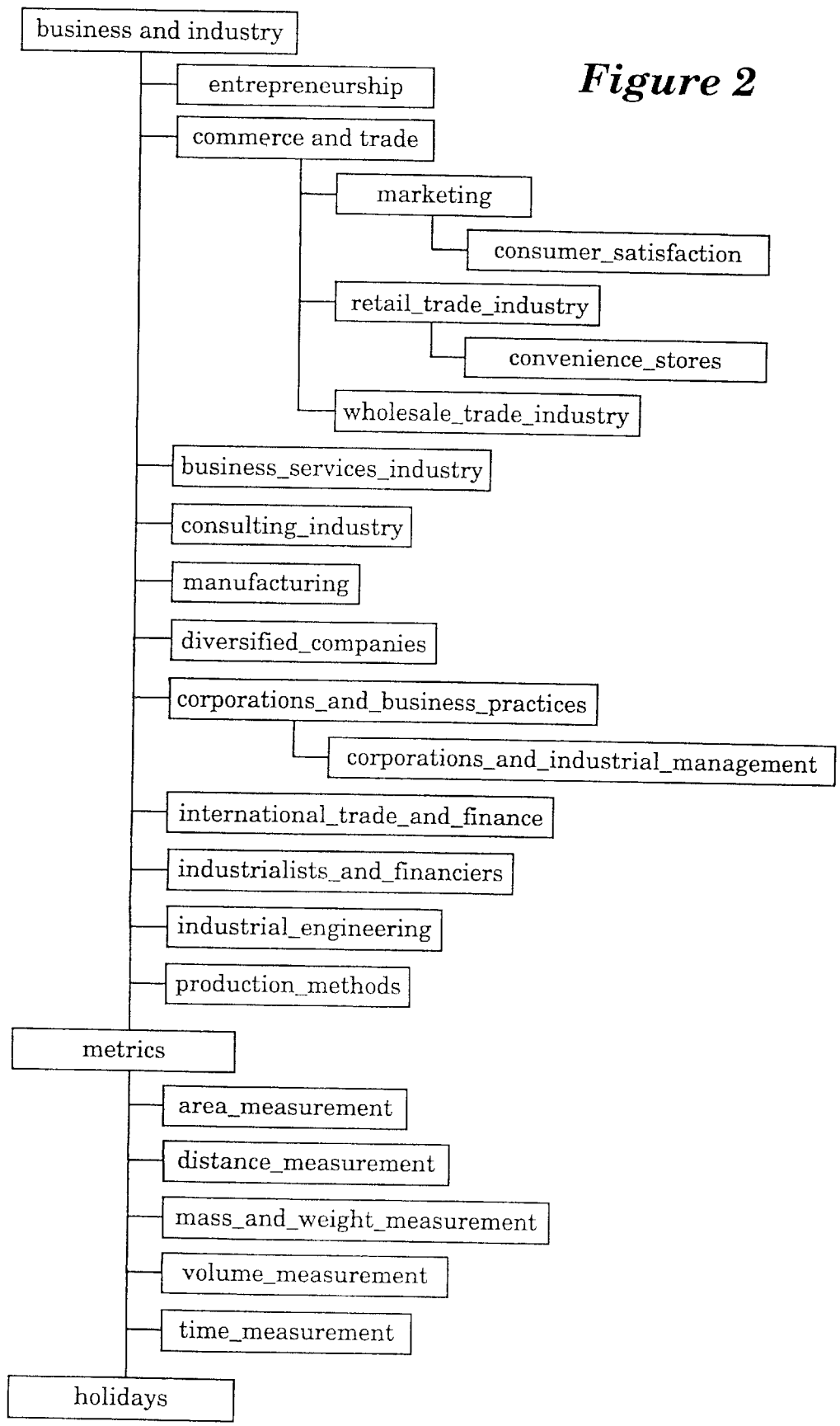
FIG. 2 illustrates an example ontology for "business and industry."

The ontologies contained within the knowledge catalog of the present invention are organized such that the concepts are independent of language and culture. Therefore, the set of static ontologies in the knowledge catalog of the present invention provide a world view of knowledge. FIG. 2 illustrates an example ontology for "business and industry." As shown in FIG. 2, the "business and industry" ontology includes a hierarchical structure of four levels. The knowledge concepts in the static ontologies are applicable to all cultures and languages. For example, in the "business and industry" ontology, the concept "commerce and trade" is a sub classification of the top level "business and industry" concept. Under the concept "commerce and trade", the ontology includes the concepts "marketing", "retail trade industry", and "wholesale trade industry." For this example, all cultures engaging in commerce and trade have concepts in marketing, retail trade industry, and wholesale trade industry. Although different words in different languages are used to describe the concepts of "marketing", "retail trade industry", and "wholesale trade industry", these concepts exist in all cultures. Therefore, the "business and industry" ontology, similar to all of the static ontologies, is not dependent on language or culture.

The "business and industry" ontology illustrated in FIG. 2 contains three levels of concepts in the hierarchical structure. With only three levels, the "business and industry" ontology does not contain too much detail by including low level concepts or words that are specific to the business and industry field. For example, an additional category for "Wallmart" may be desired to more specifically classify knowledge beyond the concept of "convenience stores." However, the concept of "Wallmart" is too detailed for the business and industry static ontology because "Wallmart" does not translate across cultures and languages. For this example, in order to classify "Wallmart", the concept is placed in a dynamic level as is explained below.

The static ontologies in the knowledge catalog are in essence a new type of book. For example, a thesaurus provides words with their linguistic connotations. However, a thesaurus does not provide real world culturally independent knowledge concepts, including both semantic and linguistic derivatives of the knowledge concepts. Also, as is explained below, the knowledge catalog of the present invention distinguishes between ambiguous and non ambiguous terminology, concrete and abstract terminology, mass and count sense, and noun and nominals. The thesaurus does not provide these important distinctions. Similarly, a dictionary, which provides definitions and origins of words, does not provide such an organization of knowledge concepts. Also, an encyclopedia, which provides detailed information on a variety of subject matters, does not provide a world view of knowledge as the knowledge catalog of the present invention.

As is explained below, one application for the knowledge catalog of the present invention is classification of documents. One implementation of the document classification application permits a user to browse through concepts in one or more ontologies that have been classified for that document. For such an application, the static ontologies contained in the knowledge catalog of the present invention permit navigation through concepts independent of language. A document classified utilizing the knowledge catalog of the present invention may be presented in any language because the concepts in the static ontologies are applicable across languages. For example, if a Japanese document were classified in the "business and industry" ontology, then an English language user could navigate through the Japanese document by viewing selected concepts in the "business and industry" ontology without ever realizing the document is in Japanese. For this example, the English language user may note that the document contains information on "marketing", and more specifically on "customer satisfaction."

Figure 3:
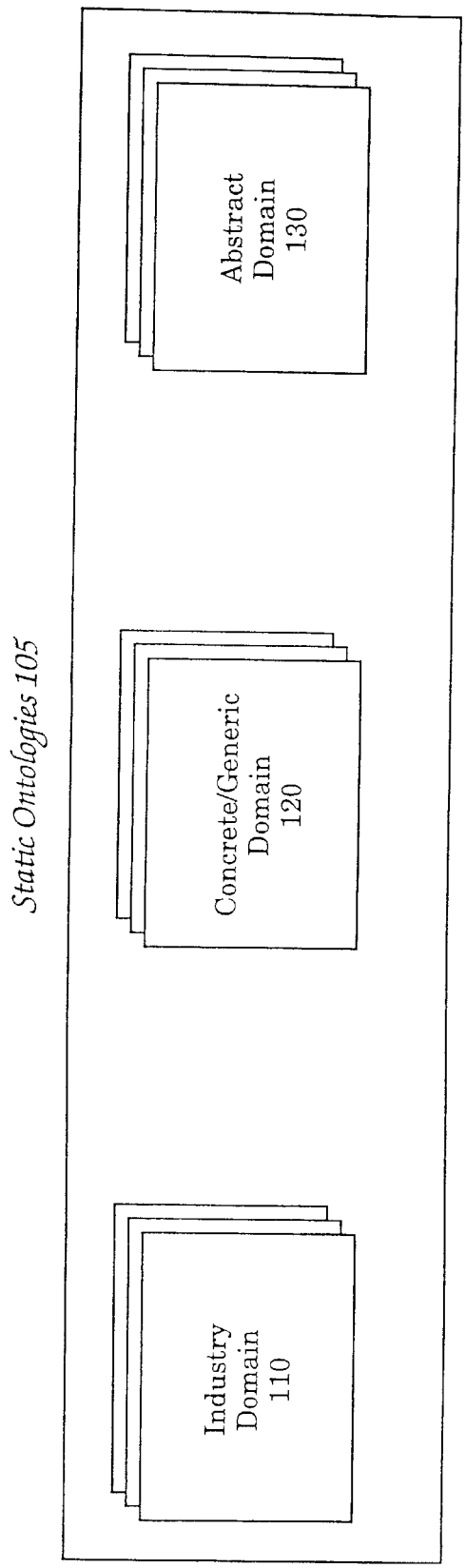
FIG. 3 illustrates a high level conceptualization for a set of static ontologies.

A high level conceptualization for a set of static ontologies are shown in FIG. 3. For this embodiment, a set of static ontologies 105 are organized in an industry domain 110, a concrete/generic domain 120, and an abstract domain 130. The industry domain 110 includes a plurality of the static ontologies to represent words that define concrete terminology specific to one or more industries or fields of study. There are different types of industry domain 110 ontologies. For example, a classification for "electronics" includes sub-classifications for "computers" and "micro electronics." Other classifications, such as "geography", are separated into two high level classifications, "political" and "physical" geography. The industry domain 110 separates the political and physical geography classifications because the concepts of political and physical geography are very different, and each classification includes different sub-classifications beneath them.

Some of the set ontologies in the industry domain 110 are not as much industries but rather concrete concepts. For example, "clothing" represents a specific concrete ontology. In the hierarchical structure, some sub-classifications provide factual information for the higher level or parent classification, while other sub-classifications provide more richness to the parent classification. For example, the term "computer program" provides more richness to the parent classification "computer industry." However the term "California avocados" provides factual information for the parent classification "avocados" by representing that the avocados are from California.

As shown in FIG. 3, for the preferred embodiment, the static ontologies 105 further include the concrete/generic domain 120 and abstract domain 130. The concrete/generic domain 120 contains static ontologies to represent knowledge concepts that have concrete definitions, but may be applicable to one or more specific industries or categories (e.g. the terms are generic). For example, the word "plant", when used to describe a manufacturing plant, is a concrete term that applies to many industries. Therefore, a classification for "plant" is located in the concrete/generic domain 120. The abstract domain 130 contains representations of words that are not concrete, but rather describe abstract concepts. For example, the concepts of "knowledge" and "methods" do not describe material items, but are "abstract" concepts. Although the present invention is described in conjunction with a specific domains (e.g. industry, concrete/generic, and abstract domains), other organizations may be used to define the static ontologies without deviating from the spirit and scope of the invention.

The static ontologies of the present invention are relational such that the linking of one or more static ontologies, or portions thereof result in a very detailed organization of knowledge concepts. As described above, each static ontology provides a high level view of a particular subject; however, linking or cross referencing among two or more static ontologies results in many combinations of knowledge hierarchical structures. For example, for the static ontologies shown in FIG. 1, if a particular classification included concepts in "business and industry" and "economics", then the combination of the "business and industry" and "economics" ontologies provides seven hierarchical levels for that classification. Therefore, the parallel and independent nature of static ontologies, when linked or cross referenced, provides an extremely detailed and comprehensive coverage of knowledge concepts. In order to provide a complete classification hierarchy without cross referencing the independent and parallel ontologies of the present invention, it would require developing a hierarchy that anticipated every combination of knowledge concepts. As can be realized, if this approach is taken for each subject, then setting forth every conceivable breakdown becomes impossible. The groupings of independent and parallel ontologies provide a relational knowledge catalog.

The parallel and independent ontologies of the present invention allow for the greatest amount of flexibility in developing a detailed classification breakdown. For example, a first ontology may include a concept for "geography", and a second ontology may include a concept for "computers." Geography and computers are very different topics, and seemingly unrelated. The "geography" and the "computers" concepts are located in different ontologies due to the very different nature of the subject matter. However, the cross referencing of the "geography" and the "computers" ontologies permits linking the two different subject matters. For example, for the document classification application, a document may be about how different computers are used in different geographical areas.

Figure 4:
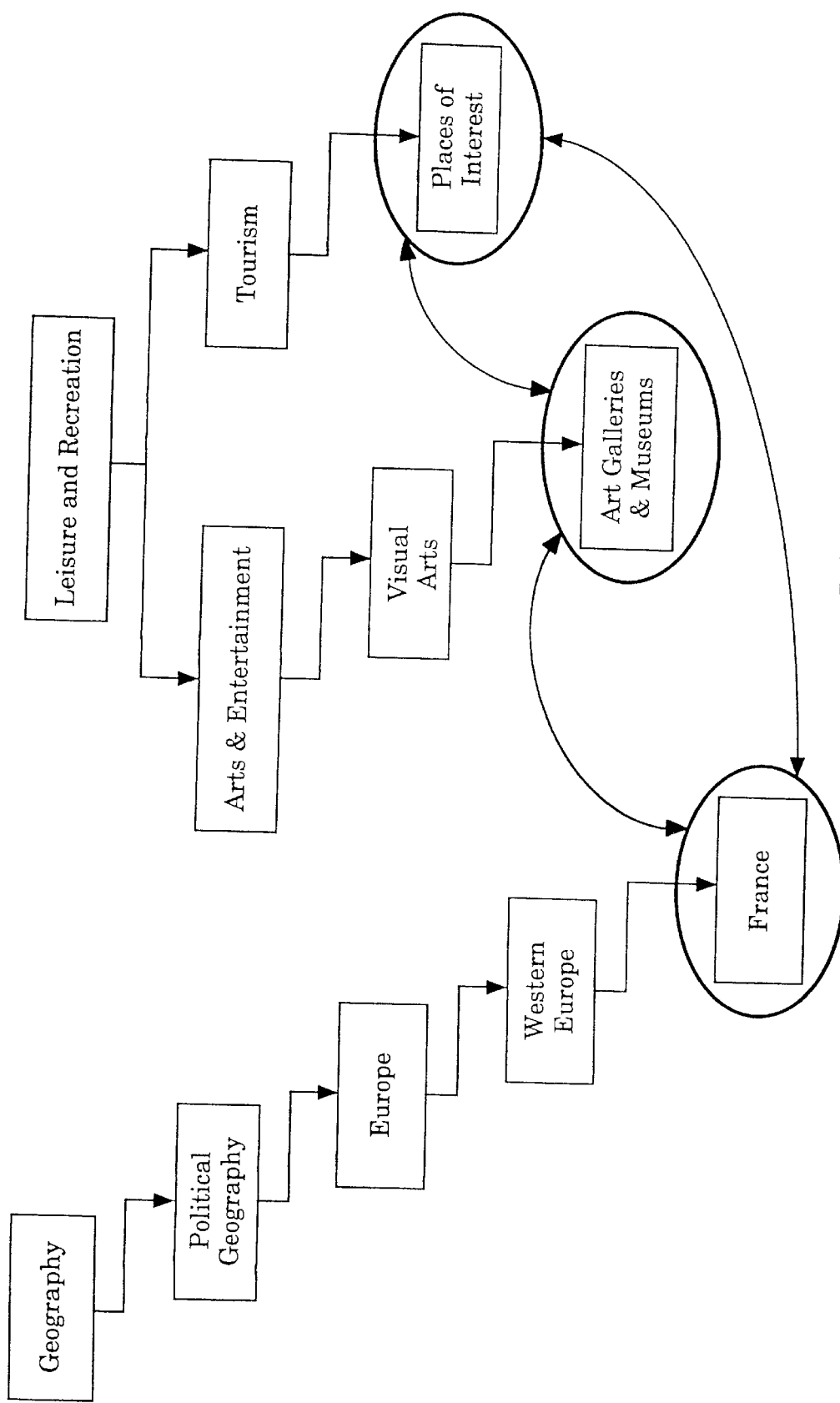
FIG. 4 illustrates two static ontologies for classifying an example input discourse.

The following example illustrates the use of cross referencing or cross linking ontologies to generate a very detailed hierarchical classification. The following example illustrates classifying a document on travel or tourism, and more specifically on traveling to France and visiting museums. For a non-relational hierarchical system (e.g. one that does not contain parallel and independent ontologies), the classification system includes travel or tourism as a high level topic, and the entire geographical regions of the world underneath the travel topic. Furthermore, underneath each of the geographical regions, a list of activities for each of them would be required. FIG. 4 illustrates two static ontologies for classifying the above example. As shown in FIG. 4, a separate "geography" ontology includes the sub classifications for "political geography", "Europe", "Western Europe", and "France." To further classify the concepts, the "leisure and recreation" ontology includes sub classifications for "tourism" and "places of interest", as well as for "arts and entertainment", "visual arts", and "art galleries and museums." As shown by the arrows in FIG. 4, by linking or cross referencing the concepts "France", "art galleries and museums", and "places of interest", these two static ontologies classify information on traveling to France, and visiting art galleries and museums.

Other classification systems do not provide the level of detail provided by cross referencing the concepts in the ontologies of the present invention. For example, the Library of Congress classifies documents based on an average of nine or ten levels of sub classifications within a particular area, topic or field of study. In the preferred embodiment of the static ontologies, the average number of levels in a hierarchical ontology is approximately five or six. As illustrated by the above example, the knowledge catalog is actually much more detailed than a nine or ten level system, such as the classification system utilized by the Library of Congress. Through use of cross referencing and linking, three static ontologies, containing six levels each, linked together generate eighteen levels of hierarchical structure. Therefore, the knowledge catalog is much more detailed than other classification systems.

The hierarchically structured concepts contained within the static ontologies may be semantic derivatives and/or linguistic derivatives of the high level concept. For example, a classification hierarchy may associate a "house" with articles placed within a house, such as dining room tables, chairs, bedroom furniture, etc. For this example, a classification hierarchy that includes semantic derivative concepts based on the "house" concept is desirable. However, for a purely linguistic classification hierarchy, the house "concept" may include types of houses, such as a ranch style house, a contemporary house, etc. The knowledge catalog of the present invention provides the framework or structure to generate hierarchical classifications including both semantic derivatives and/or linguistic derivatives of high level concepts. Utilizing the static ontologies of the present invention, a knowledge map may be generated that links both concepts representing articles placed within a house and concepts representing types of houses to the higher level "house" concept. Consequently, the flexibility provided by the structure of the knowledge catalog permits generation of a true knowledge map.

DYNAMIC LEVEL

The words used to describe an industry are dynamic such that new words and terminology are constantly be added to convey new concepts relating to the industry. For example, in the computer industry, new terminology is developed to describe new emerging concepts. In order to accommodate this, the knowledge catalog of the present invention includes a detailed coverage of concepts through use of a dynamic level. As discussed above, the static ontologies represent a world view of knowledge by including a broad, but not extremely detailed, coverage of knowledge concepts. The dynamic level adds details for the knowledge catalog 100 by including additional words and terminology to permit a detailed and in-depth coverage of specific concepts contained in a particular discourse. Therefore, additional detailed concepts not contained in the static ontologies are contained in the dynamic level.

Although the static ontologies are not extremely detailed, they provide enough context to expand the static ontologies into the dynamic level. In general, the dynamic level learns words and terminology in relationship to the static ontologies. In this way, detailed concepts and terminology are mapped from the static ontologies into the dynamic level. Specifically, the dynamic level attaches words to the static ontologies, and enables learning of specific words and terms from a given input discourse. The specific words and terms are used to further describe and define the higher level concepts. Therefore, the world view of the knowledge catalog 100 is completed in detail through the use of the dynamic level.

Figure 5:
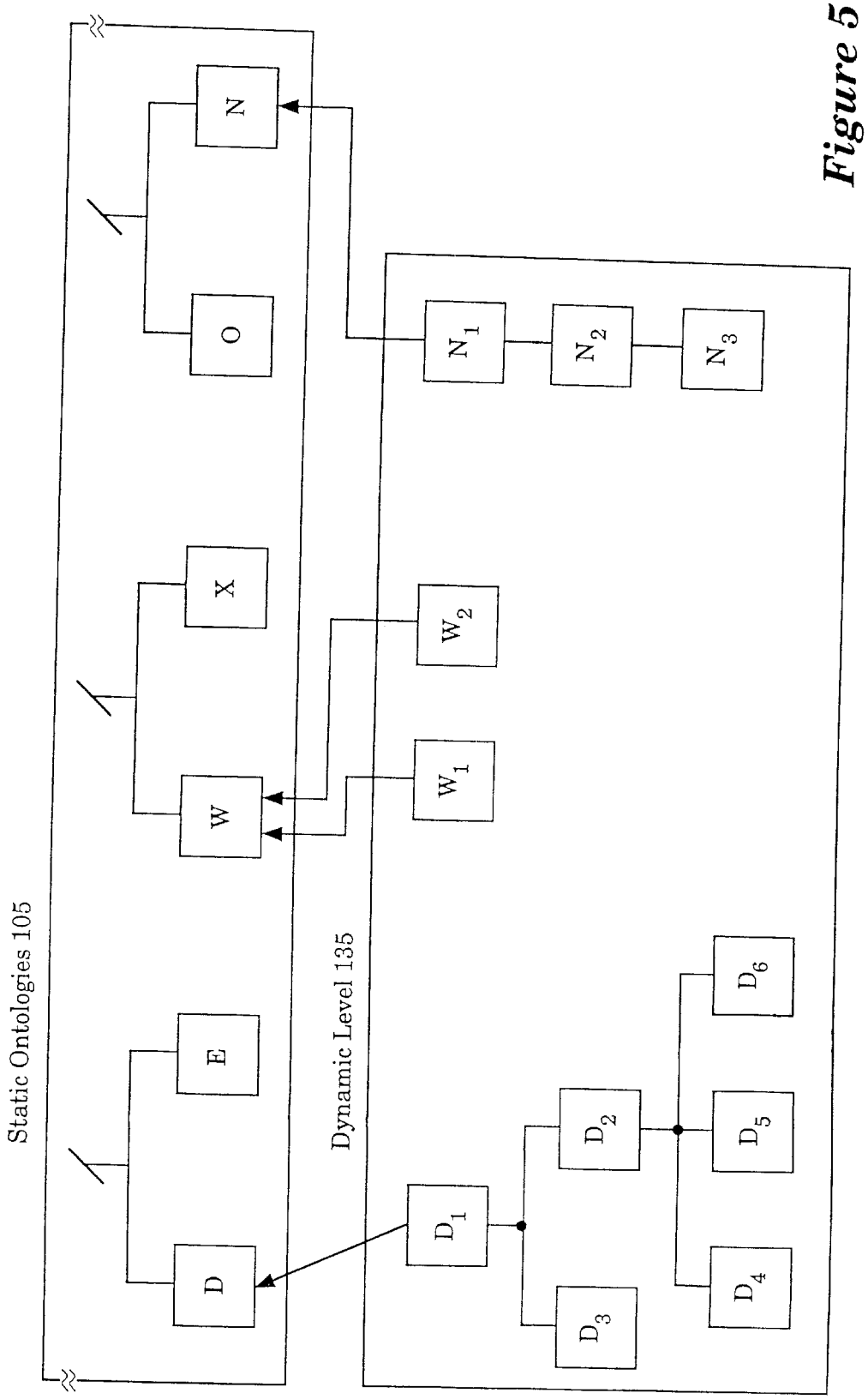
FIG. 5 illustrates an example of expanding static ontologies into a dynamic level.

FIG. 5 illustrates an example of expanding static ontologies 105 into a dynamic level 135. For the example illustrated in FIG. 5, the static ontologies 105 contain a plurality of concepts, such as concepts "D", "E", "W", "X", "O", and "N." The dynamic level 135 is expanded such that the concept "D" is expanded into the sub classifications $D_1$, $D_2$, $D_3$, $D_4$, $D_5$, and $D_6$. Similarly, for the concept "W" is expanded to include additional sub classifications $W_1$ and $W_2$, and the concept "N" is expanded to include additional sub classifications $N_1$, $N_2$, and $N_3$.

For purposes of explanation, the static ontologies 105 may be characterized as including classifications or topics found in a bookstore. For this analogy, the dynamic level 135 may be characterized as concepts and information found within the index of books. For example, to find a book on semiconductor manufacturing plants in a bookstore, one first searches to locate books in the general categories of electronics or semiconductors instead of searching under the category of plants. To specifically locate information on semiconductor manufacturing plants, the index of books in the electronic and semiconductor category are searched.

A single static representation that attempts to cover all categories of knowledge in great detail requires constant updating to keep up with the dynamic nature of industry terminology. As discussed above, the static ontologies provide the basic framework for which the concepts in the dynamic level may be expanded. The division of knowledge catalog 100 into the set ontologies 105 and the dynamic level 135 results in a comprehensive yet manageable means to represent knowledge.

The knowledge catalog 100 of the present invention does not require frequent updating because the concepts defined in the set ontologies 105 change infrequently. In addition, the introduction of new terminology is automatically defined in the dynamic level 135 and subsequently linked into the set ontologies 105. The levels of detail in the dynamic level 135 are adaptable. Also, if the static ontologies 105 and dynamic level 135 were combined, it would be easy to lose the content in such a long and complex static hierarchical structure. Furthermore, the knowledge catalog 100 of the present invention separates the abstract with the concrete, without such a distinction, the hierarchical classifications would become extremely confusing.

The following describes generating the dynamic level in accordance with one embodiment of the present invention.

DYNAMIC CLASSIFICATION SYSTEM

In general, a dynamic classification system receives input discourse, and generates, as output, a dynamic classification index. The classification index contains hierarchical knowledge representations of the input discourse integrated to the static ontologies. The dynamic classification system contains a morphology section coupled to a linguistic engine. The linguistic engine receives the input discourse for processing. In general, the linguistic engine processes the input discourse by analyzing the grammatical or contextual aspects, as well as the stylistic and thematic attributes of the input discourse. Specifically, the linguistic engine generates contextual, thematic, and stylistic tags that characterize the input discourse. The linguistic engine generates a structured output containing, in part, the contextual, thematic, and stylistic tags. Furthermore, the linguistic engine extracts the topic and content for each sentence in the input discourse.

The morphology includes a lexicon and the knowledge catalog of the present invention. In general, the lexicon contains definitional characteristics for a plurality of words and terms. For example, the lexicon defines whether a particular word is a noun, a verb, an adjective, etc. The linguistic engine utilizes the definitional characteristics stored in the lexicon to generate the contextual, thematic, and stylistic tags in the structured output. The generation of thematic tags is described more fully below. A document entitled "Lexicon Documentation", provides a description of the definitional characteristics in accordance with one embodiment. The "Lexicon Documentation" is incorporated herein by reference.

The dynamic classification system further includes a knowledge catalog processor, theme vector processor, and content indexing processor. The knowledge catalog processor, theme vector processor and content indexing processor are coupled to the lexicon and knowledge catalog. In general, the knowledge catalog processor receives, as inputs, the structured output including the extracted content, the knowledge catalog, and the lexicon, and processes the extracted content for use with the knowledge catalog. The theme vector processor receives, as inputs, the structured output, the processed output from the knowledge catalog processor, the knowledge catalog, and the lexicon. The theme vector processor identifies the most important themes in the input discourse, and maps these themes into the knowledge catalog.

The content indexing processor receives as inputs, the definitional characteristics in the lexicon, the structured output, and theme information from the theme vector processor. The content indexing processor, in accordance with the dynamic classification system of the present invention, extends the static ontologies into the dynamic level based on the specific terminology contained in the input discourse. Furthermore, the content indexing processor attaches the dynamic level terminology into the concepts in the static ontologies 105 that were mapped by the theme vector processor.

As described above, the knowledge catalog describes all senses for a particular word or term. In a preferred embodiment, the content and topic of sentences is extracted in the linguistic engine, and is input to the knowledge catalog processor in the form of content carrying words. The dynamic classification system only operates on the content carrying words for which the sense has been determined with a large degree of certainty (e.g. the non ambiguous content carrying words). After determining the sense of content carrying words, the dynamic classification system determines the expressions of content for the input discourse.

The dynamic classification system may be implemented in either hardware or software. For the software implementation, the dynamic classification system is software that includes a plurality of computer executable instructions for implementation on a general purpose computer system. Prior to loading into a general purpose computer system, the dynamic classification system software may reside as encoded information on a computer readable medium, such as a magnetic floppy disk magnetic tape, and compact disc read only memory (CD-ROM). In one hardware implementation, the linguistic engine, the knowledge catalog processor, the theme vector processor and the content indexing processor may each comprise dedicated processors including processor instructions for performing the functions described herein. Circuits may also be developed to perform the functions described herein. The lexicon and the knowledge catalog may be implemented as databases stored in memory for use by the dynamic classification system 200.

The sense of content carrying words in the input discourse are determined. For all words in which the sense has been determined, the relative importance of these words, with respect to each other, are determined. Based on the relative importance, the words are mapped to the static ontologies to reflect the high level or general concepts disclosed in the input discourse. Based on words contained in the input discourse, the static ontologies are expanded to include dynamic ontologies that contains more detailed concepts. The static ontologies and the dynamic ontologies provide a detailed world view of knowledge. The input discourse is dynamically classified using the static and dynamic ontologies.

In general, the concepts mapped to the static and dynamic ontologies capture the overall world view content classification of the input discourse. However, through discourse of a document, a combination of the abstract expressions of the knowledge catalog elements represent the actual content of the particular document. Therefore, the concepts from the static ontologies are an abstract representation of input discourse themes in time. The combination of these themes in time represent the actual content of the input discourse.

The knowledge catalog processor processes content carrying words for use by the theme vector processor. Specifically, the knowledge catalog processor generates the noun or nominal forms of the content carrying words in the input discourse. The knowledge catalog processor parses the knowledge catalog 100 to compare the content carrying words with the knowledge concepts stored in the static ontologies. If the content carrying word is not contained in at least one domain in the static ontologies, then the word is noted as being not yet understood. If the word is stored more than once in the static ontologies, then the word is classified as ambiguous. If the word is stored only once in the static ontologies, then the word is classified as non ambiguous. If a word is classified as non ambiguous, then the theme vector processor determines the concept of the word from the static ontologies. In a preferred embodiment, a minimum of 50% of the content carrying words must be recognized as non ambiguous.

As discussed above, the knowledge catalog processor generates noun and nominal forms of content carrying words for look-up in the knowledge catalog. In order to accomplish this, the knowledge catalog processor reads the grammatical tags in the structured output to determine which words are the content carrying words. The contextual tags determine whether a word carries content. For example, the word "will" could be an auxiliary verb or it could be a noun (e.g. a legal term). As an auxiliary verb, the word "will" carries no content. Using the content carrying words, the knowledge catalog processor separates nouns and non nouns. The non noun content carrying words, such as adjectives, adverbs, and verbs, etc., are converted into nouns or nominal forms. For example, the verb "fishing" is converted to "to fish." The content carrying nouns are further analyzed to determine whether the word has a mass sense and/or a count sense. For example, the word "baseball", which is the mass sense of the word, has a completely different meaning than the count sense "baseballs."

In the preferred embodiment, because the noun sense of a word may be different than the nominal sense, and the mass sense may be different than the count sense, a separate classification or tree attachment exists for nominal and noun forms as well as for mass and count senses. Therefore, the knowledge catalog 100 stores all possible senses of a content carrying word. For example, the noun "a fish" has a different meaning than the verb "fishing" which was nominalized to "to fish." Based upon the above criteria, every content carrying word contains up to four potential pointers into one or more categories in the static ontologies. Specifically, each content carrying word may contain a pointer to the static ontologies 105 for the noun form, the nominal form, the mass sense, and the count sense.

In addition to nouns and regular content carrying words discussed above, words in the input discourse may also be characterized as special words. These special words include orienters and global classifiers. Orienter words guide the reader to a field of study regardless of the use of the word. A global classifier word carries the essence of a particular category, wherein the category may include sub categories beneath the category defined by the global classifier. In generating the pointers to the static ontologies, if there is not a concept for the nominal, then the concept of the noun is attached to the concept of the nominal. The special words may be mapped directly into the static ontologies.

After the sense of a majority of the content carrying words has been determined, the dynamic classification system maps key content carrying words into the static ontologies. In order to accomplish this, the theme vector processor determines the relative importance of content carrying words in relationship to other content carrying words. The most important content carrying words are mapped to the knowledge catalog elements in the static ontologies 105.

For purposes of explanation, the static ontologies of the knowledge catalog have three classification hierarchies. Specifically, the database element "A" represents the highest level for the classification hierarchy, and the database element "B" and "C" are sub classifications of "A." Also, the classification hierarchy includes sub classifications "D" and "E" linked to the database element "C." Furthermore, the classification hierarchies contain the database elements "U" and "L", respectively, as the high level classifications.

The theme vector processor receives, as an input, the structured output that contains contextual and thematic tags. In addition, the theme vector processor receives the definitional characteristics from the lexicon. With this information, the theme vector processor executes a plurality of heuristic routines to generate the relative importance of content carrying words in the input discourse. The theme vector processor only operates on non ambiguous content carrying words or ambiguous words that have been disambiguated. In a preferred embodiment, the theme vector processor generates a theme strength based on the output of the heuristic routines. The theme strength of a particular content carrying word is then used in conjunction with the theme strength of another word to generate a ratio of relative thematic importance between all words.

A theme vector output illustrates several relative theme strengths for a number of words in an example input discourse. A ninth word "W9" received a relative weight of 35, and the first word "W1" received a relative weight of 27. Therefore, "W9" has a relative importance of 35/27 in relationship to "W1." The theme vector processor links the most important content carrying words into the ontologies of the static ontologies. As discussed above, the theme vector processor only operates on non ambiguous content carrying words. Therefore, the content carrying words are directly mapped into the database elements of the static ontologies. For his example, the most important word, "W9", has the "D" concept, and therefore is mapped to the "D" knowledge concept in the static ontologies. Note that for this example, the three most important words tie into the ontologies in three separate classification hierarchies. Accordingly, the theme vector processor determines that the three most important concepts in the input discourse are "D", "W", and "N".

In a preferred embodiment, the theme vector processor uses the sixteen most important words of each sentence to map the concepts into the static ontologies. If the input discourse consists of a single paragraph, the sixteen concepts are more than enough to capture the content of the document. For a larger document consisting of many paragraphs, the sixteen most important concepts captures the verbal content, and extending beyond the sixteen concepts typically only reinforces the high level concepts that were deemed most important.

After the most important concepts are mapped into the static ontologies, the content indexing processor expands additional concepts into the dynamic level of the knowledge catalog. In general, the content indexing processor learns how to use content for tie-ins. Terms that fall within the concrete/generic domain and abstract domain are not learned, only terms falling within the industry domain are learned. For example, in a document containing the word "bear", the content indexing processor determines that the sense of bear was used as an animal. Accordingly, the term is attached from the dynamic level up into the animal category in the static ontologies.

The following illustrates an example of expanding the static ontologies into the dynamic level. The content indexing processor receives, as inputs, contextual and thematic tags from the structured output as well as the output of the theme vector processor. From this information, the content indexing processor generates the dynamic classification hierarchies. This example extends the conceptualize example static ontologies discussed above. The knowledge concept "D" is expanded into the sub classifications $D_1$, $D_2$, $D_3$, $D_4$, $D_5$, and $D_6$. Similarly, for the knowledge concepts "W" and "N", the content indexing processor generates additional sub classifications.

THEME PARSING OVERVIEW

As discussed above, the dynamic classification system utilizes the contextual tags stored in the structures output. In one embodiment, the linguistic engine generates the contextual tags via a chaos loop process. A document, entitled "Chaos Processor for Text", contains an explanation for generating contextual or grammatical tags. The document "Chaos Processor for Text" is incorporated herein by reference. All words in a text have varying degrees of importance in the text, some carrying grammatical information, and others carrying the meaning and content of the text. In general, the chaos loop process identifies, for words and phrases in the input discourse, grammatical aspects of the input discourse including identifying the various parts of speech. In order to accomplish this, the chaos loop process ascertains how the words, clauses and phrases in a sentence relate to each other. By identifying the various parts of speech for words, clauses, and phrases for each sentence in the input discourse, the context of the input discourse is defined. The chaos loop process stores information in the form of the contextual tags. For a detailed explanation of the contextual or grammatical tags, seethe document, entitled "Analysis Documentation." The document "Analysis Documentation" is incorporated herein by reference.

The theme vector processor also utilizes the thematic tags stored in the structures output. Each word carries thematic information that conveys the importance of the meaning and content of the input discourse. In general, the thematic tags identify thematic context of the input discourse, such as text. Each word is discriminated in the text, identifying the type of importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria define which of the discriminated words are to be selected for each thematic analysis unit. The text is then output in a predetermined thematic format.

In addition to the grammatical tags and thematic tags, the structured output also includes outputs for extracted topics, kernel sentences, and extracted content. The knowledge catalog processor utilizes these output areas to generate the content carrying words found in the input discourse. The linguistic engine further includes a topic extractor, that identifies the topics of the input discourse, a kernel generator, that generates summarized versions of the input discourse, and a content extractor that identifies key content of the input discourse. In addition, Appendix A, entitled "Theme Parser Code" contains a source code listing for implementing the Theme Parser. Appendix B, entitled "Code Headings", contains a list of defined source code headers corresponding to the theme parser source code of Appendix A.

THEME VECTOR PROCESSING

As discussed above, the theme vector processor identifies the most important theme terms and theme concepts for the input discourse for use by the dynamic classification system of the present invention. In order to generate the theme vector output, the theme vector processor receives thematic tags and contextual tags from the structured output. In addition, the theme vector receives the content carrying words from the knowledge catalog processor. The content carrying words may include single words or phrases. Note that the content carrying words output from the knowledge catalog processor are converted to the noun or nominal form. In turn, the theme vector processor generates a theme vector output. In a preferred embodiment, the theme vector output contains, for each theme term, an importance number (#), a theme strength, and a theme concept.

The theme vector output presents a thematic profile of the contents of input discourse (e.g. a sentence, paragraph, or document). The theme vector output contains a list of nominalized words that represent the major themes in the input discourse. In a preferred embodiment, the theme vector output includes up to sixteen of the most important themes for each sentence, paragraph and document. A theme term in a theme vector is typically based on an actual word or phrase that is contained in the text of the input discourse, or a nominal or plural form of a word. However, the word defining the theme concept may not appear in the input discourse. Instead, the theme concept is conceptualized from the theme term as set forth in a particular ontology stored in the knowledge catalog.

In a preferred embodiment, each theme in the theme vector output is assigned a normalized or relative theme strength. The normalized theme strength is calculated using the theme strengths of each theme term in the text that contribute to the particular theme. At the sentence level, the theme vector processor calculates a theme strength for each word in the sentence. The theme strength of the word measures the thematic weight of the word within the context of the sentence in which it appears. Prior to processing, each word receives a default theme strength that varies depending upon the word. As the theme vector processor analyzes the surrounding text in the sentence to determine the thematic role of the word, it increases or decreases the default theme strength for the word. For example, a theme grading determines how each word in a sentence is functioning within the context and structure of the sentence. The theme grading assigned to a word affects the theme strength for the word.

In the preferred embodiment, the theme vector processor executes a plurality of heuristic routines to generate the theme strengths for each theme. Appendix C, entitled "Theme Vector Code", contains a source code listing for implementing theme vector processing in accordance with one embodiment. Although the generation of the theme strengths is disclosed as computer source code, the theme strengths may be generated by any means, such as through a hardware implementation, without deviating from the spirit or scope of the invention. Thus, a theme vector identifies the 16 strongest themes in a sentence, paragraph or document in proportion to the sentence, paragraph or document for which the theme vector output is generated.

The theme vector processor returns the concept, if one exists, for each theme term in the theme vector. Similar to the theme terms, the theme concepts in the theme vector output contain a theme strength. As the theme vector processor identifies themes that have the same concept in the input discourse, the theme strength for the theme concept increases. This indicates that the theme concept is significantly developed in the input discourse. As a result, the theme vector processor may promote the theme concept to a separate theme in the theme vector output for the corresponding input discourse. For example, if the theme vector processor determines that "printing press" is one of the theme terms in a paragraph, then the theme concept "printing" is assigned to the theme term "printing press." In addition, the theme vector processor assigns a theme strength to the theme concept. The theme vector processor increases the theme strength for "printing" if the paragraph contains other words such as "bold face" and "typesetting", that conceptualize to "printing." The theme concept "printing" may then appear as a theme term for the paragraph, along with its own theme concept, "publishing industry." In a preferred embodiment, the theme vector processor includes input adjustments (not shown) to prevent promoting theme concepts in a theme vector output to additional theme terms.

The following example illustrates a theme vector output generated by the theme vector processor for input discourse, such as a paragraph. The example paragraph is from a document about commercial banks lowering interest rates based on changes to the Federal funds rate.

> Treasury bill yields dropped substantially Friday morning in anticipation of further reductions in the Federal funds rate by the Fed, market watchers said. The 3-month bill fell 8 basis points to a discount equivalent rate of 7.70%, while the 1-year bill was down 12 basis points to 7.30%.

Table 1 illustrates the theme vector output for the example paragraph. As shown in Table 1, for each theme term, the theme vector output includes a theme strength and a theme concept.

TABLE 1

| # | Theme Strength | Theme Terms | Theme Concept |
|---|---|---|---|
| 1 | 43 | banking | finance and investment |
| 2 | 25 | basis points | stocks, bonds, and commodities |
| 3 | 24 | treasury bill yields | banking |
| 4 | 22 | stocks, bonds, and commodities | finance and investment |
| 5 | 22 | points | stocks, bonds, and commodities |
| 6 | 21 | yields | banking |
| 7 | 17 | bills | bills |
| 8 | 12 | federal funds rates | banking |
| 9 | 11 | reductions | banking |
| 10 | 10 | rates | banking |
| 11 | 9 | discount equivalent rates | commerce and trade |
| 12 | 9 | three-month | three-month |
| 13 | 8 | 1-year | 1-year |
| 14 | 8 | rates | commerce and trade |
| 15 | 7 | discounts | commerce and trade |
| 16 | 7 | equivalents | equivalencies |

Based on the theme strength, the theme terms are listed in the order of importance or strength in the paragraph. Table 2 illustrates a portion of an ontology for "economics", and Table 3 illustrates a portion of an ontology for "business and industry." For this example, the theme vector processor maps the theme terms to the above ontologies. This example illustrates the fact that a theme vector output may contain words that are not in the original input discourse. For example, the theme tern "basis points" is conceptualized by the theme vector processor to "stocks, bonds, and commodities." The term "stocks, bonds, and commodities" does not appear in the original input example. The theme vector processor also determines that the theme concept "stocks, bonds, and commodities" is developed significantly enough to be designated as the fourth most important theme for the paragraph.

TABLE 2

Economics
    Finance & Investment
        Banking
        Stocks, Bonds, Commodities

TABLE 3

Business & Industry
    Commerce & Trade

If a theme concept becomes a theme term in the theme vector output, the higher level category from the corresponding ontology is returned as a theme concept. For example, the concept of "banking" is categorized under "finance and investment." If "banking" is a theme concept in the theme vector output, but is also promoted to a theme concept in the theme vector output, then "finance and investment" is returned as the theme concept in the theme vector output.

DYNAMIC CLASSIFICATION

The lower level concepts contained in the input discourse, which are not contained in the static ontologies 105, are classified for the dynamic level 135 (FIG. 5). The classification in the dynamic level 135 may include several independent and unrelated concepts. Once the lower level theme concepts are generated in the dynamic level 135, these lower level concepts are mapped into the higher level concepts previously mapped in the static ontologies 105. Furthermore, the content indexing processor generates cross references in the dynamic level 135 to reference independent concepts found in the static ontologies 105 or dynamic level 135.

The content indexing processor receives high level theme concepts from the theme vector processor. In the preferred embodiment, the static ontologies 105 and dynamic level 135 are based on noun concepts. Based on the grammatical tags and thematic tags, the content carrying words in the input discourse are identified. The head words represent all content carrying words in the input discourse. Generally, all nouns contained in the input discourse are candidates for head words. The content indexing processor utilizes grammatical and thematic tags to determine nouns that contain little or no content value. For example, the noun "copies", without any additional support, carries little content alone. Therefore, if a noun is characterized as "weak" from the grammatical or thematic tags, then the noun is not utilized as a head word.

At this point the content indexing processor generates a plurality of head words, wherein each head word carries content. For each head word, at least one contextual relationship is noted. In a preferred embodiment, the context for each head word is listed hierarchically such that a second contextual relationship to the head word is a more detailed relationship than the first contextual relationship for that head word. From these contextual relationships, the content indexing processor develops the dynamic set. Specifically, the dynamic hierarchies are generated based on head words and contextual relationships to the head word. After developing the dynamic hierarchies, the content indexing processor maps the dynamic hierarchies into the static ontologies forming the world view when complete for all documents. In this way, the dynamic classification system of the present invention classifies the theme concepts presented in the input discourse in the static ontologies 105 and dynamic level 135.

The following indented paragraphs contain an example input discourse for the dynamic classification system. The content of the text is provided as an example only.

Computers execute computer software programs to provide functionality. In general, computer software programs include applications programs and operating systems. Examples of computer operating systems include UNIX, Windows and OS/2 operating systems. The OS/2 operating system is a proprietary operating system developed by International Business Machines (IBM) Corporation. In general, the OS/2 operating system may be installed on a variety of computer system platforms.

Windows applications, which are directly compatible for use with the Windows operating systems, are not directly compatible for use with the OS/2 operating system. However, due to the large amount of Windows applications software currently available, ways of converting Windows applications for direct compatibility with the OS/2 operating system are under current development.

In recent years, software patents have become increasingly more popular in the computer industry. Due to the potential commercial value of the Windows applications, applications for OS/2 software patents, which cover methods of converting Windows applications for use with the OS/2 operating system, will be made.

The preceding example paragraphs are input to the linguistic engine for generation of the grammatical, stylistic, and thematic tags. The grammatical, stylistic, and thematic tags are provided in the structured output for access in content processing. The knowledge catalog process is executed, and the results are input to the theme vector processor. The theme vector processor generates the high level theme concepts contained in the input discourse. For the example input discourse, the high level theme concepts in the first two paragraphs include "computers", "software", and "operating systems." Also, the example input discourse refers to specific operating systems, namely UNIX, OS/2, and Windows. Furthermore, in the third paragraph of the example input discourse, the main theme is "patents", including methods of converting Windows applications to OS/2.

The theme vector processor maps the high level concepts extracted from the example input discourse into the static ontologies. For the example input discourse, the industry domain 110 contains two separate ontologies, wherein a first ontology is for "computers", and the second ontology is for "law." For this example, the specific level of detail concludes at a fairly high level. For example, for the classification "computers", three levels of sub classifications are provided: software, operating systems, and specific operating systems. For this ontology, the theme concepts "computers", "software", "operating systems", "UNIX", "OS/2", and "Windows" map into the static ontologies. However, if the level of depth in the static ontology only included up to the level of "operating systems", then all high level theme concepts up to and including operating systems are mapped. The high level theme concept "patents" is mapped into the "law" ontology. For the abstract theme concepts located in the abstract domain 130, the theme vector processor maps the concepts "ways" and "methods."

The content indexing processor generates, for the example input discourse, a list of head words that represent the content carrying words in the three paragraphs. Table 4 is a dynamic classification index generated from the example input discourse. The dynamic classification index includes a list of head words generated from the example input discourse. The head words listed in the dynamic classification index of Table 4 are located in each entry at the left margin (e.g. the head words are not indented). As discussed above, the head words are the content carrying words contained in the example input discourse.

As shown in Table 4, for certain head words, the content indexing processor generates one or more contextual relationships to that head word. For example, for the head word "applications", the content indexing processor generates the contextual relationships "for OS/2 software" and "Windows." The contextual relationships generated for the head words are hierarchical such that a first contextual relationship indicates the highest level contextual relationship to the head word, and subsequent contextual relationships indicate more specific contextual relationships for both the head word and the higher level contextual relationship. For the example "applications"head word, "Windows" is a first level contextual relationship and "methods for converting for use" is a second level contextual relationship. For this example, "Windows" is one context in which the head word "applications" refers to in the example input discourse (e.g. the example input discourse refers to Windows applications). More specifically, Windows applications are referred to in the context of methods for converting for use (e.g. the example input discourse refers to methods for converting Windows applications for use).

As shown in the dynamic classification index of Table 4, the content indexing processor also generates references to other theme concepts from the static ontologies. For example, because the example input discourse refers to "applications" in the context of being compatible with operating systems, the content indexing processor references the "operating systems" theme concept.

TABLE 4

Dynamic Classification Index

| | |
|---|---|
| applications | operating systems |
| for OS/2 software | installation |
| Windows | OS/2 |
| methods of converting | proprietary |
| for use | [see also] applications |
| [see also] operating systems | [see also] computer software industry |
| | [see also] softwares |
| | [see also] systems |
| applications programs | OS/2 operating systems |
| applications softwares | OS/2 software |
| commercial values | applications for |
| | patents |
| | software |
| | [see also] legal customs and formalities |
| computer hardware industry | platforms |
| [see also] platforms | computer system |
| | [see also] computer hardware industry |
| computer industries | programs |
| | applications |
| | computer software |
| | [see also] computer software industry |
| computer industry | proprietary operating systems |
| [see also] computers | |
| computer software industry | software |
| [see also] operating systems | OS/2 |
| [see also] programs | [see also] computer software industry |
| [see also] software | |
| [see also] systems | |

TABLE 4-continued

Dynamic Classification Index

| | |
|---|---|
| computer software programs | software patents |
| computer system platforms | software programs |
| | computer |
| computers | softwares |
| examples of | Windows applications |
| [see also] computer industry | amounts of |
| | [see also] operating systems |
| converting | system platforms |
| methods of | computer |
| examples | UNIX, Windows and OS/2 |
| of computers | inclusion |
| | [see also] operating systems |
| industries | Windows applications |
| computer | methods of converting |
| [see also] electronics | for use |
| legal customs and formalities | |
| [see also] patents | |

For an example input discourse, the content indexing processor generates the dynamic hierarchy in the dynamic level 135. For this example, in the first sentence of the second paragraph, the head word "Windows Applications" is discussed in relationship to the compatibility of the Windows applications, and is specifically discussed in the context of compatibility with the OS/2 operating system. Based on the grammatical and thematic tags, the content indexing processor determines that the phrase, "which are directly compatible for use with the Windows operating systems", is not the main focus of the sentence. Instead, the focus lies in the "are not directly compatible for use with the OS/2 operating system" portion of the sentence. Based on these relationships, the content indexing processor generates the hierarchical relationship between "Windows Applications" and "Compatibility."

Appendix D, entitled "Content Indexing Code", contains a source code listing for implementing content indexing processing in accordance with one embodiment of the present invention. The document entitled "Creating a Virtual Bookshelf", discloses examples and use of a classification system. The document "Creating a Virtual Bookshelf" is incorporated herein by reference

CLASSIFICATION USING THE KNOWLEDGE CATALOG

Figure 6:
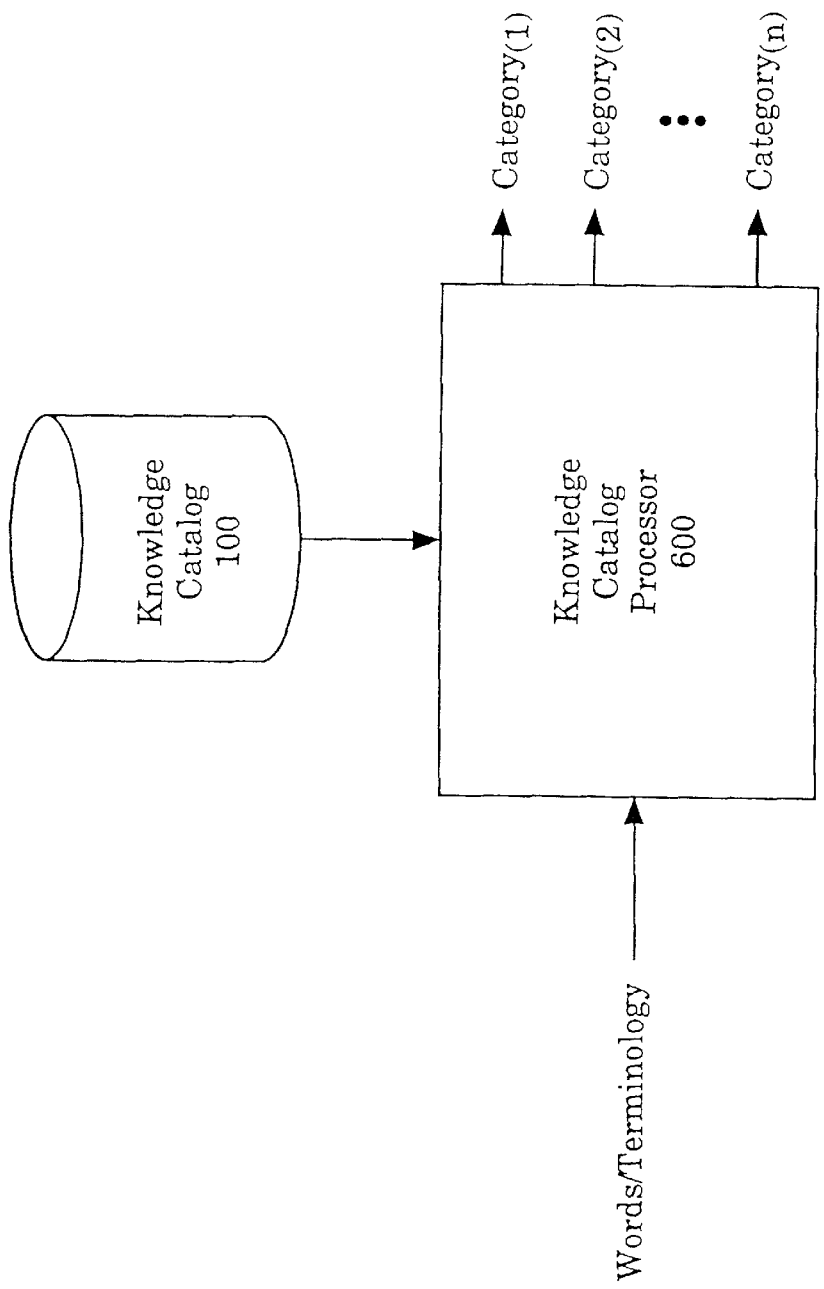
FIG. 6 illustrates a knowledge classification system utilizing the knowledge catalog of the present invention.

FIG. 6 illustrates a knowledge classification system utilizing the knowledge catalog of the present invention. The knowledge classification system contains the knowledge catalog 100 and a knowledge catalog processor 600. In general, the knowledge catalog processor 600 classifies words and terminology through use of the knowledge catalog 100. The knowledge catalog processor 600 receives, as inputs, words and terminology for classification, and generates, as outputs, concepts or categories associated with the words and terminology input. In essence, the knowledge catalog processor 600 and the knowledge catalog 100 classify input words based on the ontologies of the present invention.

The knowledge classification system may be implemented in either hardware or software. For the software implementation, the knowledge classification system is software that includes a plurality of computer executable instructions for implementation on a general purpose computer system. Prior to loading into a general purpose computer system, the knowledge classification system software may reside as encoded information on a computer readable medium, such as a magnetic floppy disk, magnetic tape, and compact disc read only memory (CD-ROM). In one hardware implementation, the knowledge catalog processor 600 may comprise a dedicated processor including processor instructions for performing the functions described herein. Circuits may also be developed to perform the functions described herein. The knowledge catalog 100 may be implemented as a database stored in memory for use by the knowledge classification system.

The static ontologies in the knowledge catalog 100 store all senses for each concept. In general, words and terminology, contained in the knowledge catalog 100, are characterized as ambiguous or non ambiguous. Terminology is ambiguous if the terminology appears more than once in the knowledge catalog 100 (e.g. there is more than one sense to the word). Conversely, a term is non ambiguous if the term only appears in the knowledge catalog 100 once. The same terminology may be included in more than one domain, as well as in more than one static ontology within the industry domain. For example, the term "plant" appears in an ontology in the concrete/generic domain, and appears in more than one ontology in the industry domain 110 (e.g. plant as in the biological sense, and plant in the manufacturing plant sense). The knowledge catalog 100 is generated by researching words or concepts in all ontologies to determine which words are ambiguous to that ontology.

The use of the ambiguous and non ambiguous characterization in the classification system recognizes that some terms have one or more senses. In order to properly classify words and terminology, each sense of the input words and terminology are determined. The concepts or categories are output as category$_1$ through category$_n$ as shown in FIG. 6. For example, the word "bank" is ambiguous because it may refer to a river bank as well as a financial institution. For this example, the knowledge catalog processor returns the categories of physical geography as well as banking. In one embodiment, the knowledge catalog processor 600 receives additional information (not shown) to select a sense for the input terminology if the input terminology is ambiguous.

The knowledge catalog of the present invention enables natural ambiguity resolution of ambiguous terminology. As discussed above, if a word or terminology has more than one sense, then it is characterized as ambiguous. In order to resolve the ambiguity for such a word, prior art systems utilize statistical concordances to select a sense for a word from all the possible senses of the word. Because the knowledge catalog consistently identifies higher level categories, lower level definitions can be derived from the higher level categories. For example, if the term "Paris" was found within the document, a determination that Paris is in France, as opposed to Texas, is made if France or other cities in France appear in the input discourse. Because the ontologies identify "France", then Paris, France is thus identified.

Figure 7:
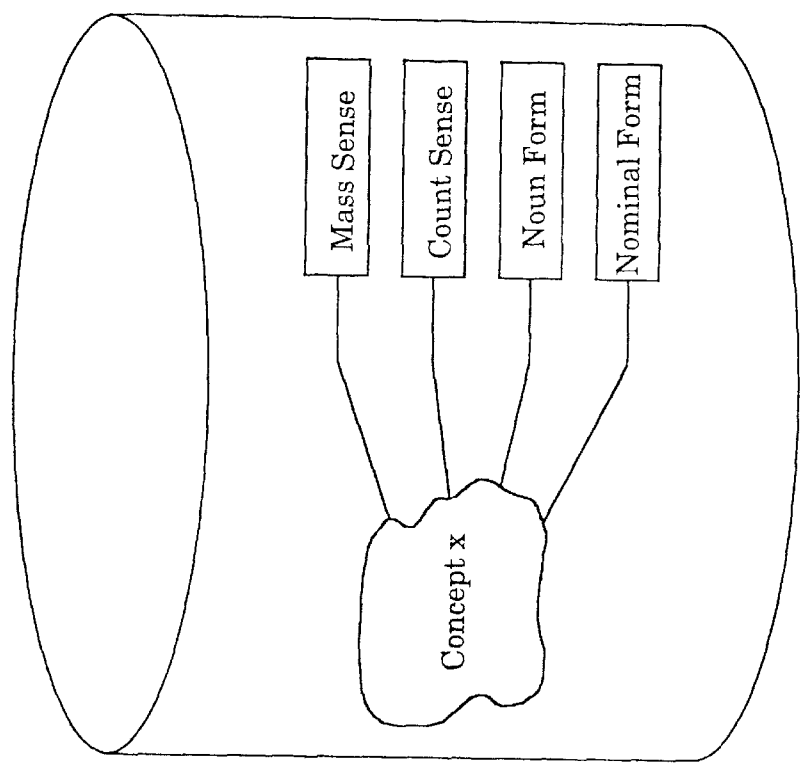
FIG. 7 illustrates the process for converting the form of the input words for attachment into the knowledge catalog.
Figure 7:
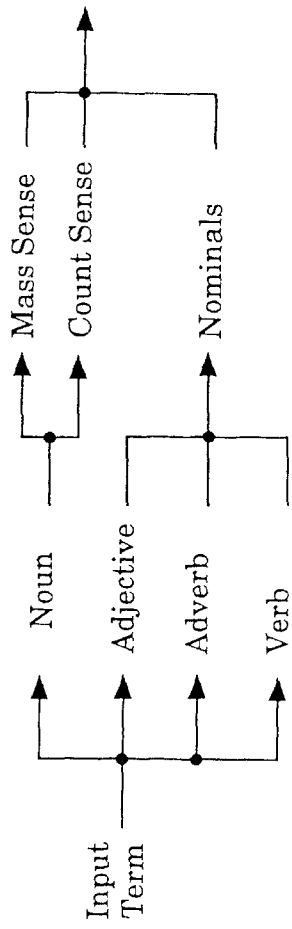

The knowledge catalog processor 600 processes words prior to attachment in the knowledge catalog 100. FIG. 7 illustrates the process for converting the form of the input words for attachment into the knowledge catalog 100. The input terminology to the knowledge catalog processor 600 for classification are content carrying words (e.g. the words convey meaning of a concept). Typically, the input terminology consists of nouns, adjectives, adverbs, or verbs. As shown in FIG. 7, if the input terminology consists of an adjective, adverb or verb, then the knowledge catalog processor 600 converts the input terminology to a nominal form. For example, the verb "to fish" is converted to "fishing", and the verb "performing" is converted to "performance." If the input terminology consists of a noun, then the word is in the proper form for attachment into the knowledge catalog 100.

As shown in FIG. 7, the knowledge catalog processor 600 further analyzes nouns to determine whether the noun has a mass sense and/or a count sense. For example, the word "baseball", which is the mass sense of the word, has a completely different meaning than the count sense "baseballs." If the word has both a mass sense and a count sense, then the knowledge catalog processor 600 attaches both the mass sense and a count sense into the knowledge catalog 100. The noun form of a word may have a different meaning than the nominal form of the word. For example, the noun form of "fish" has a different meaning than the nominal form "to fish", which refers to the sport of fishing. When applicable, the knowledge catalog processor 600 attaches both the noun and the nominal into the knowledge catalog 100. If there is not a concept for the nominal, then the concept of the noun is attached to the concept of the nominal.

Because the noun sense of a word may be different than the nominal sense, and the mass sense may be different than the count sense, a separate classification or tree attachment exists for nominal and noun forms as well as for mass and count senses. For each concept, the knowledge catalog 100 potentially stores the noun form, the nominal form, the mass sense, and the count sense as shown for Concept$_x$ in FIG. 7. Therefore, the knowledge catalog 100 stores, when applicable, the noun form, the nominal form, the mass sense, and the count sense for a concept.

Some input terminology may also be characterized as special words. These special words include orienters and global classifiers. Orienter words guide the reader to a field of study regardless of the use of the word. For example, the word "linguistically" guides the reader toward the field of linguistics. A global classifier word carries the essence of a particular category, wherein the category may include sub categories beneath the category defined by the global classifier. For example, the word "programmer" is a global classifier. The knowledge catalog processor 600 maps the special words directly into the knowledge catalog 100.

In a preferred embodiment, the knowledge catalog processor 600 attaches phrases in the knowledge catalog 100 such that the longest form of the phrase is retained. The longest form of phrases includes all content carrying words that further identify a sense for the phrase. Therefore, by retaining content carrying words in phrases, the phrases, when attached into the knowledge catalog, are typically unambiguous. The following sentence provide an example of attaching the longest form of a phrase.

The Federal Reserve Board has lowered the prime interest rate.

For this example, the knowledge catalog processor 600 attaches the phrase "prime interest rate" for use with the knowledge catalog. The phrase "prime interest rate" is retained because it is more specific than both prime and prime rate because prime may refer to "prime beef" or "prime interest." The prime beef attaches into ontologies for food or cows, and "prime interest" attaches into an ontology for real estate. However, "prime interest rate" attaches into ontologies for banking. Therefore, because two or more words typically render a term non ambiguous, the knowledge catalog processor 6900 reduces ambiguity by attaching the longest phrase. The knowledge database processor also expands abbreviated terminology to the full or complete form prior to attaching into the knowledge catalog so that a formal or legal name of a word or term is always utilized.

For example, the word "Oracle" is extended to the full name of the corporation, "Oracle Corporation."

In general proper nouns are naturally ambiguous because any particular person, location or item may have any name. However, the knowledge catalog processor 600 realizes that although proper nouns are naturally ambiguous, there is a realistic level of recognition for some proper nouns. The knowledge catalog processor 600 operates under a reputable presumption for some commonly recognized proper nouns. For example, the proper noun "Paris" is typically associated with Paris, France. Therefore, when attaching "Paris" in the knowledge catalog 600, a presumption exists that "Paris" relates to the concept of "France." However, if during the classification, no additional corroborating topics are generated, then "Paris" is no longer associated with France.

The document entitled "Creating a Virtual Bookshelf", contains a description for configuring a classification system utilizing the knowledge catalog of the present invention.

COMPUTER SYSTEM

Figure 8:
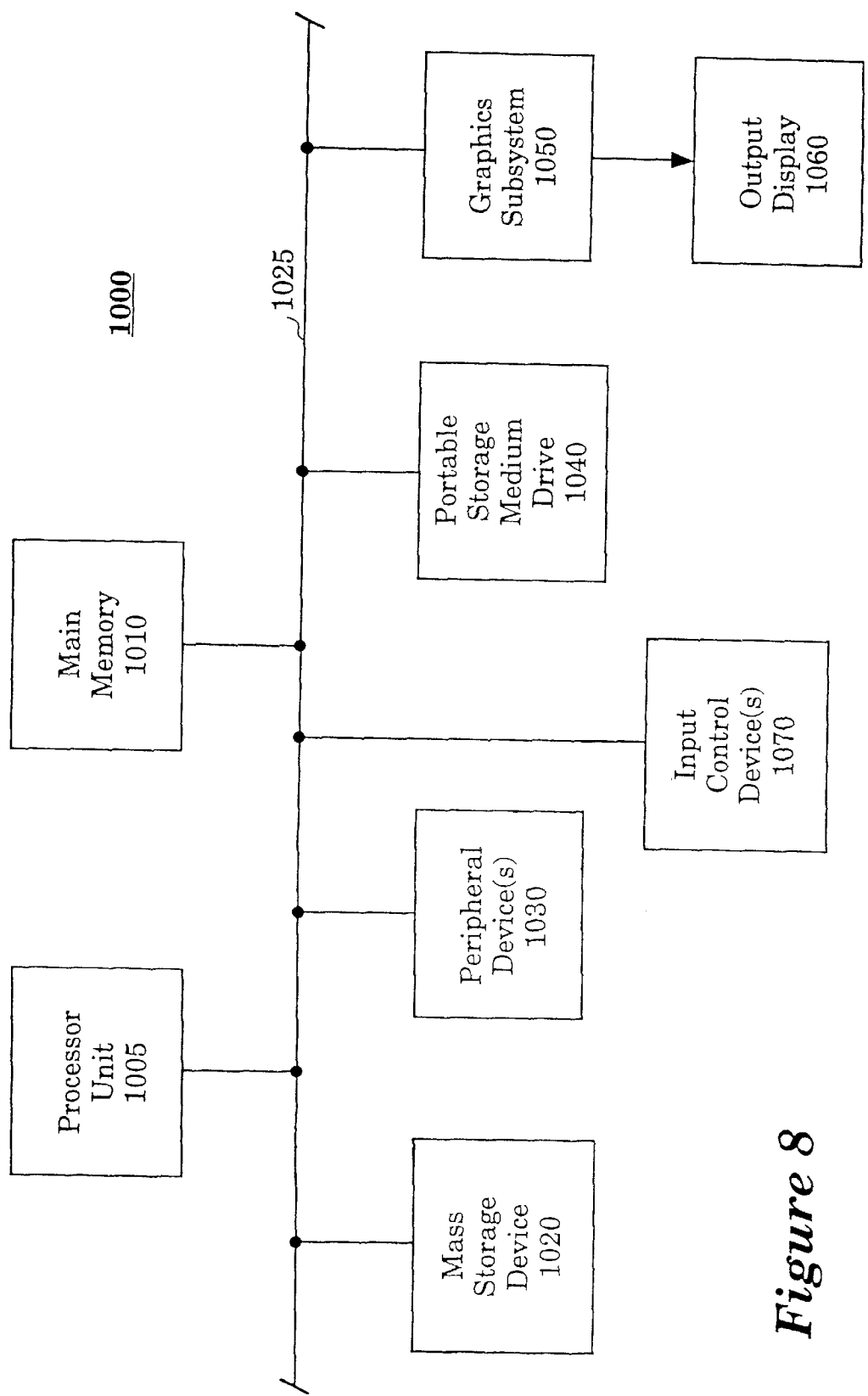
FIG. 8 illustrates a high level block diagram of a general purpose computer system in which the knowledge classification system of the present invention may be implemented.

FIG. 8 illustrates a high level block diagram of a general purpose computer system in which the knowledge classification system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the knowledge classification system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 8 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may implemented with a magnetic disk drive or an optical disk drive, is a non-volatile storage device for storing data and instructions for use by the processor unit 1005. In one embodiment, the mass storage device 1020 stores the knowledge classification system software embodiment for loading to the main memory 1010.

The portable storage medium drive 1040 operates in conjunction with a portable non-volatile storage medium, such as a floppy disk, a magnetic tape drive, or a compact disc read only memory (CD-ROM), to input and output data and code to and from the computer system 1000. In one embodiment, the knowledge classification system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the input word/terminology may be input to the computer system 1000 via a portable storage medium or a network for processing by the knowledge classification system.

The input control device(s) 1070 provide a portion of the user interface for a user of the computer system 1000. The input control device(s) 1070 may include an alphanumeric keypad for inputting alphanumeric and other key information, and a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

THEME PARSER

After the grammatical context, the base thematic context, and the style have been ascertained, the full thematic parse can be implemented. The grammatical context is needed in order to establish the grammatical relationships that exist in a sentence. The style assessments are needed in order to establish the general tone and writing methods used by the author, and the base thematic context is the initial thematic analysis that makes simple decisions about the basic components of the theme when using only the grammatical context for clues. In addition to these contextually calculated aspects of a sentence, additional lexical information that is attached to each word will also be used.

The full thematic context of the document in now produced by checking each word against all possible thematic constructions, and recording either the existence or non-existence of each thematic aspect, or a scale of how much of a thematic aspect each word carries, or what specific sub-classification of a general thematic aspect the word contains. Each word in a sentence is then subjected to a series of tests to determine and record its thematic aspects.

As the detail for the thematic parser is discussed, certain examples will be used to indicate why a particular assessment is useful. Many of these examples will be based on the ability to generate a new, summarized version of a sentence. This assumes that any sentence contains a certain amount of information that can be removed without removing the main 'gist' of the sentence. An example of this would be:
Each word in a sentence is then subjected to a series of tests.
Each word subjected to series of tests.
Each word subjected to tests.
Word subjected to tests.

The subsequent sentences can progressively paraphrase the first, full version. While not fully grammatical, they can be read correctly and easily, without misinterpretation. A common example that will be used in any discussion of weak/strong words will be the ability to readily remove parts of a linguistic constituent group without rendering the sentence unintelligible.

Default Setup

Eight default setup operations are performed before the full thematic parsing can commence:

1. Weak/Strong Noun Initialization
2. Sentence Structure Checking
3. Grammatical Ambiguity Analysis
4. Industry-Specific Terminology Identification
5. Possessive Contextual Form Analysis
6. Dual Gender Noun Initialization
7. Verb Modification Attachment
8. Noun Support Attachment The first processing step sets the default conditions of each thematic aspect of each word to a zero condition (does not contain this thematic aspect).

Weak/Strong Noun Initialization

A default condition is placed on each noun in the sentence. Each noun carries a thematic aspect recording the strength of the noun. 'Weak' and 'strong' refer to the strength of the word's content-carrying sense. Some nouns are very descriptive when used in isolation, while others are very vague. 'Windmill' is very specific, but 'place' is very vague, and needs some additional information to help define the type of 'place' to which the author is referring. A noun can be encoded in the lexicon as 'strong' or 'weak', or can be computed in the thematic analysis as 'strong' or 'weak'. But each noun initially starts in its thematic processing by assuming it is 'strong'.

The strong/weak labels are referring only to the noun in isolation. A noun that is 'weak' in isolation can still be 'strong' as a unit, as long as it has some strong supporting words, such as adjectives or prepositional phrases. And there can be a number of levels of supporting prepositional phrases. But as long as one of the nouns in one of the prepositional phrases that modifies a particular noun can be classified as 'strong', the whole chain from that point up to the originating noun head can be classified as strong because of this strong support.

There are four conditions that must be thought of together when ascertaining a noun's content value.

1. A noun can be weak, with no support.
2. A noun can be weak with strong support.
3. A noun can be strong with weak support.
4. A noun can be strong with strong support.

Each noun is coded with a thematic aspect tag indicating whether it has supporting content in the form of strong modifying adjectives or strong postposed prepositional phrases. A noun's initial default condition assumes it does not have strong supporting content.

Basic thematic analysis is highly concerned with the content-strength of words, especially nouns and adjectives. Nouns are the most focal part of a sentence, and can be thought of as carrying a certain amount of content in them. Some nouns are very rich in content and need no additional supporting information to be complete. A word such as 'sonar' is very strong in its content-senses. But words such as 'list' are very weak, and do not convey much information in isolation. Instead they look for other supporting information to help deliver the content of the noun phrase.

'Employee list' or 'list of employees' uses a stronger content word, such as 'employee,' to complete the full content-representation of the word 'list'. Eventually, one aspect of thematic analysis will determine if a noun phrase group (a noun plus its adjectives and supporting prepositional phrases) must be kept intact in order to convey its content properly, or if parts of the phrase can be removed without altering the basic meaning. An example would be 'electric guitar'. 'Electric' conveys additional information about 'guitar', but 'guitar' on its own still provides the basic thematic content. So 'electric' could be removed, which would remove some descriptive detail from the sentence, but would not diminish the basic understanding of the sentence. However, removing 'employee' from 'employee list' would remove the basic content-carrying word, leaving only an empty shell. This would seriously detriment the understanding of the sentence.

Each assessment of theme must understand the gradient levels of content in a sentence, where they exist, and where and when they could be removed without excessive problems. This will be discussed in detail later. But there are some default operations that are performed initially on a word that override certain types of strong/weak analyses.

Sentence Structure Checking

The sentence as a whole is checked for the existence of at least one predicate. If the sentence does not contain a single predicate, it is assumed to be a heading or part of a sentence that cannot be analyzed for thematic content. The entire sentence is therefore marked for removal from the thematic processing routines.

Grammatical Ambiguity Analysis

Each word in the sentence is checked for any grammatical ambiguity. One such condition occurs when the grammar parser cannot assign any parts of speech to a word. In this case, if the word is in a noun phrase, it is defaulted to an adjective. If the word is not in a noun phrase, it is defaulted to a noun. This causes naturally ambiguous grammatical conditions to be focused on more heavily by the thematic routines (since nouns and noun phrases are the most content-rich parts of thematic analysis).

Industry-Specific Terminology Identification

Additional default conditions are based on the existence of certain pieces of lexical information for a word. One such default is based on the use of special industry-specific terminology. Any word that is marked in the lexicon as 'industry oriented' should keep its supporting information, even if the word is deemed to be strong. For example, the word 'yield' may be marked as an important industry-specific term in banking. This would cause phrases such as 'yield on certificates of deposit' to remain together as a complete content unit, when otherwise it may have been logical to think that 'yield' could stand alone. In this case, a default test sets the industry-specific word to 'weak' whenever it has strong supporting information. This helps any application interested in reducing the content of the sentence to keep the supporting terms attached to the head term.

Possessive Contextual Form Analysis

Another default condition arises with the use of strong head nouns with strong, postposed, supporting terms in a possessive-style prepositional phrase. For example, in 'the theft of automobiles', 'theft' could be thought of as being 'strong', but 'of automobiles' is a strong indicator of content and usually needs to be kept associated with the head word.

Head words in this context are by default marked as 'weak', but with strong supporting information. They are also marked with a special strong-content code that specifically identifies the head word as conveying strong content, but wants the supporting words to be kept associated with the head word. This helps applications that summarize text to keep the phrase together, but also indicates to content-abstraction applications that the head term conveys strong content in isolation.

Dual Gender Noun Initialization

Another default condition sets the strength of certain dual-gender nouns to 'weak'. If a word is marked as dual-gender, if it has no additional strong supporting context, if it is not in the simple subject position of a clause, and if it is not in a prepositional phrase, then the word is marked as 'weak.' An example is 'They allow manufacturers to offer large discounts'. 'Manufacturers' is marked as 'weak' in this particular context.

Verb Modification Attachment

This thematic aspect concerns itself with the attachment of additional modifying information to verbs. Some verbs require additional adverbial information in order to be fully understood. This additional information could be available in the form of an adverb, an adverbial prepositional phrase, or an adverbial clause. Other verbs accept this additional information when available, and specifically look for it, but can still function properly without it. And still other verbs do not care if it is included or not. These verbs are specifically marked in the lexicon as 'obligatory-adverb required' and 'optional-adverb acceptable'.

The verb 'put' is an example of an obligatory-adverb verb. A sentence such as 'He put the book.' leaves us naturally wanting to know where the book was placed, such as 'on the desk'. But other verbs with the same grammatical context do not convey the same experience. 'He read the book.' does not cause the reader to be looking for additional information modifying 'read', such as 'in a chair' or 'at the office'.

As with the 'weak' and 'strong' nouns, applications that look to summarizing these sentences must be aware of the information that can be easily removed, and the information that causes problems for the reader when it is removed.

In our initial default analysis, before the full thematic assessments begin, several conditions naturally cause verbs to be defaulted to an 'obligatory' or 'optional' condition. Any monotransitive verb that does not have a direct object but that does have an adverbial phrase is coded by default as an obligatory-adverb verb. This causes the adverbial phrase to be retained longer, as would an object to the verb.

Intransitive verbs should have the obligatory-adverb setting, causing any adverbial phrases to be linked more directly to the verb. And verbs that signal 'unmarked' infinitive clauses are marked as optional-adverbial, causing the infinitive clause to be carried with the verb. An example of this type of sentence is 'Bob had three people guard the door.'. 'Had' signals the allowance of the unmarked infinitive 'guard'. This sentence would feel very incomplete if this clause were removed when a summary of the sentence is generated.

Finally, ditransitive verbs with only one object set the optional-adverb flag to indicate that any adverbial information be strongly attached to the verb, filling in for the missing object.

Noun Support Attachment

As a last stage in the pre-processing theme section, each word is analyzed to determine if strong support exists for it. The strong support assessment will be used along with the strong/weak noun thematic assessments to determine if the word is a focal point for a strong point as a whole.

MAIN THEMATIC ASSESSMENTS

After the initial setup routines are complete, each word is processed through the main thematic assessment routines. These routines attach flags to each word/phrase that indicates its thematic character. Each theme routine will have a short explanation, examples where needed, and sample abstract syntactic representations that indicate the abstract nature of the sentence context that is necessary for the routine.

The thematic assessments are a series of tests made against each word/phrase in the exact context of the sentence. Each test records the existence or degree of applicability of each of the theme routines to the word/phrase. The collection of the grammar, style, base theme, and these thematic assessments together will provide the necessary information that applications need to re-write sentences and extract group of content.

There are three main types of thematic assessments:
  1. Major Thematic Assessments
  2. Theme-Relational Tagging
  3. Theme-Location Identification

Major Thematic Assessments

Major thematic assessments contain all of the routines necessary to make major assessments about the overall theme of the sentence. There are 210 such routines, each of which produces an output to be stored for each word/phrase in the thematic context output.

AddAdv: Identifies 'additive adverbs' functioning in an adverbial role. Additive adverbs indicate that the predication is additionally true about the referent under focus. Based on the exact context of the sentence, this flag is set when an additive adverb is not essential to the meaning. The adverb may occur in any contextual position in the sentence.

ex: Mary also could play the banjo.
  The banjo similarly has the dynamic range of a chainsaw.

AdjAdvSubordination: Identifies adjectival and adverbial clauses that are not essential to the meaning or to the grammatical integrity of the sentence. Most non-contrastive type sentence level adverbial clauses are tagged, and most adjectival clauses that modify strong nouns are tagged. If the adjectival clause carries strong content information and the noun it modifies is weak, then the clause is not tagged. Adjectival clauses that have no strong elements are tagged even if the noun being modified is weak and needs support.

ex: After they had voted, the race was run on Sunday.
  The main idea that he had was never implemented.

AdjDeterminer_b: Identifies determiners that modify plural count nouns or mass nouns, and that are not essential to the meaning or to the grammatical integrity of the sentence. They must be used as a determiner in the context of the sentence.

ex: I don't have enough strength to lift the box.

AdjectiveNotDet: Identifies adjectives that are not determiners, and that are not essential to the meaning. The adjective must occur in a noun phrase, and be marked as a weak adjective in the lexicon.

ex: A large cat jumped off the roof

AdjectivalClause: Identifies adjectival clauses that are not essential to the meaning. If the adjectival clause carries strong content information and the noun it modifies is weak, then the clause is not tagged. If the clause contains no strong information, then it is tagged, even when the noun being modified is weak.

ex: The main idea that he had was never implemented.

AdjectivalPrepPhrase: Identifies adjectival prepositional phrases that are not necessary to the meaning. If the noun being modified by the prepositional phrase is weak and the prepositional phrase carries strong content, the phrase is not tagged. If the prepositional phrase contains no strong information, it is tagged, even if the noun it modifies is weak.

ex: My physics book with the torn pages was lost.

AdjSubjComp: Identifies adjectives functioning as subject complements that are not essential to the grammatical integrity of the sentence. These adjectives will be marked as weak in the lexicon.

ex: The box was large.

Adverbs: Identifies adjunctive adverbs that are not essential to the meaning or to the grammatical integrity of the sentence. The adverb may appear in any position in the sentence, and may modify any valid constituent.

ex: The bear quickly ran into the forest.

AdverbAfterVerb: Identifies adverbs (usually adjuncts) directly following verbs where the adverb is not essential to the meaning. It is essential only when the verb it modifies is marked in the lexicon as an obligatory or optional adverb-type verb.

ex: The bear ran quickly into the forest.

AdverbEndMc: Identifies adverbs (usually adjuncts) ending a main clause where the adverb is not essential to the meaning (when the verb in its clause is not an obligatory or optional adverb type verb).

ex: The bear ran into the forest quickly.

AdverbialNpInit: Identifies introductory noun phrases of time. The noun phrase may occur at the start of any main clause, must have a time noun as its head, and must be only a noun phrase, not a prepositional phrase or any other constituent.

ex: Early that morning, we set off for camp.

AdverbInit: Identifies adverbs (usually disjuncts) that start a main clause where the adverb is not essential to the meaning. It is essential to the meaning only when marked in the lexicon as an orienter, such as the words 'economically' or 'linguistically' which name industries or specific fields of study.

ex: Actually, they left for the store.

AdvClauseInit: Identifies adverbial clauses at the beginning of a main clause that are not necessary to the meaning. Only those clauses that contrast to the information in the main clause will not be tagged.

ex: After they had voted, the race was run on Sunday.

AdvInNp: Identifies adverbs in noun phrases that are not essential to the grammatical integrity of the sentence. This includes any adjverb but those marked as orienters.

ex: It was an unusually comical movie.

AdverbSplitInfin: Identifies adverbs in split infinitives.

ex: . . . to boldly go where . . .

AdverbialBetweenCommas: Identifies adverbial phrases set off by commas, which are not essential to the meaning or to the grammatical integrity of the sentence. This includes all adverbials that are not orienters.

ex: The bear was, at least partially, standing on its hind legs.

AdverbialClause: Identifies adverbial clauses that are not necessary to the meaning. These include most non-contrastive adverbials.

ex: When the right times comes, I am going to learn to fly a plane.

AgoAdverbial: Identifies time representations that end in 'ago' or similar words, which are not necessary to the grammatical integrity of the sentence.

ex: I took the test some years ago.

Appositive: Identifies all appositives in any context.

ex: Bob Smith, a market analyst, said . . .

ApproxPrep: Identifies 'approximator prepositions' such as 'around, about, close to' where the prepositional phrase is not essential to the meaning. The phrase will be necessary only when it modifies a verb marked as obligatory or optional adverbial, or when the prepositional phrase contains strong content and the noun it modifies is weak.

ex: Bob left the party around ten o'clock.

Article: Identifies articles (determiner type).

ex: The bear ran down the road.

AttitudeAdv: Identifies 'attitudinal adverbs' functioning in an adverbial role where the adverb is not essential to the meaning.

BeVerb: Identifies all forms of the 'be' verb in certain contextual positions where the sense of the clause can be understood without the 'be' verb.

ex: The student is taking too many courses.

BeVp: Identifies the entire non-lexical section of a verb phrase that involves a 'be' verb, where the verb phrase section is not essential to the meaning or to the grammatical integrity of the sentence.

ex: Doug must be willing to invest in the future.

BogusSubject: Identifies subjects that carry no content.

ex: The level increased because the knob kept moving forward.

CommentInit: Identifies initial sentence comments that are not marked as orienters.

ex: Pound for pound, Bill Bates is the hardest hitter in the league.

ComparativeInSubjComp: Identifies comparatives in subject complements that are not essential to the meaning or to the grammatical integrity of the sentence.

ex: These cars are faster than mine.

ComparativeInSubject: Identifies comparative expressions in the subject that are not essential because they do not contain significant content.

ex: The faster planes will leave last.

Compromiser: Identifies 'compromiser adverbs' that are not essential to the meaning, where the conjunction is not essential to the meaning or to the grammatical integrity of the sentence.

ex: Men both young and old were invited.

ConcessiveAdv: Identifies 'concessive adverbs' that are not orienters.

ConjInNp: Identifies conjunctive and adjunctive adverbs that start main clauses and which are not orienters.

ex: Additionally, we may have to spend more money.

CorrelConj: Identifies 'correlative conjunctions' with following prepositional phrases.

CryptoAdjClause: Identifies clauses that syntactically appear adjectival but grammatically function adverbially.

ex: It came from the French, which also . . .

CryptoAdv: Identifies syntactic adverbs that are not necessary to the meaning.

CryptoClause: Identifies clauses of any type that appear syntactically isolated. Identifies a syntactic subject that is grammatically an adverbial.

ex: Actually, a few days prior to the interview, they had . . .

CryptoPrepPhrase: Identifies prepositional phrases of time that are not part of verbs that are marked as obligatory or optional adverbials.

ex: We met on that day.

DemonsAdj: Identifies 'demonstrative adjectives' that donot carry strong content (marked weak in the lexicon).

DemonsSubjBe: Identifies 'demonstrative pronouns' that are the grammatical subject of 'be' verbs.

DemonstrativeModifier: Identifies demonstrative adjectives that do not carry strong content (marked weak in the lexicon).

DemonstrativeSubject: Identifies demonstrative pronoun subjects that are not necessary to the grammatical integrity of the sentence.

Determiner—d: Identifies determiners that modify only plural count nouns, and that are not essential to the meaning.

DoVerb: Identifies the 'do' verbs that are not negated and that are not essential to the meaning.

ex: The students did understand the lesson.

ElliptedPassive: Identifies ellipted passives clauses that are not essential to the meaning.

ex: The language supports several color spaces based on this standard.

EmptyVerb: Identifies verbs with an empty meaning, such as 'try, begin, ought', that are not essential to the meaning.

ex: He tries to maintain a good balance.

ExtractTopicWord: Returns the actual word from the initial sentence that represents the topic of the sentence.

Factive: Identifies 'noun particles' that are measurements, such as 'gallon, piece, few' that are not essential to the meaning.

ex: He added several gallons of water.

FinalPrep: Identifies prepositions that occur at the end of the sentence.

ex:

FindTopic: Identifies the main thematic topic in the sentence.

ex: A list of employees was printed.

The judge ruled that they were innocent.

FocusAdv: Identifies 'focusing adverbs' that are not orienting words.

HaveAux: Identifies the 'have' verb where it is not essential to the meaning or to the grammatical integrity of the sentence.

ex: The students have learned their lesson.

HaveTo: Identifies the phrasal forms of 'have + to' when functioning as a full lexical verb. This sequence would be replacable by single words, such as 'must'.

ex: We have to leave soon.

HedgingWd: Identifies 'hedging' words, such as 'partially' that do not carry strong content.

ex: He was partially finished with the job.

HedgingVerb: Identifies hedging verbs whose subject is plural with a following infinitive.

InfinClauseAfterObj: Identifies infinitive clauses that follow direct objects. The clause if tagged if it contains no strong elements.

ex: We completed all the forms to get a passport.

InfinInfin: Identifies a series of two infinitive phrases where the first is not necessary to the meaning or to the grammatical integrity of the sentence.

ex: We needed to finish to get our diploma.

IsAdjOrAdvClause: Identifies the given word as part of any adverbial or adjectival subordinate clause.

IsAnotherFocus: Returns TRUE when another main focus occurs in the current predicate after the given word location.

IsAnnouncement: Identifies the current verb as a verb of 'announcement'.

ex: We announced that the acquisition was called off.

IsAdjAdvClauseAnywhere: Identifies that the given word is contained in an adverbial or adjectival subordinate clause at ANY level of subordination.

IsAntecedantPrnSubj: Identifies the given pronoun subject as having an antecedent in the current sentence.

ex: Bob said that he would be there later.

IsAsBlankAs: Identifies the given word as part of an 'as WORD as' sequence.

ex: He is as clever as a fox.

IsAuxVerb: Identifies the given word as an auxiliary verb.

ex: He can see the painting.

IsBackRefCompoundNp: Identifies the given conjunction as part of a noun phrase compound where the second element is referring back to previous information.

IsBeComplement: Identifies the given word as a topic in a subject complement.

IsBeEquate: Identifies the given word as a 'be' verb for a coordinated topic.

IsBogusMc: Identifies the given word as an appositive that is syntactically marked as a main clause.

ex: He pleaded guilty to embezzeling from a bank, and to tax evasion, acts committed before he was married.

IsBogusSubject: Identifies the given word as a gerund syntactically marked as a subject.

ex: An exercise machine employing this cam enables the user to produce remarkable growth in strength and muscle size.

IsCompAppositive: Identifies the given word as an appositive that is properly ended.

ex: Bob Smith, a market analyst, said . . .

IsComplexPrep: Identifies the given word as the preposition starting a complex prepositional phrase.

IsCompoundNp: Identifies the given word as part of a compound noun phrase.

ex: Bob caught a tuna and a bass.

IsCryptoNoun: Identifies the given word as an adverb that is syntactically functioning like a noun.

IsDefArtThisNp: Identifies the given word as part of a noun phrase that contains a definite article.

ex: The three bears lived in the woods.

IsDeleteableNounClause: Identifies the given word as part of a noun clause that does not contain strong information.

ex: A general link will find the general area of the document on which the mouse was clicked.

IsDitransNeedPp: Identifies the given word as a prepositional phrase that belongs to a ditransitive verb.

ex: The state declared the land as one of its natural resources.

IsElliptedPassiveClause: Identifies the given word as part of an ellipted passive construction.

ex: These are device independent programs based on the new standard.

IsEndOfClause: Identifies the given word as occurring at the end of any clause structure.

ex: After the game was over, we left for the party.

IsEndOfMc: Identifies the given word as occurring at the end of a main clause.

ex: The bear walked through the woods; Bob never heard it coming.

IsEveryWordToLeftDeleted: Identifies that every word to the left of the given word in the sentence has been marked as non-essential.

IsGoodNounThisPp: Returns TRUE when the given word is in a prepositional phrase that contains a strong or supported noun.

ex: A list of new employees was printed.

IsEmbeddedClause: Identifies the given word as part of a subordinate clause that is embedded in another subordinate clause.

ex: Bob said that the list that was printed was incomplete.

IsImperative: Identifies the given word as an imperative verb.

ex: Write your name on the first line.

IsInNp: Identifies the given word as part of a valid noun phrase.

ex: The bear walked through the woods.

IsInfinitive: Identifies the given word as an infinitive verb.

ex: Bob is going to give me the lamp.

IsInfinitiveClause: Identifies the given word as part of an infinitive clause.

ex: Bob is going to give me the lamp.

IsMainVerb: Identifies the given word as the main lexical verb of a verb phrase.

ex: The ship can usually be identified by its name.

IsModifierSpeechAct: Identifies the given word as a noun that is being modified by a speech act word.

ex: Chapter one is an overview . . .

IsNeededAdjClause: Identifies that the given word is part of an adjectival clause that IS essential to the sentence. The clause is essential when the noun it modifies is weak and needs support, and then the adjectival clause has strong elements.

ex: The person who rang the bell was never found.

IsNegAdvCl: Identifies the given word as part of a subordinate clause that is being negated (a negative word appears in the clause).

ex: When I couldn't jump the ditch they left me behind.

IsNegVerbThisPred: Identifies the given word as part of a predicate that contains a negative verb.

ex: Bob did not hear the bear.

IsNotPartOfSpeech: Identifies the given word as syntactically ambiguous.

IsNounThisDo: Identifies the given word as part of a direct object with a noun head.

ex: Bob heard the bear in the woods.

IsOkAdj: Identifies the given word as an adjective that carries strong thematic content for supporting a noun.

The economic summit was a success.

IsOkCompHead: Identifies the given word as the head word of a subject complement.

IsOneWordClause: Identifies the given word as a subordinate clause with only one word.

ex: The man accused was very nervous.

IsOnlyPossibleTheme: Identifies the given word as the only strong theme in the sentence.

ex: The bear didn't hear me approaching.

IsSubjectVerbMatch: Identifies that the two given word locations agree in number. This is valid only for simple number tests.

ex: The man with the pictures runs my business.

IsNeededPp: Identifies prepositional phrases that are attached to verbs and that are necessary for the proper thematic completion of the verb.

ex: He put the book on the table.

IsOfPpNeeded: Identifies possessive prepositional phrases that modify weak noun heads, where the prepositional phrase is necessary to the thematic completion of the main noun.

IsOkTheme: Identifies a particular word as being a valid thematic topic. A noun phrase that is strong or that has strong support in its modifying elements.

IsPassiveVbThisPred: Identifies the main verb phrases of the currently pointed to predicate, and returns TRUE when the verb phrase is a passive verb phrase.

ex: We were expected at the office.

IsPassiveVp: Identifies the current word position as being in a passive verb phrase.

ex: We were usually expected at the office.

IsPluralSubjectOfVerb: Identifies the subject of the verb currently being pointed to, and returns TRUE if this subject is plural.

ex: The boys who were at the store jumped into the car.

IsPosAppositive: Identifies the current word being pointed to as being an appositive for the previous noun phrase.

IsPosMainTopic: Identifies the current word being pointed to as being able to function as the main topic of the sentence. It must be strong or have strong support.

IsPrepPhrase: Identifies the current word being pointed to as part of a prepositional phrase.

ex: The rest of the group were hidden in the back of the house.

IsPreviousAs: Identifies when the current word being pointed to is part of an 'as' subordinate clause.

ex: We need to implement the new plan now, as the old plan cannot be completed on time.

IsPreviousComparative: Identifies when the current word being pointed to is part of a comparative phrase in the predicate of the sentence.

IsPrevAuxNeg: Identifies if the current word being pointed to is a verb in a verb phrase that carries a negative modal verb.

ex: He could not usually talk that long.

IsReducedSubClause: Identifies that the current word being pointed to is part of a reduced subordinate clause.

ex: The bear walking in the woods is very noisy.

IsSameBaseClause: Identifies that the two words being pointed to are part of the same base clause.

IsSameClause: Identifies that the two words being pointed to are part of the same clause.

IsSameNounConstituent: Identifies that the two words being pointed to are part of the same noun constituent.

IsSamePp: Identifies that the two words being pointed to are part of the same prepositional phrase.

IsSectionHeading: Identifies the current sentence as being a heading only, not a complete grammatical sentence.

ex: Formatting New Sections

IsStartMc: Identifies the current word being pointed to as the first word of a main clause.

ex: The bear walked through the woods; Bob could not hear it.

IsSubjDeleted: Identifies that the subject for the clause that is being pointed to has been marked as not being essential to the meaning or to the grammatical integrity of the sentence.

ex: The list was not printed using the laser printer.

IsThereMainAction: Identifies that there is a main clause action in the sentence that has not been marked as weak or unnecessary.

ex: The bear walked through the woods.

IsThereMainFocus: Identifies that there is a main focus in the sentence.

ex: The employee master list was printed with a laser printer.

IsThereMainTopic: Identifies that there is a main topic in the sentence.

ex: The list was printed with a laser printer.

IsThereNcTopic: Identifies that the main topic of the sentence is being expressed by a noun clause.

ex: What the speaker said didn't make much sense.

IsTherePrevDo: Identifies that there is a direct object in the current predicate that occurs prior to the current position being pointed to.

ex: We heard the bear walking though the woods.

IsTherePrevPrepFrom: Identifies a prepositional phrase in the same basic thematic unit that is a 'from' type prepositional phrase.

IsThereSupport: Identifies that the current noun being pointed to has strong modifying information.

ex: An economic decision is best.

IsThereWeakTopic: Identifies that the current word being pointed to is a weak, but usable, topic.

ex: The decision was made.

IsTrueAdj: Identifies that the current word being pointed to is a true adjective, not a participle.

ex: The linguistic program at the college was cancelled.

IsTrueNp: Identifies that the current word being pointed to is part of a valid noun phrase.

ex: The linguistic program at the college was cancelled.

IsThemePh: Identifies that the prepositional phrase being pointed to is part of the main theme of the sentence.

ex: The list of employees was printed on a laser printer.

IsType1Quote: Identifies quoted material with the format—subject+comma+speech act verb+noun phrase+comma+predicate:

ex: But the action, said London financial analyst Bob Smith, was . . .

IsType2Quote: Identifies quoted material with the format—subject+comma+noun+prepositional phrase+comma+speed act+noun clause:

ex: Bob Smith, president of the company, said that the system . . .

IsType3 Quote: Identifies quoted material with the format—main clause with no object+comma+noun phrase+speech act:

ex: The yield dropped substantially, market watchers said.

IsType4Quote: Identifies quoted material with the format—main clause with object+comma+noun phrase+speech act:

ex: Commercial banks will reduce the prime rate, analysts said.

IsType5Quote: Identifies quoted material with the format—subject+verb+to+speec act+noun clause:

ex: He declined to say whether the paper was accepted or not.

IsType6Quote: Identifies quoted material with the format—subject+speech act+comma+quoted clause:

ex: She said, "We will probably buy it."

IsType7Quote: Identifies quoted material with the format—subject+comma+noun+prepositional phrase+comma+speec act+comma+quoted noun clause:

ex: Bob Smith, son of Joe, said, "I don't care."

IsType9Quote: Identifies quoted material with the format—subject+speech act+object+noun clause:

ex: The lady told the customers that they were out of peanuts.

IsType10Quote: Identifies quoted material with the following format:

ex: "I don't care who shot the cat," Josh said.

IsType11Quote: Identifies quoted material with the format—quoted main clause with comma+subject+speech act+comma:

ex: "We can do it," he said, and added that it would be difficult.

IsVerbThisClause: Returns TRUE when there is a lexical verb in the clause pointed to.

IsWeakCompoundNp: Identifies weak compound noun phrases.

ex: The line and the list were not long enough.

IsWeakPp: Identifies that the current word being pointed to is in a weak prepositional phrase.

ex: The name on the list was mine.

IsWhatTense: Returns the verb tense for the word being pointed to. Only 'past' and 'present' are valid.

IsProgressiveVp: Identifies the current word being pointed to as a progressive verb phrase.

IsRepeatTopic: Identifies a particular topic as one that has been established in the discourse recently.

ex: The bear was running through the woods. It stopped at a small pond and started to drink. Then the bear raised its head and started sniffing.

IsTooWeakThemeWord: Identifies a given word as one that is too weak to be a topic of the sentence.

ex: The list was printed on the laser printer.

LowAdverbialClauses: Identifies low priority adverbial clauses that are not necessary to the meaning.

MannerAdverb: Identifies 'manner adverbs' that are not essential to the meaning or to the grammatical integrity of the sentence.

ex: He wrote the letter awkwardly.

McIntroConj: Identifies conjunctions starting main clauses where the conjunction is not essential to the meaning or to the grammatical integrity of the sentence. The conjunction would be replaced with a semicolon.

ex: The soldiers gave a great cheer, for he had won the victory.

Modal: Identifies 'modal auxiliary verbs' that are not essential to the meaning or to the grammatical integrity of the sentence.

ex: We shall arrive on time.

ModDetAdv: Identifies adverbs that modify determiners that are not negative.

MoreAdverbial: Identifies the adverb 'more' in contexts that are not essential to the meaning or to the grammatical integrity of the sentence. This usually indicates additional detail to follow that other theme routines would identify.

ex: Freud contributed more than anyone.

MoreThan: Identifies more . . . than constituents with than functioning as a preposition, with the prepositional phrase not essential to the meaning.

ex: It is more a fish than an animal.

NegativeAdj: Identifies negative adjectives that are not essential to the grammatical integrity of the sentence.

ex: Neither student failed.

NegativePrnSubj: Identifies negative pronoun subjects modified by possessive prepositional phrases.

ex: Neither of the accusations was true.

NeuterProSubj: Identifies 'neuter pronoun subjects' such as 'it, there', that are not essential to the meaning or to the grammatical integrity of the sentence.

ex: It ran into the woods.

NonRestrictiveRel: Identifies syntactic prepositional phrases that are grammatically relative clauses.

ex: Certain buildings such as the RCA building will be destroyed.

NounTimeAdverbial: Identifies noun time adverbials that are not essential to the grammatical integrity of the sentence.

ex: Ed signaled Thursday that he's tired.

ObjectAfterPp: Identifies syntactic direct objects that follow prepositional phrases, which are grammatically appositives or reduced clauses and not essential to the grammatical integrity of the sentence.

ex: The stock closed at 5½, a gain of ⅛.

OfInNp: Identifies the 'of' preposition as head of a prepositional phrase that, along with a weak noun it may modify, is not essential to the meaning or to the grammatical integrity of the sentence.

ex: One of the dogs

OneAdj: Identifies where 'one', when used as an adjective, is not essential to the meaning.

ex: We saw one bear running through the woods.

OnBeforeTime: Identifies where 'on', when used before 'time' words, is not essential to the meaning.

ex: The party was held at the office on Tuesday.

OrphanAdjectivalClause: Identifies adjectival clauses whose noun head modifiers have been identified as not essential to the meaning or to the grammatical structure of the sentence.

OrphanAdv: Identifies adjuncts that are not part of verb phrases or noun phrases.

ex: The simple truth is often not simple at all.

OrphanPp: Identifies prepositions that do not have following noun phrases.

PersonalRef: Identifies personal references.

ex: I would expect other banks to follow suit.

PossProObj: Identifies possessive pronouns in prepositional phrases or objects, where the pronoun is not essential to the meaning or to the grammatical integrity of the sentence.

PossProSubj: Identifies possessive pronouns in subjects, where the pronoun is not essential to the meaning.

PreDetNp: Identifies 'predeterminers' such as 'just' that are not essential to the meaning.

ex: Bob thought that just three files were missing.

PrepPhrases: Identifies prepositional phrases that are not essential to the meaning or to the grammatical integrity of the sentence.

PrepPrep: Identifies a preposition followed by another preposition where the second preposition is not essential to the meaning or to the grammatical integrity of the sentence.

ex: The cat is by the heater in the kitchen.

PronounSubjPassive: Identifies 3rd person pronoun subjects with passive verb phrases.

ex: She was sent to the store by Bob.

PseudoMcBreak: Identifies 'in that' clauses where 'in that' could be replaced by punctionation.

ex: We agreed with Bob, in that he was the expert.

PureCoordConj: Identifies 'pure coordinating conjunctions' that could be replaced by commas or other punctuation.

Bob saw the bear, and the bear ran away.

QuoteSource: Identifies the quoted source of statements. Refer to the the individual IsQuote . . . theme routines for detail.

ReflexivePrn: Identifies 'reflexive pronouns' that are not essential to the meaning or to the grammatical integrity of the sentence.

RelThat: Identifies 'relative pronouns' that introduce relative clauses, where the pronoun is not essential to the grammatical integrity of the sentence.

SaveTopic: Identifies every word in the sentence that is not part of the main topic.

ex: The bear ran through the woods.

Semicolons: Identifies main clause boundaries where conjunctions could be replaced with punctuation.

ex: The bear ran through the woods, and Bob ran home.

StrandedInfinClause: Identifies syntactic infinitive clauses that are not essential to the meaning or to the grammatical integrity of the sentence.

StrandedNounClause: Identifies noun clauses that are not essential to the meaning or to the grammatical integrity of the sentence.

StrandedNounPhrase: Identifies temporal noun phrases that are not essential to the meaning or to the grammatical integrity of the sentence.

ex: The tiger at the circus performs twice a day.

StrayAdj: Identifies adjectives not in noun phrases or subject complements.

StrayAdverbial: Identifies adverbials that are not in traditional grammatical locations.

SubjAdvVerb: Identifies adverbs positioned between the subject and verb of a clause, where the adverb is not an orienter.

ex: Bob quickly ran away from the bear.

SubjectSplice: Identifies subordinate clause subjects that are acting as the subject of the main clause.

ex: As the term is used again in the same section of text, it loses importance. SweepNpTrash: Identifies noun phrases that appear stranded after the surrounding context has been identified as non essential.

ThanPrepPhrase: Identifies prepositional phrases beginning with 'than' that are not essential to the meaning.

ex: It is more a fish than an animal.

ThatClauseAdj: Identifies adjectives in 'that' clauses with weak verbs, where the entire clause is not essential to the meaning or to the grammatical integrity of the sentence.

ex: Be aware that similar products often come with different labels.

TimeAdj: Identifies 'adjectives or adverbs of time' that are not essential to the meaning.

ex: Bob walked to the store daily.

TimeAdvInVp: Identifies time adverbs in verb phrases.

ex: Bob walked daily to the store.

TimeInObject: Identifies time noun phrases in objects.

ex: Bob went to Rome each Christmas.

TimeInSubjNp: Identifies time noun phrases in the subject of the sentence.

ex: Every Thursday is a hard day for Bob.

TimeSubject: Identifies simple time subjects, with following subject modifiers, where the time subject can be replaced with the following modifiers.

ex:

TimeTime: Identifies time words that follow other time words, where the second time word is not essential to the meaning.

ToInfinitive: Identifies infinitives marked by 'to' where the 'to' is not essential to the grammatical integrity of the sentence.

ToneAdv: Identifies 'tone adverbs' indicated as 'maximizers, emphasizers or diminishers' that are not essential to the meaning.

TopicalizerPhrase: Identifies topicalizers modifying before possessive prepositional phrases where the topicalizer and the following preposition are not necessary to the meaning or to the grammatical integrity of the sentence.

TopicalClause: Identifies introductions to topical clauses.

ex: It is dynamic in that it can provide feedback.

Transition: Identifies 'transition words' that do not indicate 'time' or 'coordination', and that are not essential to the meaning or to the grammatical integrity of the sentence.

TrashBogusMc: Identifies clauses begun with semicolons where there is not a full main clause and where the clause is not essential to the meaning or to the grammatical integrity of the sentence.

TrashMc: Identifies main clauses that have all of their major elements marked as non-essential to the meaning and to the grammatical integrity of the sentence, where the entire main clause is actually unnecessary.

TrashStraySubj: Identifies subjects that have become unattached because of insufficient strong information in the rest of the clause.

TrashWholeSent: Identifies entire sentences that don't have any strong thematic content.

UniversalPrn: Identifies 'universal pronouns', 'predeterminers' or 'cardinal determiners' that are not essential to the meaning or to the grammatical integrity of the sentence.

UselessAdj: Identifies weak adjectives in noun phrases.
ex: The late president planted that tree.

UselessPrepPhrase: Identifies meaningless prepositional phrases.
ex: There is a viable alternative to it.

UselessPrnObj: Identifies indirect object pronouns.
ex: Congress gave them the shaft.

UselessPrnSubj: Identifies pronoun subjects that have alternate subject contexts that carry the meaning.
ex: No one except his supporters agree with the senator.

VerbAtEnd: Identifies verbs at the end of subordinate clauses, where the verb is not essential to the meaning or to the grammatical integrity of the sentence.

VerbInit: Identifies initial comment verbs.
ex: Note, however, that the apples were all green.

WeakAdj: Identifies weak adjectives.
ex: The simple solution is to not go.

WeakEquation: Identifies non-negative be-verb clauses that are equating only weak thematic information.
ex: The list was quite large.

WeakPrepPhrase: Identifies weak prepositional phrases.
ex: I would like to know your opinion as to your boss's behaviour.

WeakPrepSeq: Identifies a sequence of prepositional phrases that are collectively weak in thematic content.
ex: It was built on the basis of my invention.

WeakSubjComp: Identifies weak subject complements that have extended contexts.
ex: The motivation for the research was the issue of how to teach pronunciation.

WhAdjClause: Identifies wh-element adjectival clauses that modify strong nouns or that do not carry supporting information.
ex: Boredom is especially trying for young people who have so few opportunities.

WhElement: Identifies wh-element clauses.

WhNounClause: Identifies noun clauses that are not essential to the grammatical integrity of the sentence.
ex: A model for the scientific investigation of language arose which took its problems almost exclusively from British sources.

Wordy: Identifies wordy expressions and single word replacements.

WhileSubordinators: Identifies 'time-indicating' subordinating conjunctions, such as 'while', that are not essential to the meaning or that could be replaced with punctuation.
ex: Please get me some flour while you are at the store.

Theme-Relational Tagging

Theme-relational tagging looks for certain grammatical or thematic relationships and follows a particular line of processing which tags all of the words from a specifically identified start point to a specifically identified end point. There are approximately 15 of these routines.

DelAllAux: Flags each auxiliary verb in each verb phrase.
ex: Bob can leave as soon as he is cleared of the charges.

DelAllButNp: Flags each word in the sentence that is not in the current noun phrase being pointed to.

DelClause: Flags each word in the clause (and imbedded clauses) being identified by the given word.

DelCurrPp: Flags each word in the prepositional phrase being pointed to.

DelDo: Flags each word in the direct object being pointed to.

DeLogicBreak: Flags each word in the same logical constituent group indicated by the given word.

DelMc: Flags each word in the main clause being pointed to.

DelObj: Identifies any word in an object being identified by the given word.

DelPp: Flags each prepositional phrase that is not essential to the meaning or to the grammatical integrity of the sentence.

DelRemainderSubj: Flags each word to the right of the current word that is part of the complete subject of the current clause.

DelStraySubj: Flags each word of the complete subject being pointed to when the subject is not essential to the meaning of the sentence.

DelToTheLeft: Flags each word to the left of the given word.

DelToTheRight: Flags each word to the right of the given word.

DelVerb: Flags the current word being pointed to if it is a verb.

DelVp: Flags all words if the verb phrase being pointed to.

Theme-Location Identification

Theme location identification searches for particular grammatical or thematic relationships and returns a location of where this word, phrase or clause starts in a sentence. There are approximately 35 of these routines.

FindIoThisPred: Returns the location of an indirect object in an identified predicate.

FindAllPp: Returns the location of a prepositional phrase where the last word of a string of phrases is needed to support any part of the prepositional phrase string from the beginning.

FindClauseType: Returns the type of subordinate clause at the given location.

FindClauseLevel: Returns the number of subordinate clause levels at the given location.

FindEndNp: Returns the location of the end of the given noun phrase.

FindEndLogicBreak: Returns the location of the end of the logical constituent group being pointed to.

FindEndObj: Returns the location of the end of the object being pointed to.

FindEndPp: Returns the location of the noun head of the prepositional phrase being pointed to.

FindEndSubj: Returns the location of the end of the complete subject being pointed to.

FindEndSc: Returns the location of the end of the subject complement being pointed to.

FindEndSubClause: Returns the location of the end of the subordinate clause being pointed to.

FindEndVp: Returns the location of the end of the verb phrase being pointed to.

FindLastNounInNp: Returns the location of the last noun head of the series of noun phrases identified by the given word.

FindLastVerbInVp: Returns the location of the last verb in the series of verb phrases identified by the given word.

FindNextMc: Returns the location of the start of the next main clause after the given word.

FindNextNoun: Returns the location of the next strong noun after the given word.

FindNextFirstNoun: Returns the location of the next noun after the given word.

FindNextKeptWd: Returns the location of the next word after the given word, where the word has not been marked as non-essential.

FindNounForThisAdj: Returns the location of the noun that the current adjective being pointed to modifies.

FindNounForThisPp: Returns the location of the noun head for the prepositional phrase being pointed to.

FindObject: Returns the location of the next object after the given word.

FindPrevNoun: Returns the location of the last noun before the current given word.

FindPrevNounVerb: Returns the location of the last noun or verb before the current given word.

FindPrepPrep: Returns the location of the last preposition before the current given word.

FindStartNp: Returns the location of the start of the noun phrase being pointed to.

FindPseudoVerbThisPred: Returns the location of the next participle in the predicate being pointed to.

FindStartMc: Returns the location of the start of the main clause being pointed to.

FindStartPp: Returns the location of the start of the prepositional phrase being pointed to.

FindStartSubClause: Returns the location of the start of the subordinate clause being pointed to.

FindStartVp: Returns the location of the start of the verb phrase being pointed to.

FindSubjThisPred: Returns the location of the simple subject after the current given word.

FindUndeletedWrd: Returns the location of the next word before the current given location that is not marked as non-essential to the meaning.

FindVerbThisPred: Returns the location of the first verb of the verb phrase for the current predicate being pointed to.

FindVerbThisSubj: Returns the location of the first verb of the verb phrase for the subject being pointed to.

Each of these assessments has its results stored for each word in the thematic context output area. Any application is now able to take advantage of this information, as well as the grammatical and stylistic information stored previously, to make intelligent observations about the grammar, theme and style of the text, and to perform some helpful operation against it, such as summarizing or outlining the text.

Sample Code

The following sample code shows how several typical theme tagging routines work. The theme parser works by setting a generalization of what each routine is looking for, followed by specific contexts that can either exclude certain sentences from the tagging or specifically include them.

```
PersonalRef(work_ctr)
ubl word_ctr;
{
int vbos;
int endvp;
int endnp;
int ctr;
if (LEX(wd_personal_prn,word_ctr) &&
   LEX(wd_first_person_prn,word_ctr) &&
   verb_phrase[word_ctr+1]&&
   simple_subject[word_ctr]&&
   !subordinate_clause[word_ctr])
```

\* \* \* The above section tests that the current word being pointed to by word_ctr is a first-person, personal pronoun, functioning as the subject of the clause, followed by a verb phrase. The clause must be a main clause, not a subordinate clause. If these tests pass, the routine continues, otherwise it returns. This test is the first general test to determine if a word is a personal reference type. It is followed by secondary tests the constrain this generalization in certain contextual conditions. Note in this sample routine that the constraints are fairly specific and if met return without doing any tagging. If the reference noun in question does not have these constraints, then it is flagged by default. \* \* \*

```
{
  vbpos = FinfLastVerbInVp(word_ctr+1); *** this locates the last verb
in the verb phrase following the word after the current pronoun ***
  if(IsNegVerbThisPred(vbpos) ||
     prep[vbpos+1]) *** this checks the verb phrase for a negative
element anywhere in it, or for a preposition immedietely following the last
verb in the verb phrase ***
  {
  return 0; *** return when negative verb phrases encountered: We
CANNOT forsee any insurmountable problms. ***
  }
  ctr = vbpos+1; *** position to next word following the end of the verb
phrase ***
  if(prn[ctr])
  {
    return 0; *** return if a pronoun follows the verb phrase: I saw HIM
the following weekend. ***
  }
  while (ctr < number_words-3 &&
     predicate[ctr] &&
     IsSameClause(vbpos,ctr))
  {
    if(conj[ctr]) &&
     IsWordCoordConj(ctr) &&
     ctr < number_words-2 &&
     verb[ctr+1])
    {
    vbpos = FindLastVerbInVp(ctr+1);
    if(IsNegVerbThisPred(vpos))
    {
    return 0; *** Return when the predicate extends with the context of a
coordinating conjunction followed by a verb phrase, and where the verb
phrase contains a negative element. ***
    }
    break;
    }
    ctr++;
  }
  if(LEX(wd_that_clause_verb,vbpos) ||
     LEX(wd_emotion_attitude,vbpos))
  {
  if(LEX(wd_factual_know_verb,vbpos))
  {
  if(!(LEX(wd_speech_act,vbpos) &&
     LEX(wd_that_clause_verb,vbpos)))
```

85

-continued

```
{
  return 0; *** Checks the last verb in the verb phrase for being either a
that-clause verb (say, expect, see . . . ) or a verb of emotion or attitude
(disappoint, amazed), and where the verb is a factual knowledge verb, but
not a speech act verb AND a that-clause verb. Verbs will be those such as
'hate, call . . . ' ***
  }
}
if(IsWordQuoteVerb(vbpos) &&
  vbpos < number_words-1 &&
  !IsWordThat(vbpos+1))
{
  return 0; *** Returns when the verb position is a quotative verb, not
the last word of the sentence, and where the following word is NOT
abstractly identified by the lexical flags set on 'that'. I will WRITE as
soon as I can. ***
}
endvp = FindEndVp(vbpos);
if(endvp < number_words-1 &&
  IsInfinitiveClause(endvp+1))
{
  return 0; *** Returns when the end of the verb phrase (includes
adverbs) is followed by an infinitive clause. ***
}
if(prn[endvp+1] &&
  !LEX(wd_nominative_case_prn,endvp+1))
{
  endvp++; *** Positions pointer to a subjective case pronoun ***
}
if(!noun_phrase[endvp+1] &&
  !conj[endvp+1]))
{
  return 0; *** Returns if the following word is not in a noun phrase and
not a conjunction. ***
}
if(noun_phrase[endvp+1])
{
  endnp = FindEndNp(endvp+1);
  if(!(conj[endnp+1] &&
    IsWordTo(endnp+1)))
  {
    return 0; *** Returns when the following word in in a noun phrase, and
when the next word after the end of the noun phrase is not the an infini-
tive clause (identified by the abstract features of the word 'to' tagged
in a conjunctio position, which signals the subordination in the parser).
  }
}
for(; word_ctr <= endvp; word_ctr++)
{
  ThemeTag[word_ctr][PersonalRefCode] = TRUE;
  *** Tags all of the words from word_ctr through the end of the verb
phrase as a personal reference: I believe that through revenue growth we
will make that goal. ***
}
if(IsWordThat(word_ctr))
{
  ThemeTag[word_ctr][PersonalRefCode] = TRUE;
  *** Tags the word that if in the following position after the previous
tags. ***
  return 0;
}
else
{
  word_ctr--; *** Sets position at last tagged word. ***
}
}
}
}
AdverbNpInit(word_ctr)
int word_ctr;
{
int nounpos;
if(noun_phrase[word_ctr] &&
  !subordinate_clause[word_ctr] &&
  IsStartMc(word_ctr))
{
```

* * * The above code is the opening generalization that looks for a noun phrase that is not in a subordinate clause,

86 and that starts a new main clause. This is the initial condition necessary for determining initial noun phrase adverbials. The following code will add constraints for particular contextual conditions. Notice that the constraints are fairly general, and that with a few basic tests being passed, and a few NOT conditions being met, the noun phrase will be tagged of this type. * * * nounpos=FindLastNounInNP (word_ctr); * * * Find the last noun in the noun phrase currently being pointed to from above. * * *

```
if(IsTimeNoun(nounpos)&&
  !simple_subject[nounpos]&&
  complete_subject[nounpos])
{
```

* * * if the noun head is a time word, not the simple subject of the clause, but is classified in the complete subject portion of the clause, then it is tagged as being an introductory adverbial of time. ex: Early next morning, before dawn, they fed the foxes. * * *

```
    TagNp(nounpos);
    }
  }
}
UselessPrepPhrase(word_ctr)
int word_ctr;
{
  int nounpos;
  int envpp;
  int vbpos;
  int temp;
  if (prep[word_ctr] && pp_adj[word_ctr])
```

{ * * * Opening generalization is to allow all prepositional phrases that are coded as adjectival types to be available for the useless prepositional phrase tagging. The following code will apply constraints to this generalization. Unlike the previous examples, this example does not return based on the constraints as much as it only allows for the prepositional tagging inside specific constraints. * * *

```
  nounpos = FindNounForThisPp(word_ctr); *** find the noun head for
the prepositional phrase. ***
  if (nounpos == NOT_FOUND)
  {
    return 0; *** return if a valid noun head is not found for the
preposition. ***
  }
  if(IsGoodNounThisPp(word_ctr))
  {
    return 0; *** return of the noun head is listed as an important
supporting word for other phrases. It cannot be flagged as useless if this
is so. ***
  }
  endpp = FindEndPp(word_ctr); *** Find the end of the prepositional
phrase (last word). ***
  if(endpp < number_words-1 && IsWordThan(endpp+1))
  {
    return 0; *** If the following word has the abstract characteristics of
'than' then return. ***
  }
  if(predicate[word_ctr])
  {
    vbpos = FindVerbThisPred(word_ctr);
    if(vbpos < number_words && IsDitransNeedPp(vbpos))
```

-continued

```
{
  return 0; *** if the word is in the predicate, and the main lexical verb
for the predicate is ditransitive, and is the type of word that needs
supporting prepositional information, then return. ex: The state
declared the land as one of its natural resources. ***
  }
}
if(LEX(wd_personal_prn,nounpos) ||
  IsWordDemonstrative(nounpos) ||
  IsWordNeuterPrn(nounpos))
```

{* * * A second generalization is made above. This states that the noun head identified earlier should be a personal pronoun, a demonstrative pronoun, or a neuter gender pronoun to be considered in this section. * * *

```
if(word_ctr > 0 &&
    tag_table[word_ctr-1] != TAG_WD &&
    (verb_phrase[word_ctr-1] ||
    IsWordParticiple(word_ctr-1)))
  {
  return 0; *** This constraint exits when the previous word has been
tagged by another routine as not high-priority and was either in a verb
phrase or a participle. ex: She stood for a while looking at everything
there was to see. ***
  }
  TagPp(word_ctr); *** Now this prepositional phrase is tagged as
being weak (non-priority). ex: There is a viable alternative to it. ***
  }
}
if(word_ctr &&
    prep[word_ctr] &&
    pp_adv[word_ctr] &&
    adj[word_ctr-1] &&
    !apunc[word_ctr-1] &&
    LEX(wd_comparative_adj,word_ctr-1))
```

{* * * This routine allows another generalization to attempt the weak prep phrase tagging. If the word is a preposition and functioning adverbially, and of the prior word is an adjective and is not followed by any punctuation mark, and if the prior word is also a comparative adjective, then the routine continues. ex: It is better for you than for me. * * *

```
          nounpos = FindNounForThisPp(word_ctr);
          if(nounpos != NOT_FOUND &&
              IsWordThan(nounpos+1) &&
              !apunc[nounpos])
```

{* * * This constraint will allow for the weak prep phrase tagging. If the noun head of the preposition is followed by the abstract nature of the word 'than' and does not have any punctuation mark, then the prep phrase is tagged as weak * * *

```
      TagPp(word_ctr);
      }
    }
}
```

USING THE THEME OUTPUT

There are three primary uses of the thematic information stored in the output section:

1. Kernel Sentence Generation
2. Topic Extraction
3. Content Extraction

Kernel Sentence Generation

A sentence can be said to have a main point, or kernel, that embodies the major pieces of information that the writer is communicating to the reader The kernel is generally a subset of the sentence, with additional supporting detail mostly enforcing the main point. Much of the supporting information can be removed without detracting from either the logical truth of the sentence or the general understanding of the point being communicated. The grammar, style and theme of the sentence are used to make the determination of which words can be removed without violating either of the above guidelines. In addition, there is often not a single but a number of reductions that can be made, each moving towards the main kernel in small steps, the last step being the most tersely worded kernel sentence.

To generate these kernel sentences, certain thematic output settings will be checked, and certain low-content, grammatically neutral words removed. The correct thematic assessments are checked to give the desired kernel reduction level. Each of the following tags will be checked against each word in the sentence. Any word that has been thematically tagged with any of the assessments listed here will be removed from the sentence. The words that are left will form the new, reduced sentence.

Levels of Reduction

When a new sentence is generated, thematically-tagged functionality is removed, as opposed to reducing thematic aspects until a certain percent of the sentence remains. Four reduction levels are sufficient to represent summarized forms of sentences. Any more and the noticeable differences between levels becomes insignificant. The individual thematic contextual elements that are tested at each level should also be tested in the order given. If they are not, the reductions may vary. For example, some theme assessments look for 'stranded' clauses, where the prior word removals have caused a clause to be stranded from the main clause. In this case, it should be tested after most other tests, or it may be stranded after the test is made. Some of these routines are using the run-time theme assessments, since they cannot be tested in isolation. The four reduction levels are:

1. Contextual Reduction
2. Base Thematic Reduction
3. Secondary Thematic Reduction
4. Headline Thematic Reduction

Contextual Reduction

Contextual reduction is a different type of reduction from the three thematic reductions. Thematic reductions function hierarchically, with each reduction level having potentially more information removed than did the previous reduction level. The contextual reduction may be smaller or larger than any of the thematic reductions, depending on the writing style of the sentence. From the original sentence, the following thematic contextual elements are tested and, if present, the corresponding words are removed from the sentence in this reduction type.

QuoteSource
ThatClauseAdj
TopicalClause

TrashStraySubj
OrphanAdjectivalClause
CryptoAdjClause
PrepPhrases
CryptoPrepPhrase
ThanPrepPhrase
PrepPrep
UselessPrepPhrase
AdverbInit
OrphanPp
AdverbialBetweenCommas
WeakSubjComp
ElliptedPassive
Adverbs
TopicalizerPhrase
TimeObject
PossProSubj
AdjDeterminer_b
DemonstrativeSubject
WhElement
ComparativeInSubjComp
MoreThan
WeakAdj
AdvInNp
DemonstrativeModifier
AgoAdverbial
PersonalRef
BogusSubject
StrayAdj
TimeSubject
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy Base Thematic Reduction This is the first of three hierarchical reductions for a sentence. It is intended that the resulting new sentence is both grammatical and logically correct. It should also be relatively easy to read. The following thematic contextual elements in the original sentence are tested and, if present, the corresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
PersonalRef ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAEnd
InfinInfin
TrashMc
Semicolons
TrashWholeSent
StrayAdj
StrayAdverbial
CorrelConj Secondary Thematic Reduction This is the second of three hierarchical reductions for a sentence. It is intended that the resulting new sentence is both grammatical and logically correct. It removes additional information that begins to send the new sentence into a headline mode, but not quite as terse. The following thematic contextual elements in the original sentence are tested and, if present, the corresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
AdjAdvSubordination
PrepPhrases
WeakSubjComp
ElliptedPassive
Adverbs
InfinClauseAfterObj
TopicalizerPhrase
TimeInObject
PossProSubj
AdjDeterminer_b
DemonstrativeSubject CryptoClause
WhElement
ComparativeInSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
StrayAdj
StrayAdverbial
CorrelConj Headline Thematic Reduction This is the last of three hierarchical reductions for a sentence. The new sentence is now reduced to a headline-style sentence, that is not necessarily grammatical nor logically correct. The following thematic contextual elements in the original sentence are tested and, if present, the corresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice AdjAdvSubordination
PrepPhrases
WeakSubjComp
ElliptedPassive
Adverbs
InfinClauseAfterObj
TopicalizerPhrase
TimeInObject
PossProSubj
AdjDeterminer_b
DemonstrativeSubject
CryptoClause
WhElement
ComparativeInSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubj
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
LowAdverbialClauses
WeakPrepPhrase
NegativePrnSubj
WbNounClause
BeVp
NegativeAdj
WhAdjClause
MoreAdverbial
SweepNpTrash
UselessAdv
OrphanAdv
UselessPrnSubject
UselessPrnObj
TimeAdvInVp
StrayAdverbial As a final stage of processing in the kernel generation section, the punctuation for the sentence is rewritten in order to best reflect the new sentence structure.

Topic Extraction

After the new kernel sentences have been generated, five topic extraction routines will be generated. They locate the main, new topic in the sentence, extract its supporting context, and place the result in one or more of the five topic extraction areas. The five topic extraction areas are:
1. Main Thematic Topic Group
2. Main Thematic Topic
3. Secondary Thematic Topic
4. Main Developed Topic
5. Main Proximity-Developed Topic

Main Thematic Topic Group

This topic extraction routine looks for the main topic in the sentence, along with its most important supporting context. If the main topic has already been developed, it looks for a secondary topic. If there is not a suitable secondary topic, or if the secondary topic has also already been developed, then the original main topic is selected. There are three processing phases used in establishing the main topic. First, certain thematic assessments are checked, and any associated words removed if they contain the tested assessments. These tests are:

QuoteSource
ThatClauseAdj
TopicalClause
AdverbInit
CommentInit
Appositive
WeakSubjComp Second, the main topic is extracted from the sentence elements that remain after the previous reductions:

SaveTopic

Last, contextual elements of specific types are removed from the main topic:

PrepPrep
PrepPhrases
UselessPrepPhrase
SweepNpTrash
WeakAdj
PureCoordConj
UniversalPrn
ConjInNp
Transition
Factive
StrayAdj
DemonsAdj
DemonstrativeModifier
AdverbAfterVerb
AdvInNp
Compromiser
FocusAdv The result is now placed in the main topic extraction output area.

Main Thematic Topic

The main thematic topic is an extended classification of the previous thematic group. If the topic group is located in the actual 'thematic topic' position of the sentence, and not in a secondary focus position, then the main topic group is copied to this output area. This identifies the topic group not only as the main thematic topic of the sentence, but also indicates that it was in the strongest thematic position within the sentence.

Secondary Thematic Topic

The main thematic topic is copied to this output area, and any non-critical supporting information is removed. This moves the topic to just its main head, if possible. This is determined by checking the theme assessments for a 'strong noun' classification. If the topic's head noun is classified as a strong noun, then the supporting information is removed. Otherwise, it stays at this level. If there is nothing in the main thematic topic output area, this output area will also be empty.

Main Developed Topic

This output area copies the main thematic topic into it as long as the main thematic topic head has been a main thematic topic head within the last 20 topics. This indicates that this main topic is one that is not only prominent in the sentence, but also in the discourse at this point.

Main Proximity-Developed Topic

Whenever a main developed topic appears for a second time with a user specified range of text, it is output to the main proximity-developed topic. This output indicates that it is not only a main focal point within the document, but is being reinforced through the writing.

Content Extraction

The final phase of thematic output processing is to identify certain major thematic points in a sentence. This is a superset of the detailed thematic elements, being those that are notably important for turning free form text into structured database fields. The following outputs are produced:

Thematic Head Words
Proper Names
Descriptions
Named Topics
Topic Indicators
Definitions
Developed Proper Names

Thematic Head Words

This output indicates that the identified word locations is a main focus point for a strong noun phrase. A strong noun phrase can either be a strong noun head or a noun head with strong support. Only the actual head word is specifically identified. Certain words that were initially flagged as strong or strong with support are removed from this list. The logic for this output is as follows:

---

+noun and
−pronoun and
(+strong noun or + strong support or +knowledgebase concept or
(+gerund and simple subject)) and
−time noun and
−numbers and
−digits and
(+knowledgebase concept or
  not((+gerund or participle) and
    (−simple subject or −verb phrase))) and
−pro verb and
−perfective verb

---

If this condition is evaluated as true, then the word position is output to this area. Additionally, any adverbs that are marked as topicalizers are also flagged in this area. An example of these words is:

linguistically
aerodynamically

Proper Names

In this output area all of the proper names and places in the sentence are stored. Time nouns are excluded.

Descriptions

The 'description' output specifically identifies every set of noun plus descriptor. These appear as an appositive. Both sides of the description are stored. They must be able to express an equation of 'term1 is a term2'. An example of such a sentence that would generate these conditions is:

John Smith, a market analyst at Big Company, said . . .
This sentence will generate:
Term1(John Smith) isa Term2(market analysts)

Named Topics

This output area indicates topics that are specifically named in the context of a sentence. An example is:

This is a story about bears.
'Bears' is assigned to this output area.

Topic Indicators

This output area contains all strong orienter words. These are words that indicate a field of study or industry, such as:

computer software
prime interest rate
terrorist abduction

These words indicate the highest possible thematic significance in sentences.

Definitions

This output stores words that are defined in the context of the sentence with a 'be' verb relationship. An example of such a sentence is:

A bear is an animal that lives in the forest.
This would generate two terms with an 'isa' relationship:
Term1(bears) isa Term2(animals)

Developed Proper Names

This output indicates each proper name identified in 'Proper Names' above that mentioned more than one time within a user specified length of text.

What is claimed is:

1. A computer implemented method for processing words for classification, said method comprising the steps of:

storing, in memory of said computer system, a plurality of categories to classify at least one word;

generating a nominalized form for said word if said nominalized form exists for said word;

generating a noun form for said word if a noun form exists for said word;

generating a mass sense for said word if a mass sense exists for said word;

generating a count sense for said word if a count sense exists for said word; and referencing said memory to associate, if generated, said nominalized form, said noun form, said mass sense, and said count sense of said word to said categories.

2. The method as set forth in claim 1, wherein the step of generating a nominalized form for said word comprises the steps of:

determining whether said word is an adjective, adverb or verb; and generating a nominalized form for adjectives, adverbs and verbs.

3. The method as set forth in claim 1, further comprising the step of referencing said memory to classify phrases of words to said categories to provide a more specific designation for classification.

4. A computer readable medium comprising a set of instructions stored therein, which when executed by a computer, causes the computer to perform the steps of:

storing, in memory of said computer system, a plurality of categories to classify at least one word;

generating a nominalized form for said word if said nominalized form exists for said word;

generating a noun form for said word if a noun form exists for said word;

generating a mass sense for said word if a mass sense exists for said word;

generating a count sense for said word if a count sense exists for said word; and referencing said memory to associate, if generated, said nominalized form, said noun form, said mass sense, and said count sense of said word to categories of said classification hierarchy.

5. The computer readable medium as set forth in claim 4, wherein instructions for generating a nominalized form for said word comprise instructions for:

determining whether said word is an adjective, adverb or verb; and generating a nominalized form for adjectives, adverbs and verbs.

6. The computer readable medium as set forth in claim 5, further comprising instructions for referencing said memory to classify phrases of words to said knowledge catalog to provide a more specific designation for classification.

7. A computer system comprising:

memory for storing a plurality of categories to classify at least one word; and processing unit coupled to said memory for generating a nominalized form for said word if said nominalized form exists for said word, for generating a noun form for said word if a noun form exists for said word, for generating a mass sense for said word if a mass sense exists for said word, for generating a count sense for said word if a count sense exists for said word, and for referencing said memory to associate, if generated, said nominalized form, said noun form, said mass sense, and said count sense of said word to said categories.

8. The computer system as set forth in claim 7, further comprising said processor unit for determining whether said word is an adjective, adverb or verb, and for generating a nominalized form for adjectives, adverbs and verbs to generate said nominalized form for said word.

9. The computer system as set forth in claim 7, further comprising said processor unit for referencing said memory to classify phrases of words to said categories to provide a more specific designation for classification.

* * * * *